(12) United States Patent
Wang

(10) Patent No.: US 11,473,451 B2
(45) Date of Patent: Oct. 18, 2022

(54) METHOD FOR IMPROVING EFFICIENCY OF RANKINE CYCLE

(71) Applicant: BEIJING CYNERTEC CO., LTD., Beijing (CN)

(72) Inventor: Zhen Wang, Beijing (CN)

(73) Assignee: BEIJING CYNERTEC CO., LTD., Beijing (CN)

(\*) Notice: Subject to any disclaimer, the term of this patent is extended or adjusted under 35 U.S.C. 154(b) by 0 days.

(21) Appl. No.: 17/283,197

(22) PCT Filed: Sep. 27, 2019

(86) PCT No.: PCT/CN2019/108679
§ 371 (c)(1),
(2) Date: Apr. 6, 2021

(87) PCT Pub. No.: WO2020/073830
PCT Pub. Date: Apr. 16, 2020

(65) Prior Publication Data
US 2021/0355846 A1    Nov. 18, 2021

(30) Foreign Application Priority Data

Oct. 10, 2018  (CN) .......................... 201811177690.2
Oct. 26, 2018  (CN) .......................... 201811258746.7
(Continued)

(51) Int. Cl.
*F01K 23/10*      (2006.01)
*F01K 11/02*      (2006.01)
(Continued)

(52) U.S. Cl.
CPC .............. *F01K 23/10* (2013.01); *F01K 11/02* (2013.01); *F01K 13/02* (2013.01); *F01K 23/065* (2013.01); *F01K 25/08* (2013.01)

(58) Field of Classification Search
CPC .......... F01K 23/10; F01K 11/02; F01K 13/02; F01K 23/065; F01K 25/08
See application file for complete search history.

(56) References Cited

U.S. PATENT DOCUMENTS 5,038,568 A  *  8/1991  Gounder .................. F01K 7/22
                                                                60/669
8,091,361 B1    1/2012  Lang
(Continued)

FOREIGN PATENT DOCUMENTS

CN         1352369 A      6/2002
CN       205878137 U      1/2007
(Continued)

OTHER PUBLICATIONS

Wang et al., "Parameter Optimization of a Turbine Extraction System in a Nuclear Power Plant", Journal of Harbin Engineering University, vol. 38, 4, Apr. 2017, pp. 588-594.
(Continued)

*Primary Examiner* — Shafiq Mian
(74) *Attorney, Agent, or Firm* — Boyle Fredrickson S.C.

(57) ABSTRACT

A method for improving the efficiency of a Rankine cycle by reducing cold end loss, comprising: for a Rankine cycle with a reheat-cycle, reducing temperature of reheat steam or removing a reheat steam system, and for a Rankine cycle with regenerative steam extraction-heat, reducing temperature of main steam and increasing humidity of main steam.

20 Claims, 32 Drawing Sheets

(30) Foreign Application Priority Data

Dec. 27, 2018 (CN) .......................... 201811613688.5
Dec. 27, 2018 (CN) .......................... 201844946714.4

(51) Int. Cl.
    *F01K 13/02*     (2006.01)
    *F01K 23/06*     (2006.01)
    *F01K 25/08*     (2006.01)

(56) References Cited

U.S. PATENT DOCUMENTS

| | | | |
|---|---|---|---|
| 2011/0094228 A1 | 4/2011 | Fan et al. | |
| 2014/0208747 A1 | 7/2014 | Datye | |
| 2016/0017756 A1* | 1/2016 | Hotta | F01K 11/00 60/660 |

FOREIGN PATENT DOCUMENTS

| | | | |
|---|---|---|---|
| CN | 102425781 A | 4/2012 | |
| CN | 104676573 A | 6/2015 | |
| CN | 104832227 A | 8/2015 | |
| CN | 104975887 A | 10/2015 | |
| CN | 105697075 A | 6/2016 | |
| CN | 107060916 A | 8/2017 | |
| JP | 2004245184 | 9/2004 | |
| JP | 2011196252 A | 10/2011 | |

OTHER PUBLICATIONS

Liang et al., "A Non-Linear Model for Ultra-supercritical Power Unit and the Dynamic Characteristic Study", Journal of Chinese Society of Power Engineering, vol. 32, No. 2, Feb. 2012, pp. 118-123.
Wang et al., "Progress in Research on Water Droplet Size in Two Phase Wet Steam Flow in Steam Turbine", J. University of Shanghai for Science and Technology, vol. 25, No. 4, Apr. 2003, pp. 307-312.
Qu et al., "Analysis of the Cost-effectiveness of the 700° C Subcritical Reheat-less Power Generation Unit Technology". Journal of Engineering for Thermal Energy and Power, vol. 31, No. 9, Sep. 2016, pp. 58-62 & 134.
Li et al., "Image Measurement for the Diameters of Drop in Two Phase Wet Steam Flow in Steam Turbine". China Instrumentation, vol. 12, 2006, pp. 66-68.
Huang et al., "Steam Turbine Theory". China Electric Power Press, 2000, pp. 167-169.

* cited by examiner

METHOD FOR IMPROVING EFFICIENCY OF RANKINE CYCLE

TECHNICAL FIELD

The present invention relates to the technical field of improving the thermal efficiency of a Rankine cycle, i.e., the thermal efficiency of a steam turbine generator set, and in particular to a method for reducing the heat consumption rate of large and small Rankine cycles.

BACKGROUND

A Rankine cycle system, i.e., a steam turbine power generation system, includes a heat source system, a steam turbine cycle system, and a cold end system as shown in FIG. 35, and is used to convert thermal energy to mechanical energy. The electricity is then generated by converting mechanical energy into electrical energy through a generator driven by a steam turbine.

The heat source system heats the water, which forms steam and is then supplied to the steam turbine.

A small steam turbine cycle system includes a main steam system, a steam turbine cylinder block, a regenerative steam extraction system, and a shaft sealing steam system.

A large steam turbine cycle system includes a main steam system, multiple steam turbine cylinder blocks, a reheat steam system, and a shaft sealing steam system.

The cold end system includes a condenser arranged behind exhaust steam of a low-pressure cylinder of the steam turbine. The condenser converts the steam discharged from the low-pressure cylinder into condensate water, and sends the condensate water back to the heat source system through a condensate pump and a feed pump. The heat source system reheats the water to form a power generation process that can operate continuously in the Rankine cycle.

The condenser and the system for cooling the condenser form the cold end system of a thermal power generator set. The cooling system includes different forms of cooling systems, such as cooling towers, air cooling islands.

The large Rankine cycle involved in the present invention provides more than 70% of the world's electrical energy. Improving the efficiency of this large Rankine cycle is important for improving power generation technology, reducing the cost of power generation, reducing greenhouse gas emissions, and protecting the global environment.

For the large Rankine cycle involved in the present invention, the steam pressure of the heat source system includes intermediate-pressure (1.96-3.92 MPa), high-pressure (5.88-9.81 MPa), ultrahigh-pressure (11.7-13.7 MPa), subcritical (15.69-18.0 MPa), supercritical (23-27 MPa), and ultra-supercritical (30-35 MPa), according to steam turbine design standards.

Heat source system of the large Rankine cycle involved in the present invention includes four different forms:
- (A) Traditional power plant with a pressure above the ultra-high pressure: the heat released by the combustion of coal, oil, and gas is used to directly heat water to supply steam to the steam turbine.
- (B) Combined-cycle power plant with a pressure above the intermediate pressure: the steam generator (HRSG) is heated by the high-temperature flue gas discharged from the gas turbine to supply steam to the steam turbine.
- (C) Solar thermal power plant with a pressure above the intermediate pressure: the heat of solar energy is absorbed through a solar energy absorption device and stored in a heat storage medium, and then the stored heat energy is converted into heat energy of water through a dedicated steam generator to supply steam to the steam turbine.
- (D) Nuclear power plant with a high pressure: saturated steam is supplied to the steam turbine through a nuclear reactor.

It is believed in the prior art that the decrease in the temperature of the steam after passing through a high-pressure cylinder to do work will result in a decrease in the work efficiency of the steam in the subsequent steam turbine and results in water corrosion at the last stage blade of a low-pressure cylinder due to excessive exhaust steam humidity. Therefore, for a large generator set with a pressure above the intermediate pressure and high pressure, the Rankine cycle often adopts a steam reheat process, i.e., heats the steam that leaves the high-pressure cylinder to increase the temperature of the steam. The purpose of the reheat steam system is to improve the thermal efficiency of the Rankine cycle, and at the same time increase the dryness of the exhaust steam of the low-pressure cylinder, and avoid or reduce the water erosion of the last stage blade of the low-pressure cylinder.

The steam reheat process of the present invention is embodied in different forms for the different heat source systems involved in the present invention:
for a steam turbine power generation system of category a, it is a primary and secondary intermediate reheat system;
for a steam turbine power generation system of category b, it is a low-pressure heating system and an intermediate-pressure heating system in the HRSG system;
for a steam turbine power generation system of category c, it is a reheat system of a steam generator;
for a steam turbine power generation system of category d, it is a steam-water separation reheater.

For a traditional power plant, a large steam turbine power generation system with a reheat system is a very complex steam turbine cycle thermal system. It usually consists of a high-pressure cylinder, an intermediate-pressure cylinder, multiple low-pressure cylinders, a multi-stage regenerative steam extraction heater, a deaerator, and a shaft seal steam system. Its energy efficiency not only depends on the enthalpy drop efficiency of the high-pressure cylinder, intermediate-pressure cylinder and low-pressure cylinder, but also is related to the combined action of the entire steam turbine cycle thermal system composed of the reheat steam system and all levels of heaters in the reheat system. A simple and direct analysis method for the thermal efficiency of the entire steam turbine cycle has not been established. Therefore, the theoretical research of the cycle efficiency of the steam turbine is always complicated and difficult.

Nuclear generator sets were produced in the early 1950s, and all nuclear generator sets that were officially put into commercial operation were equipped with a steam-water separation reheater.

On the other hand, for small steam turbine power generation systems that can obtain superheated steam, such as trough solar thermal generator sets and tower solar thermal generator sets, their current capacity has reached 100 MW, the pressure of steam has reached subcritical or higher, and the temperature of main steam has reached 566° C. The intermediate reheat is still used, and the reheat steam temperature is still 566° C. For a solar thermal generator set, the reheat system is realized by a transducer.

Therefore, the use of steam reheat system to increase the temperature of reheat steam as much as possible has become the basic feature of large steam turbine power generation systems in traditional power plants, combined-cycle power plants, solar thermal power plants and nuclear power plants in the prior art.

Under the condition that superheated steam can be obtained, the reheat loop of the steam is established, and the temperature of the reheat steam is adjusted near the rate temperature of main steam through automatic control, i.e., the rate temperature of main steam (or higher) is directly used as a set value of the temperature of the reheat steam. This is called "intermediate reheat technology", which has become the global technical standard for large steam turbine generator sets with pressures above subcritical levels, and appears in the design standards, product specifications, operating regulations and various public documents of generator sets.

Increasing the pressure of steam is the most basic way to improve the efficiency of the Rankine cycle, because it can increase the number of impeller stages of the steam turbine and prolong the work process of the steam. Increasing the steam pressure parameter above the subcritical level is an important technical direction to reduce the energy consumption of generator sets. The steam turbine intermediate reheat technology, namely the reheat Rankine cycle, was produced in the 1920s when the steam parameter was only 2 MPa, and was widely adopted in the 1930s. With the increase the steam pressure parameter of steam turbines, intermediate reheat technology has become an important means of increasing the efficiency of large generator sets.

Therefore, in history, when a generator set with a higher steam pressure parameter was produced, it was equipped with a steam turbine intermediate reheat system. In a large generator set with a parameter of 300 MW above sub-critical level, the steam turbines are equipped with intermediate reheat, and many higher-capacity ultra-supercritical generator sets even adopt secondary reheat.

The small Rankine cycle involved in the present invention includes a variety of renewable energy steam turbine power generation systems, such as straw power plants, garbage power plants, geothermal power plants, seawater temperature difference power plants, and the like.

From a global perspective, although the total installed capacity of this small steam turbine power generation system is still small, the value of this small steam turbine power generation system lies in improving and protecting the global environment. For example, straw power plants and garbage power plants can remove a large amount of waste and maintain a clean and tidy global environment; geothermal power plants and seawater temperature difference power plants can use renewable energy to generate electricity without polluting the environment. Improving efficiency of this kind of small Rankine cycle can improve the economics of these power plants and benefit the development of these power plants.

In terms of the pressure of steam of the heat source system, the small Rankine cycle involved in the present invention is usually a low-pressure (less than 1 MPa) and intermediate-pressure (1.96-3.92 MPa) system, according to steam turbine design standards.

Heat source system of the small Rankine cycle involved in the present invention includes four different forms:

(e) Straw power plant: the heat released by burning straw is used to directly heat water to supply steam to the steam turbine.

(e) Garbage power plant: the heat released by burning domestic garbage is used to directly heat water to supply steam to the steam turbine.

(G) Geothermal power plant: it provides water steam or a low-boiling-working medium steam to the steam turbine through the flash vaporization or heat exchange of the thermal energy of geothermal resources.

(H) Seawater temperature difference power plant: it provides a low-boiling-working medium steam to the steam turbine through heat exchange with a low boiling point medium, by extracting high-temperature seawater and low-temperature seawater.

It is believed in the prior art that maintaining the temperature of main steam at the rated value is beneficial to improve the thermal efficiency of the Rankine cycle. The purpose of the increasing the temperature of main steam is to improve the thermal efficiency of the Rankine cycle, and at the same time increase the dryness of the exhaust steam of the low-pressure cylinder, and avoid or reduce the water erosion of the last stage blade of the low-pressure cylinder.

At present, the energy-saving analysis methods for Rankine cycle mainly include: conventional heat balance method, equivalent enthalpy drop method, matrix method, exergy analysis method, circulation function method, etc. These existing analysis methods for the thermal efficiency of the Rankine cycle are basically the analysis and judgment of the thermal efficiency of the Rankine cycle under the assumption that the flow rate of main steam remains unchanged. Increasing the temperature of reheat steam is consistent with many theories about increasing the work efficiency of the steam turbine. For example, the increase of the steam endothermic temperature after increasing the reheat temperature, the increase of the steam endothermic temperature after increasing the temperature of main steam, the increase of enthalpy value of steam, the increase of volume flow rate of steam or the increase of movement speed of steam, can improve the working conditions of steam, and improve the work efficiency of the intermediate-pressure cylinder and low-pressure cylinder. Thus, this theoretical concept is generally considered reasonable by the industry.

However, the existing theories are all based on the assumption that the flow rate of main steam remains unchanged. Since the generated power is a set value during the operation of the generator set, after changing the reheat temperature, the flow rate of main steam of the steam turbine will inevitably change. Therefore, the conclusions drawn through the existing analysis methods for the thermal efficiency of the Rankine cycle are incorrect.

SUMMARY

In order to solve the above technical problems existing in the prior art, the invention provides a method for improving the efficiency of a large Rankine cycle. The Rankine cycle includes a heat source system, a steam turbine cycle system, and a cold end system, wherein, the steam turbine cycle system includes a main steam system, a steam turbine system, a reheat steam system, and a shaft sealing steam system, wherein, the steam turbine system includes a high-pressure cylinder, and the method includes:

adjusting an equipment state or operating condition of the heat source system or the steam turbine cycle system to reduce heat absorption of the reheater, so that the temperature of steam entering a steam turbine subsequent to the high-pressure cylinder is lower than the rated temperature of reheat steam to reduce cold end loss, thereby improving the cycle thermal efficiency of the steam turbine.

The invention also provides a method for improving the efficiency of a small Rankine cycle. The Rankine cycle includes a heat source system, a steam turbine cycle system, and a cold end system, wherein, the steam turbine cycle system includes a main steam system, a steam turbine system, a regenerative steam extraction system, a shaft sealing steam system, wherein the working medium of steam turbine may be steam or another low boiling point medium, wherein, the steam turbine system includes a high-pressure cylinder, and the method includes:

adjusting the equipment state or operating condition of the heat source system or the steam turbine cycle system, reducing the enthalpy value of main steam, and increasing the proportion of regenerative extracted steam to reduce cold end loss, thereby increasing the cycle thermal efficiency of the steam turbine.

DETAILED DESCRIPTION

Figure 1:
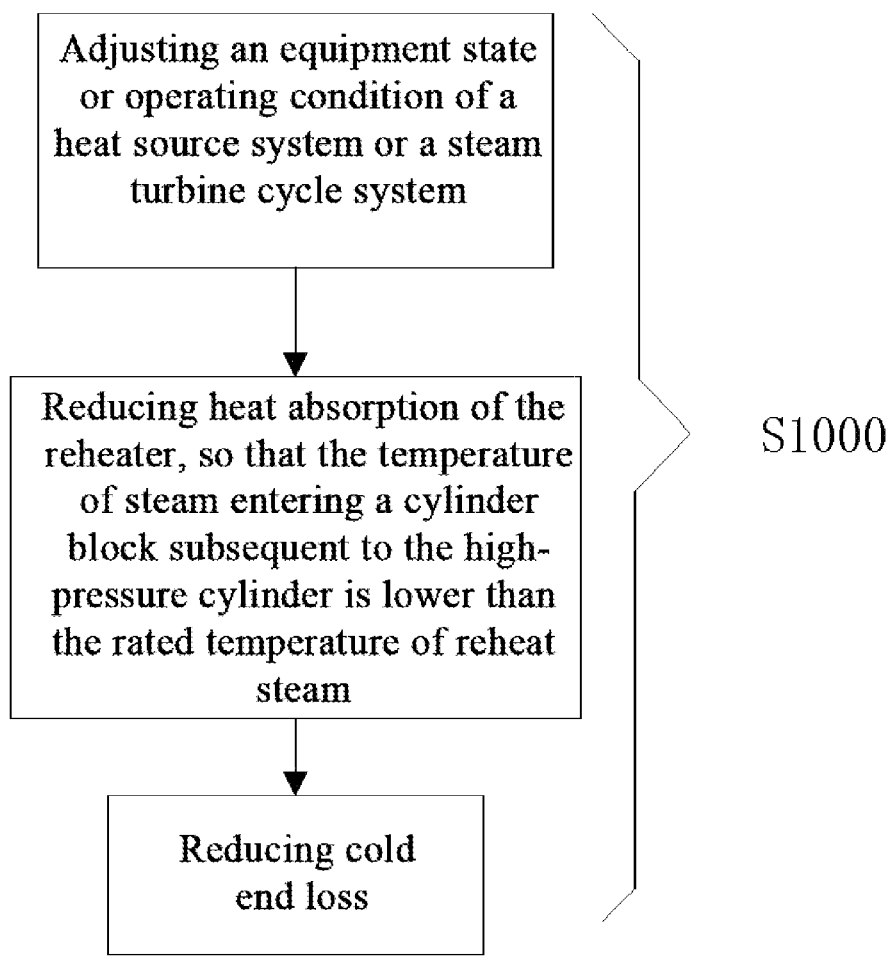
FIG. 1 is a schematic flowchart of a method for improving the efficiency of a large Rankine cycle according to Embodiment 1 of the present invention.

In the following description, for the purpose of illustration rather than limitation, specific details of a specific system structure, an interface, technology and the like are proposed for a thorough understanding of the present invention. However, those skilled in the art should understand that the present invention can also be implemented in other embodiments without these specific details. In other cases, detailed descriptions of well-known system structures, interfaces, and technologies are omitted so as not to obscure the description of the present invention with unnecessary details.

Heat source systems of various large steam turbine generator sets or heat source systems of various small steam turbine generator sets are different from the steam turbine cycle. In this description, the heat source system of a coal-fired boiler, a steam turbine cycle system of an intermediate reheat system and a single-cylinder steam turbine cycle system with a regenerative steam extraction system are used as representative conditions to explain the relevant technical background and the present invention.

The heat source system of the coal-fired boiler of a large steam turbine generator set consists of the following components: an evaporator formed by a furnace, a water-cooled wall, etc.; a superheater that continues to heat the evaporated main steam to such a temperature that the pressure of the main steam exceeds a critical pressure; a reheat steam system composed of a low-temperature reheater and a high-temperature reheater; an economizer that preliminarily heats the feed water entering the heat source system, and so on. The heat source system of the coal-fired boiler of a small steam turbine generator set consists of the following components: an evaporator formed by a furnace, a water-cooled wall, etc.; a superheater that continues to heat the evaporated main steam to such a temperature that the pressure of the main steam exceeds a critical pressure; a regenerative system that heats the feed water by extracting steam from a steam turbine cylinder block; an economizer that preliminarily heats the feed water entering the heat source system, and so on. In addition to the heat source system, the steam turbine cycle system, and a cold end system, a coal-fired boiler set is usually equipped with a flue gas treatment system.

After ten years, the inventor has designed and compiled computer simulation system computer software that simulates the thermodynamic performance of the boiler system, steam turbine system, cold end system and DCS system of a real generator set, and has performed a large number of simulation calculations on the power generation process instead of field tests for main steam temperature and conducted a long-term in-depth theoretical study. It has been found that controlling the main steam temperature of a small steam turbine generator set according to a rated temperature or controlling the reheat steam temperature of a large steam turbine generator set according to the same temperature standard with the main steam temperature is a common misunderstanding and technical bias.

In fact, the working process of a steam turbine is a process of converting thermal energy of steam into mechanical energy of a rotor of the steam turbine by steam impinging on the rotor of the turbine. This is completely a mechanical process on which mechanical motion calculations can be performed, and is a different and unrelated concept when compared with the Carnot-cycle or heat transfer process in thermodynamics. In this process, the problem is how to reduce the energy of the exhaust steam of a low-pressure cylinder, i.e., the cold end loss. The cold end loss mainly depends on the pressure, humidity and flow rate of the steam discharged from the low-pressure cylinder. In short, since the work efficiency of the regenerative extracted steam is 100%, the direct and effective way to improve the efficiency of the Rankine cycle is to strengthen the heat regeneration.

Figure 34:
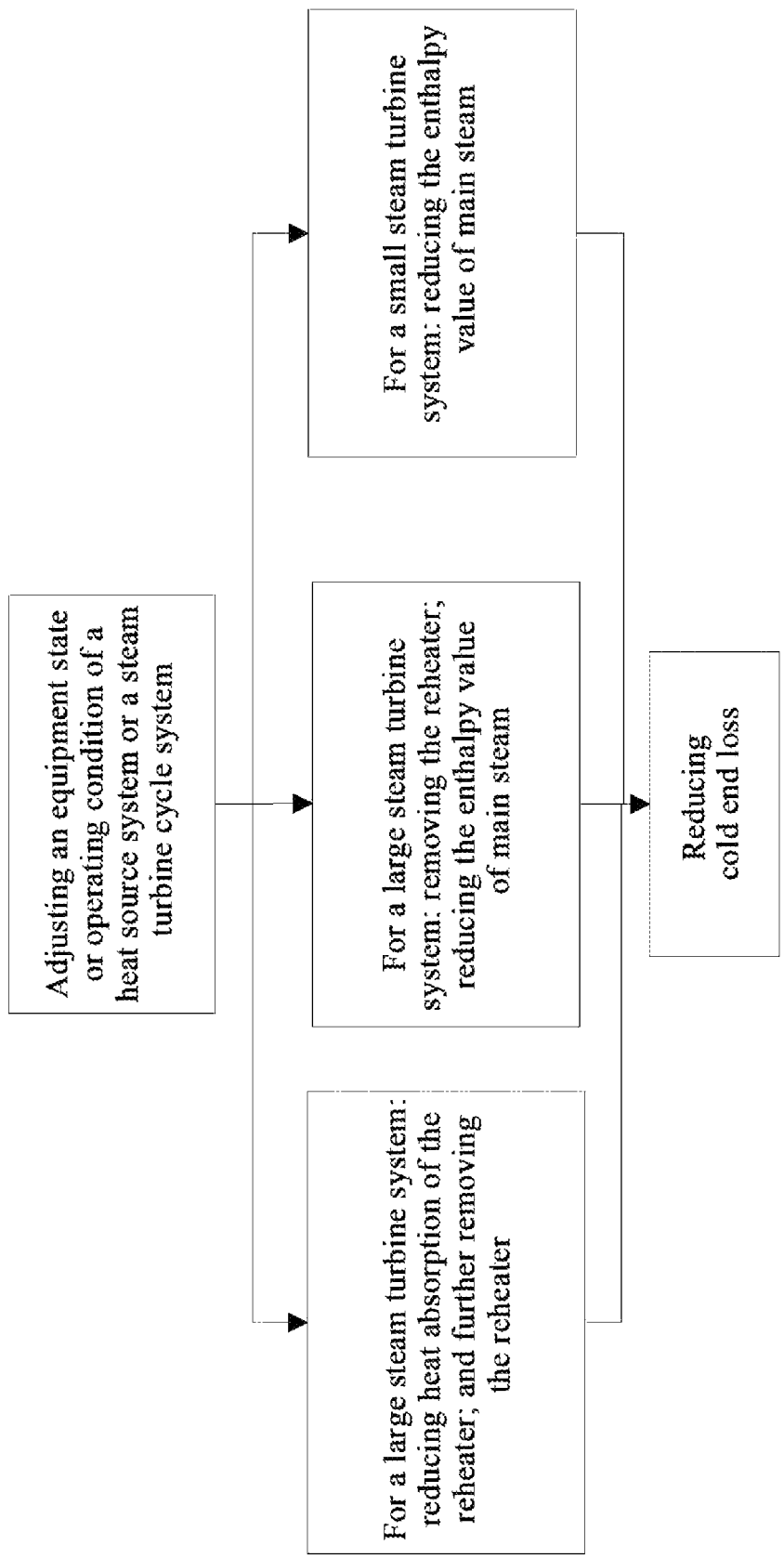
FIG. 34 is a technical roadmap of a method for improving the efficiency of a large Rankine cycle and a small Rankine cycle according to the present invention.
Figure 35:
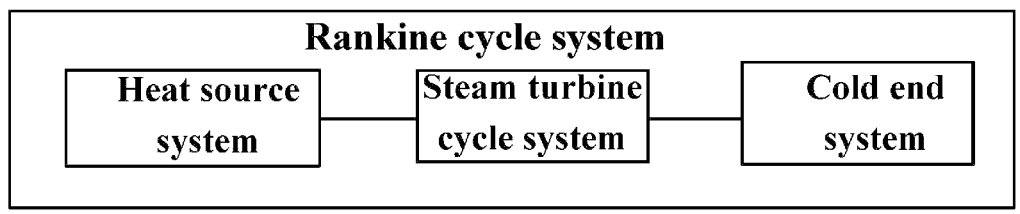
FIG. 35 is a structural schematic diagram of a Rankine cycle system in the prior art.

FIG. 34 is a technical roadmap of a method for improving the efficiency of a large Rankine cycle and a small Rankine cycle according to the present invention. Reducing the cold end loss is the core technical means of the present invention to improve the efficiency of a large Rankine cycle power generation or to improve the efficiency of a small Rankine cycle power generation. Therefore, reducing the cold end loss is a technical feature that contributes to the existing technology. A method for improving the efficiency of a large Rankine cycle and a method for improving the efficiency of a small Rankine cycle both have the specific technical feature of reducing cold end loss, and both belong to a general inventive concept. Therefore, the method for improving the efficiency of a large Rankine cycle and the method for improving the efficiency of a small Rankine cycle of the present invention possesses the unity under Article 31, paragraph 1, of the Chinese Patent Law.

Embodiments 1 to Embodiment 21 provide a method for improving the efficiency of a large Rankine cycle.

Embodiment 1

The embodiment of the present invention provides a method for improving the efficiency of a large Rankine cycle.

Refer to FIG. 1, which is a schematic flowchart of a method for improving the efficiency of a large Rankine cycle according to Embodiment 1 of the present invention.

In the method for improving the efficiency of a large Rankine cycle as shown in FIG. 1, the Rankine cycle includes a heat source system, a steam turbine cycle system, and a cold end system. Wherein, the steam turbine cycle system includes a main steam system, a steam turbine system, a reheat steam system, and a shaft sealing steam system, wherein, the reheat steam system includes a reheater, and the steam turbine system includes a high-pressure cylinder. The method includes:

S1000: adjusting the equipment state or operating condition of the heat source system or the steam turbine cycle system to reduce heat absorption of the reheater, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 2

The embodiment of the present invention provides a method for improving the efficiency of a large Rankine cycle.

Figure 2:
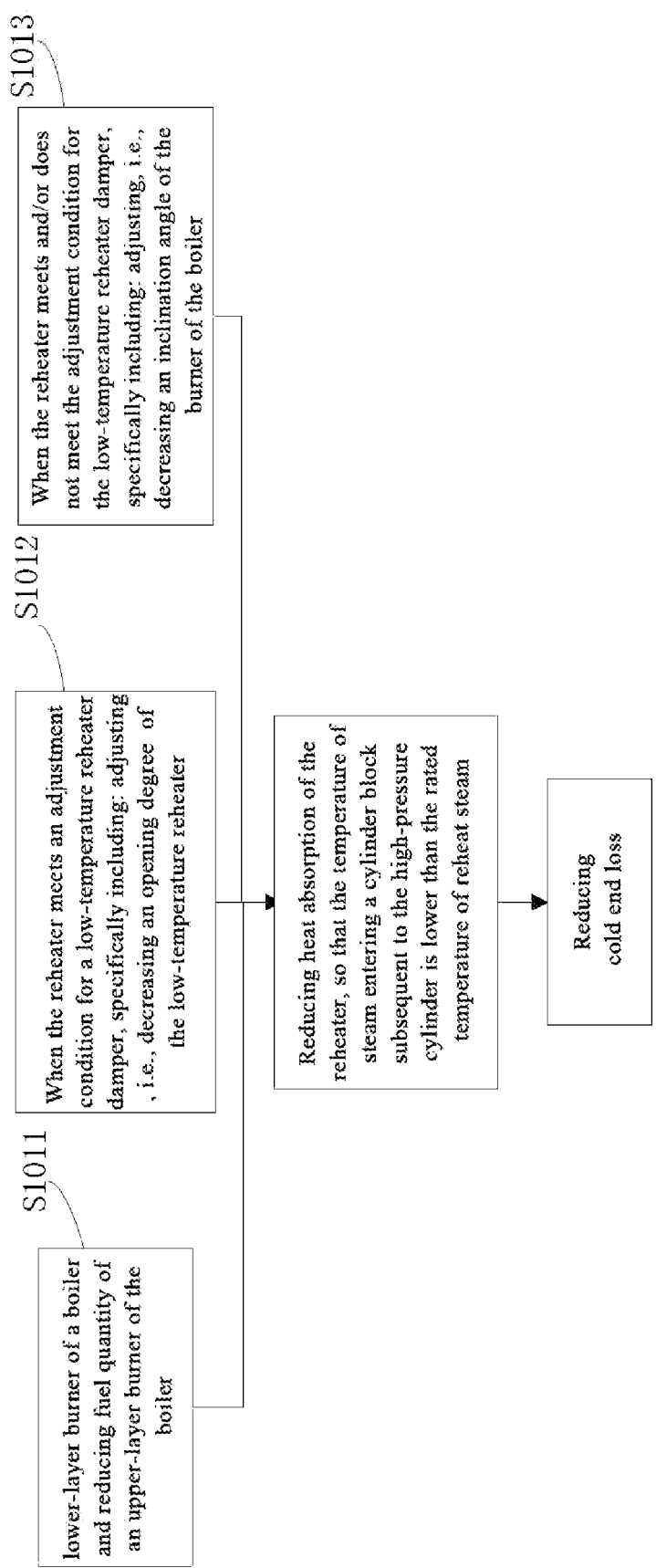
FIG. 2 is a schematic flowchart of a method for improving the efficiency of a large Rankine cycle according to Embodiment 2 of the present invention.

As shown in FIG. 2, on the basis of Embodiment 1, for a traditional power plant, the method includes:

S1011: adjusting the fuel quantity and output of a burner of each relevant layer, specifically as follows: increasing the fuel quantity of a lower-layer burner of a boiler and reducing the fuel quantity of an upper-layer burner of the boiler; or, S1012: when the reheater meets an adjustment condition for a low-temperature reheater damper, specifically including: adjusting, i.e., decreasing an opening degree of the low-temperature reheater; or, S1013: when the reheater meets and/or does not meet the adjustment condition for the low-temperature reheater damper, specifically including: adjusting, i.e., decreasing the inclination angle of the burner of the boiler.

The purpose of the above adjustment is to reduce the combustion center of the boiler, which will increase the evaporation of steam and reduce heat absorption of the reheater, so that the temperature of steam entering a steam turbine subsequent to the high-pressure cylinder is lower than the rated temperature of reheat steam to reduce the cold end loss, thereby improving the cycle thermal efficiency of the steam turbine.

Embodiment 3

The embodiment of the present invention provides a method for improving the efficiency of a large Rankine cycle.

Figure 3:
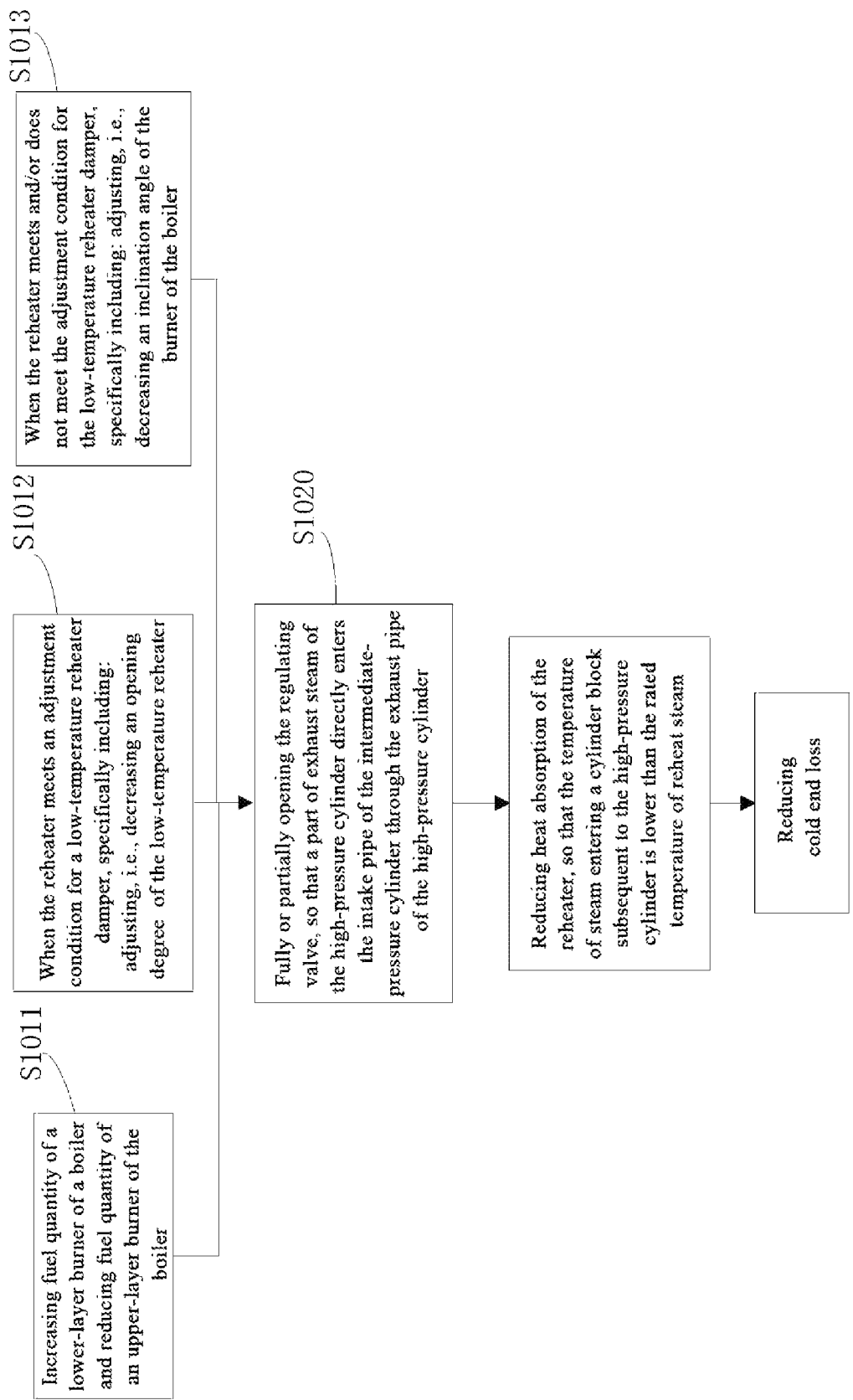
FIG. 3 is a schematic flowchart of a method for improving the efficiency of a large Rankine cycle according to Embodiment 3 of the present invention.

As shown in FIG. 3, on the basis of Embodiment 2, for a traditional power plant, when the steam turbine system further includes an intermediate-pressure cylinder, and a reheat steam bypass pipe is provided between an exhaust pipe of the high-pressure cylinder and an intake pipe of the intermediate-pressure cylinder, and a regulating valve is provided in the reheat steam bypass pipe, the method includes:

S1011: adjusting the fuel quantity and output of a burner of each relevant layer, specifically as follows: increasing fuel quantity of a lower-layer burner of a boiler and reducing fuel quantity of an upper-layer burner of the boiler; or, S1012: when the reheater meets an adjustment condition for a low-temperature reheater damper, specifically including: adjusting, i.e., decreasing an opening degree of the low-temperature reheater damper; or, S1013: when the reheater meets and/or does not meet the adjustment condition for the low-temperature reheater damper, specifically including: adjusting, i.e., decreasing the inclination angle of the burner of the boiler;

S1020: fully or partially opening the regulating valve, so that a part of exhaust steam of the high-pressure cylinder directly enters the intake pipe of the intermediate-pressure cylinder through the exhaust pipe of the high-pressure cylinder.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 4

The embodiment of the present invention provides a method for improving the efficiency of a large Rankine cycle.

Figure 4:
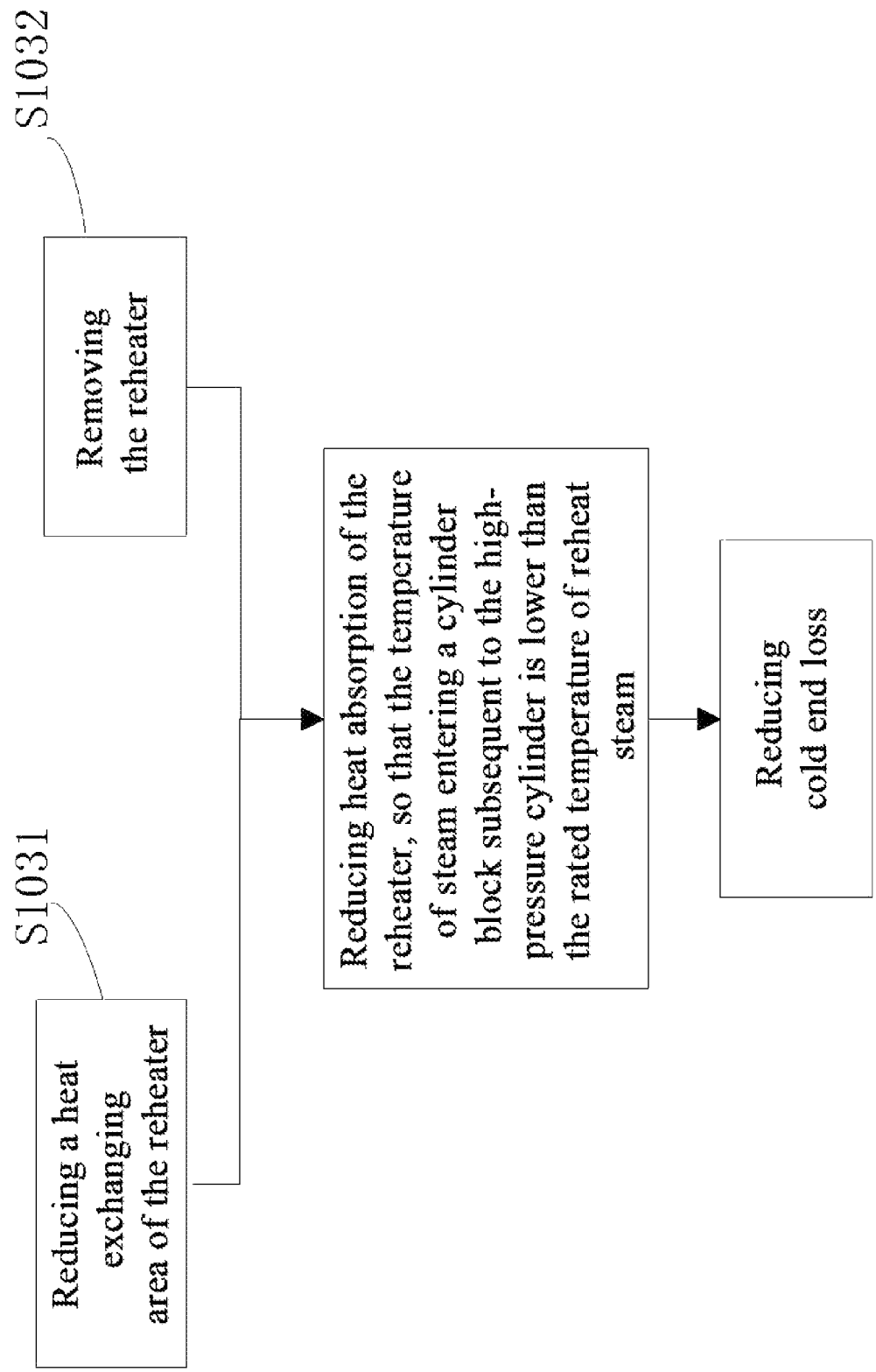
FIG. 4 is a schematic flowchart of a method for improving the efficiency of a large Rankine cycle according to Embodiment 4 of the present invention.

As shown in FIG. 4, on the basis of Embodiment 1, for a traditional power plant, the method includes:

S1031: reducing the heat exchanging area of the reheater; or,

S1032: removing the reheater.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 5

The embodiment of the present invention provides a method for improving the efficiency of a large Rankine cycle.

Figure 5:
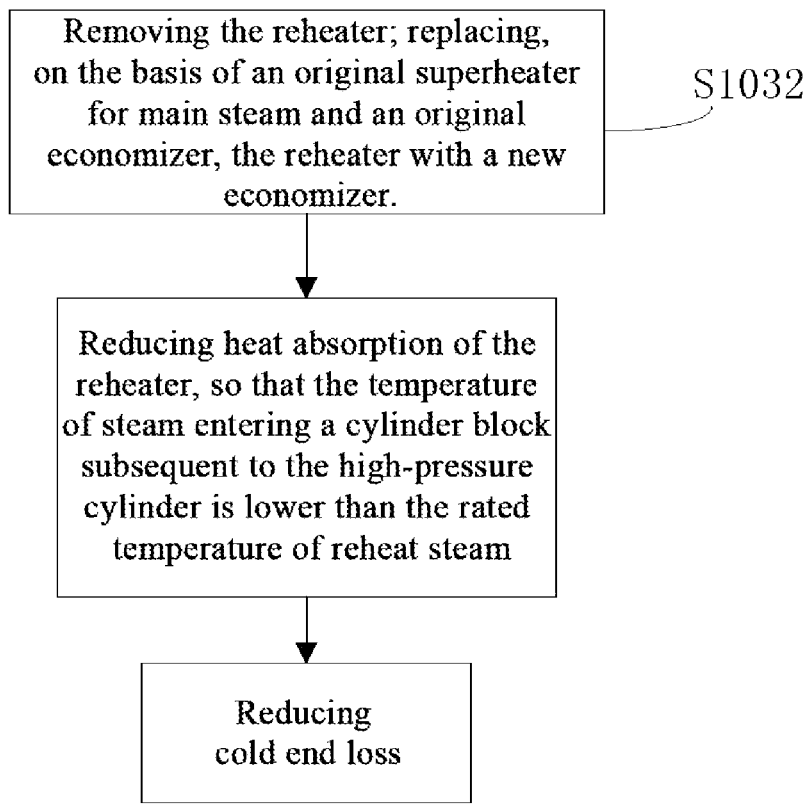
FIG. 5 is a schematic flowchart of a method for improving the efficiency of a large Rankine cycle according to Embodiment 5 of the present invention.

As shown in FIG. 5, on the basis of Embodiment 4, the method includes:

S1032: removing the reheater; replacing, on the basis of an original superheater for main steam and an original economizer, the reheater with a new economizer.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 6

The embodiment of the present invention provides a method for improving the efficiency of a large Rankine cycle.

Figure 6:
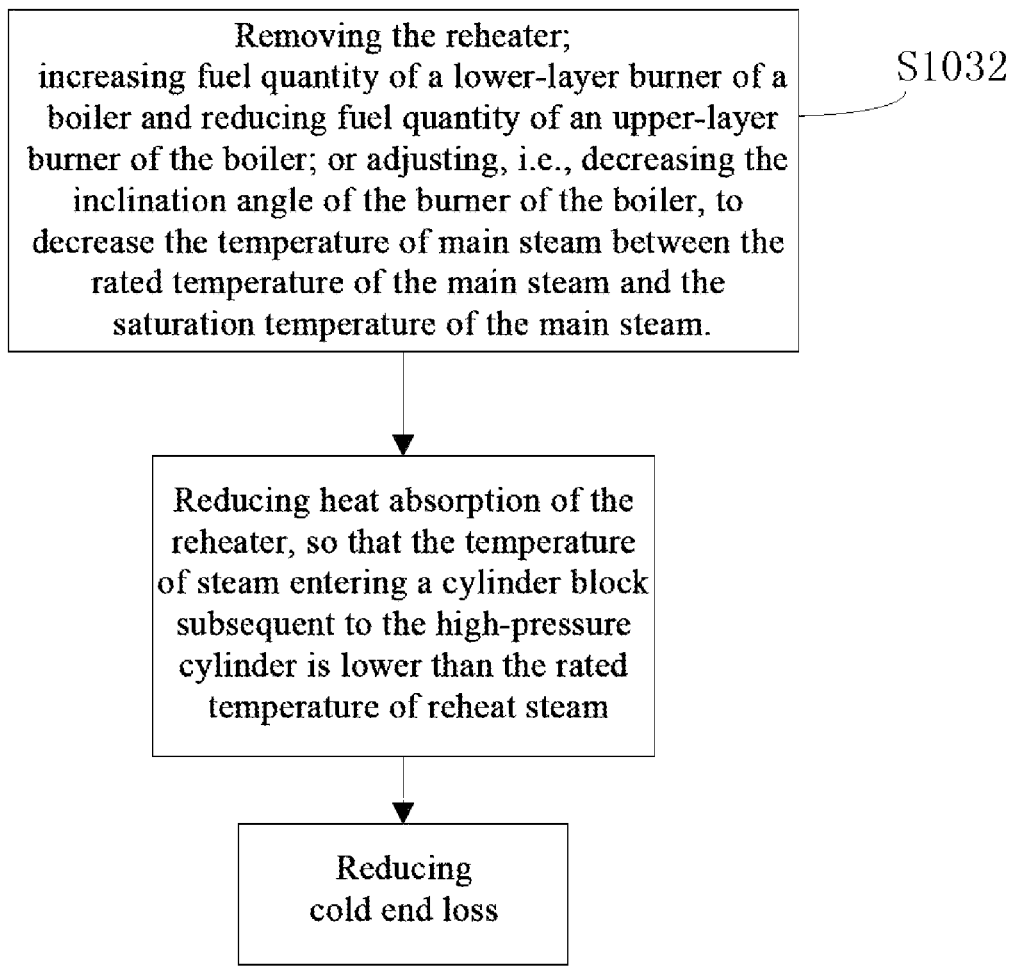
FIG. 6 is a schematic flowchart of a method for improving the efficiency of a large Rankine cycle according to Embodiment 6 of the present invention.

As shown in FIG. 6, on the basis of Embodiment 4, for a traditional power plant with a regenerative steam extraction system, the method includes:

S1032: removing the reheater; increasing fuel quantity of a lower-layer burner of a boiler and reducing fuel quantity of an upper-layer burner of the boiler; or adjusting, i.e., decreasing the inclination angle of the burner of the boiler, to decrease the temperature of main steam between the rated temperature of the main steam and the saturation temperature of the main steam.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 7

The embodiment of the present invention provides a method for improving the efficiency of a large Rankine cycle.

Figure 7:
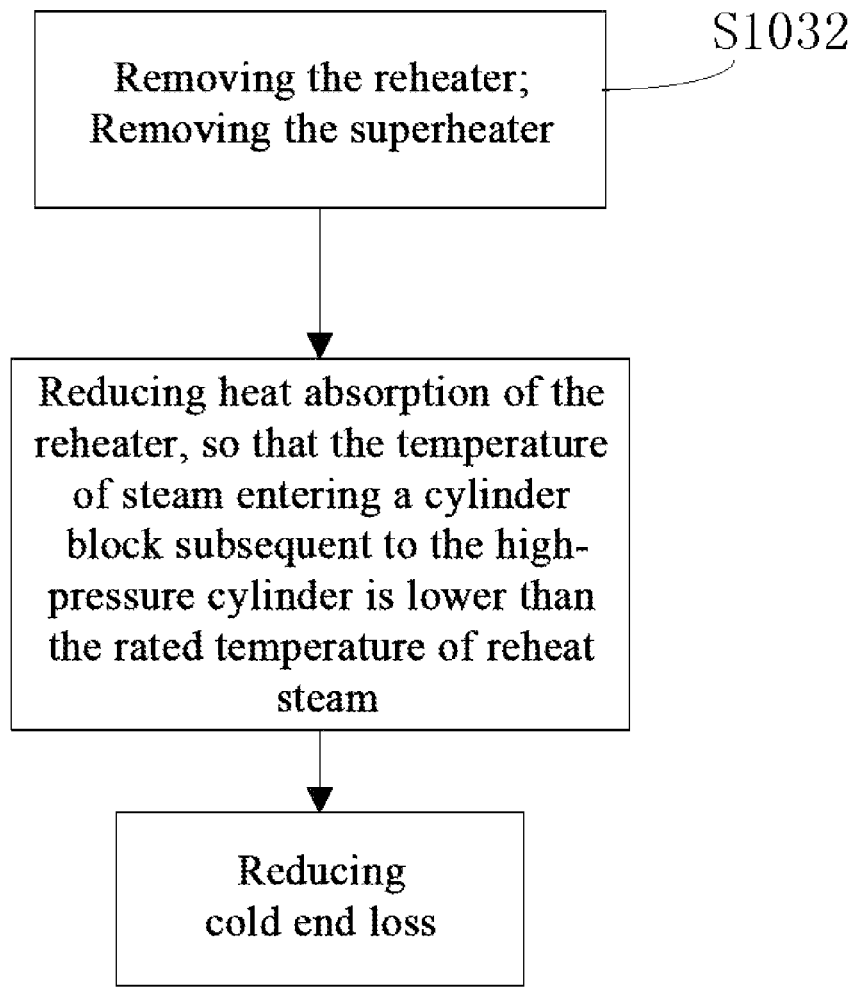
FIG. 7 is a schematic flowchart of a method for improving the efficiency of a large Rankine cycle according to Embodiment 7 of the present invention.

As shown in FIG. 7, on the basis of Embodiment 4, the method includes:

S1032: removing the reheater; and removing the superheater.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 8

The embodiment of the present invention provides a method for improving the efficiency of a large Rankine cycle.

Figure 8:
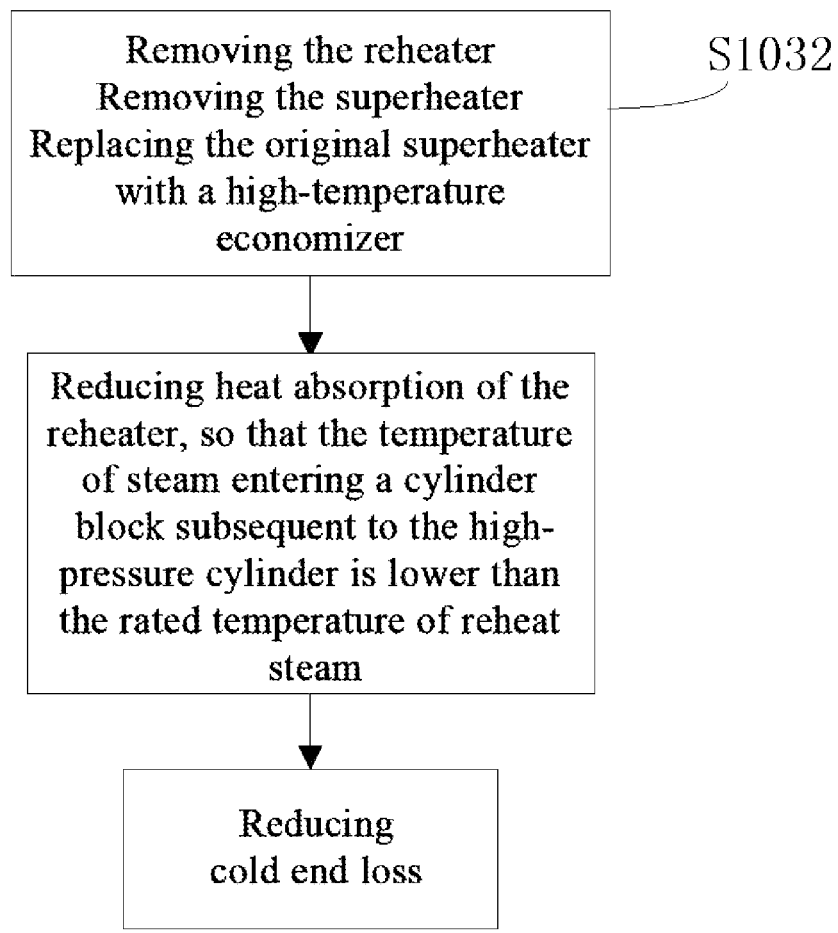
FIG. 8 is a schematic flowchart of a method for improving the efficiency of a large Rankine cycle according to Embodiment 8 of the present invention.

As shown in FIG. 8, on the basis of Embodiment 7, the method includes:

S1032: removing the reheater; removing the superheater; and replacing the original superheater with a high-temperature economizer.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 9

The embodiment of the present invention provides a method for improving the efficiency of a large Rankine cycle.

Figure 9:
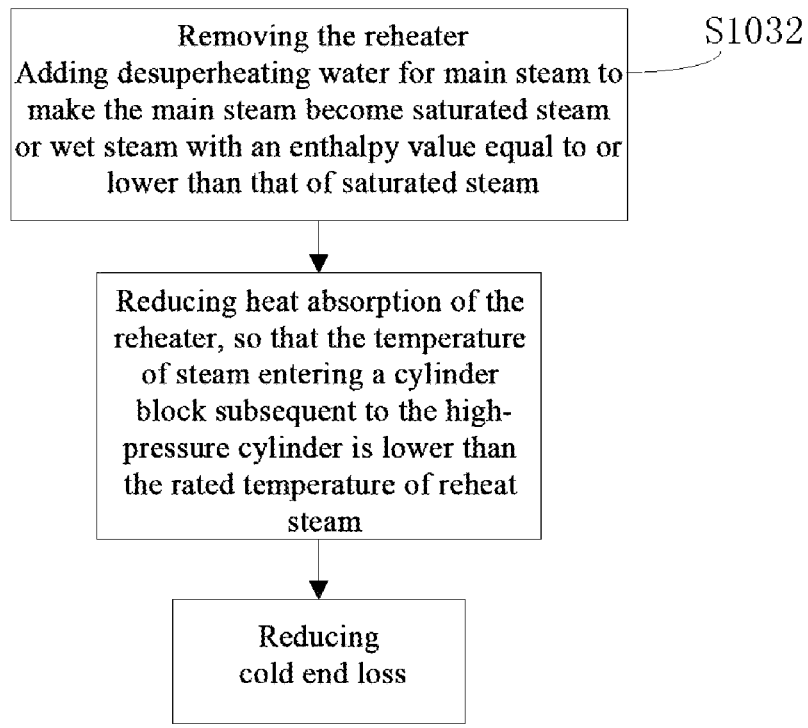
FIG. 9 is a schematic flowchart of a method for improving the efficiency of a large Rankine cycle according to Embodiment 9 of the present invention.

As shown in FIG. 9, on the basis of Embodiment 7, the method includes:

S1032: removing the reheater; adding desuperheating water for main steam to make the main steam become saturated steam or wet steam with an enthalpy value equal to or lower than that of saturated steam.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 10

The embodiment of the present invention provides a method for improving the efficiency of a large Rankine cycle.

Figure 10:
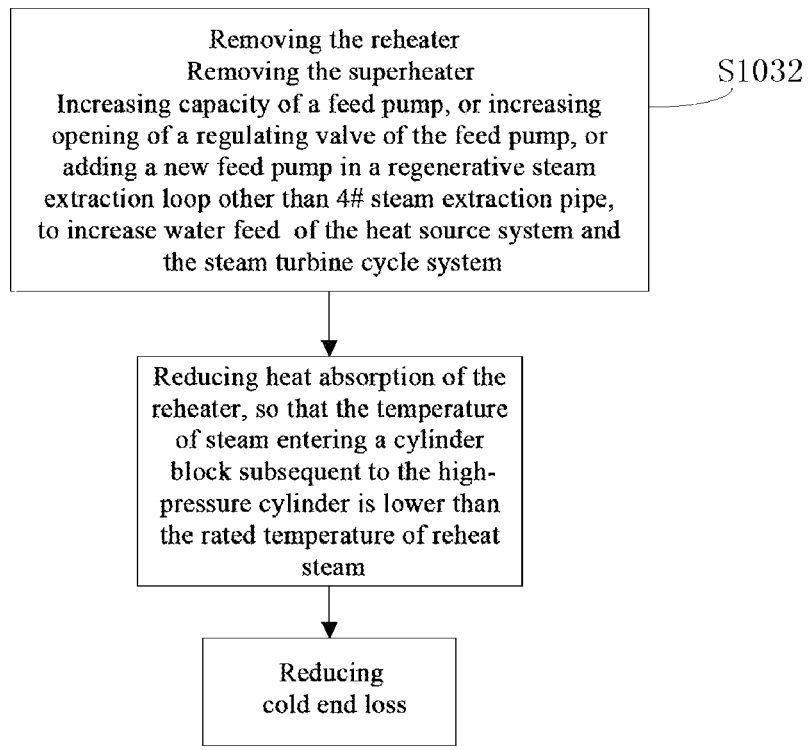
FIG. 10 is a schematic flowchart of a method for improving the efficiency of a large Rankine cycle according to Embodiment 10 of the present invention.

As shown in FIG. 10, on the basis of Embodiment 7, the method includes:

S1032: removing the reheater; removing the superheater; increasing capacity of a feed pump, or increasing the opening of a regulating valve of the feed pump, or adding a new feed pump in a regenerative steam extraction loop other than 4 #steam extraction pipe, to increase water feed of the heat source system and the steam turbine cycle system.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

The 4 #steam extraction pipe is a pipe configured to drive the feed pump in a steam turbine power generation system. The regenerative steam extraction loop other than the 4 #steam extraction pipe can be a 5 #steam extraction pipe, a 6 #steam extraction pipe or another steam extraction pipe.

Embodiment 11

The embodiment of the present invention provides a method for improving the efficiency of a large Rankine cycle.

Figure 11:
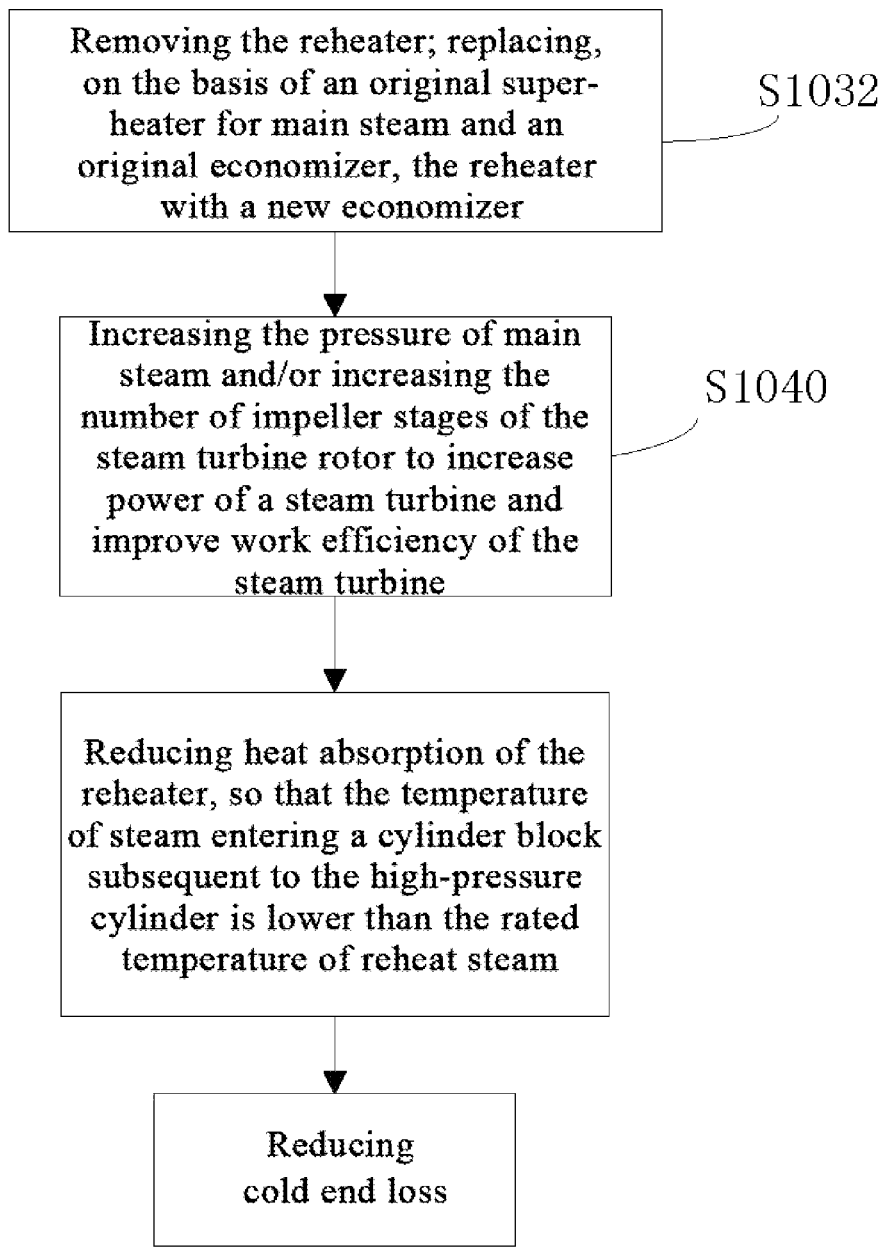
FIG. 11 is a schematic flowchart of a method for improving the efficiency of a large Rankine cycle according to Embodiment 11 of the present invention.

As shown in FIG. 11, on the basis of Embodiment 5, the method includes:

S1032: removing the reheater; replacing, on the basis of an original superheater for main steam and an original economizer, the reheater with a new economizer;

S1040: increasing the pressure of main steam and/or increasing the number of impeller stages of a rotor of a steam turbine to increase the power of the steam turbine and improve the work efficiency of a steam turbine.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 12

The embodiment of the present invention provides a method for improving the efficiency of a large Rankine cycle.

Figure 12:
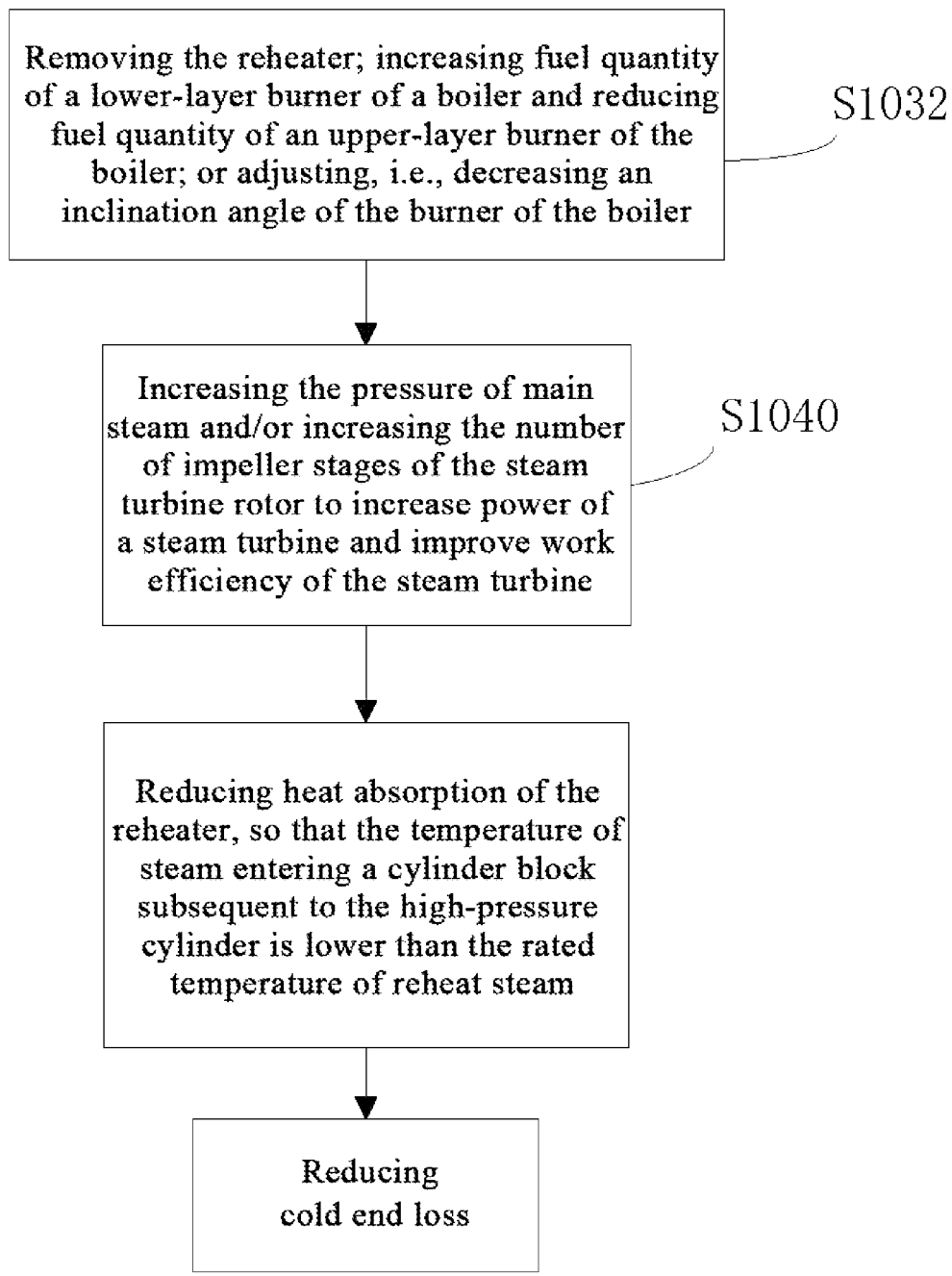
FIG. 12 is a schematic flowchart of a method for improving the efficiency of a large Rankine cycle according to Embodiment 12 of the present invention.

As shown in FIG. 12, on the basis of Embodiment 6, the method includes:

S1032: removing the reheater; increasing fuel quantity of a lower-layer burner of a boiler and reducing fuel quantity of an upper-layer burner of the boiler; or adjusting, i.e., decreasing the inclination angle of the burner of the boiler, to decrease the temperature of main steam between the rated temperature of the main steam and the saturation temperature of the main steam.

S1040: increasing the pressure of main steam and/or increasing the number of impeller stages of a rotor of the steam turbine to increase the power of a steam turbine and improve the work efficiency of a steam turbine.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 13

The embodiment of the present invention provides a method for improving the efficiency of a large Rankine cycle.

Figure 13:
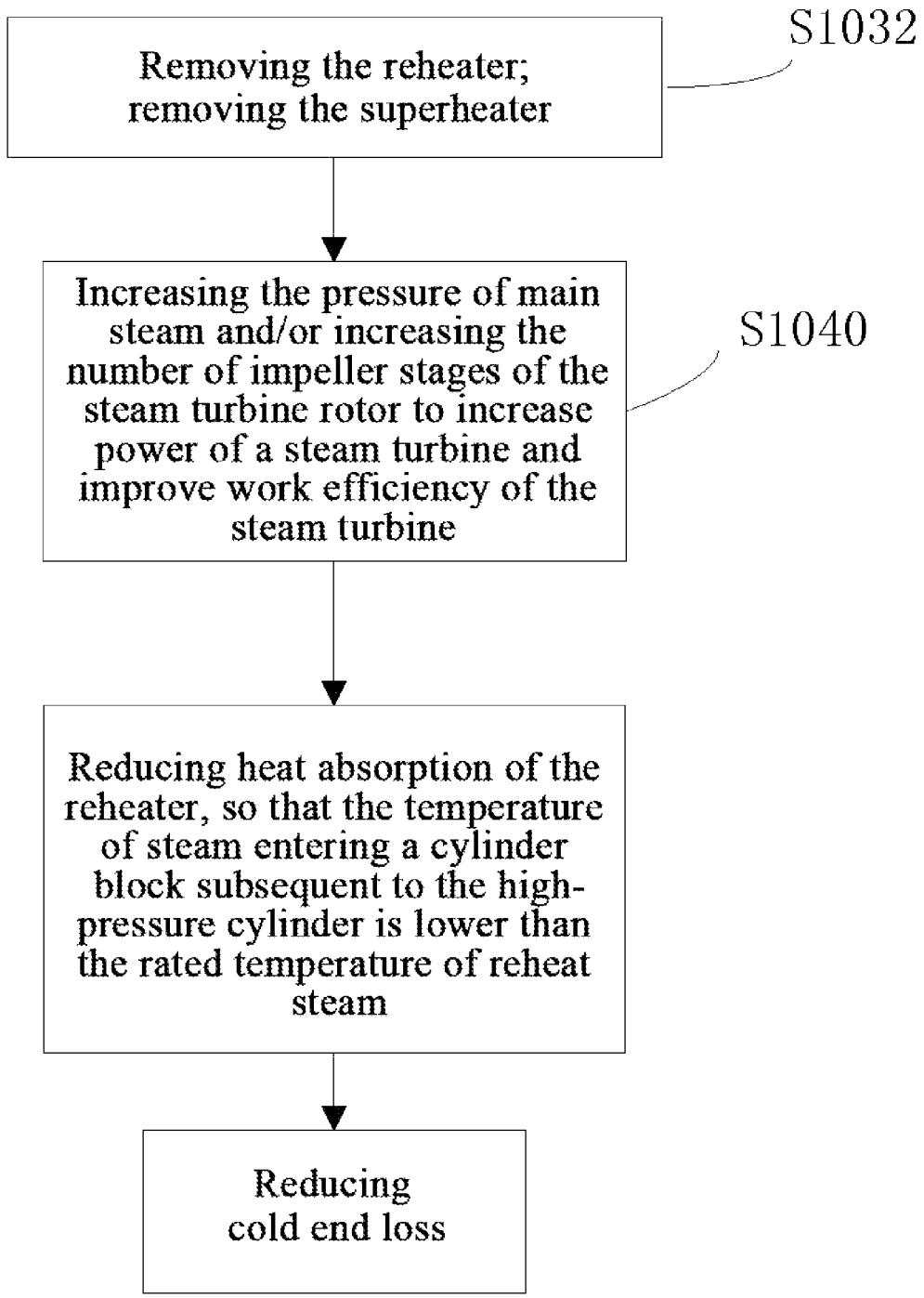
FIG. 13 is a schematic flowchart of a method for improving the efficiency of a large Rankine cycle according to Embodiment 13 of the present invention.

As shown in FIG. 13, on the basis of Embodiment 7, the method includes:

S1032: removing the reheater; and removing the superheater.

S1040: increasing the pressure of main steam and/or increasing the number of impeller stages of a rotor of the steam turbine to increase the power of a steam turbine and improve the work efficiency of the steam turbine;

Heat absorption of the reheater is reduced, so that the temperature of steam entering a steam turbine subsequent to the high-pressure cylinder is lower than the rated temperature for the reheat steam.

Embodiment 14

The embodiment of the present invention provides a method for improving the efficiency of a large Rankine cycle.

Figure 14:
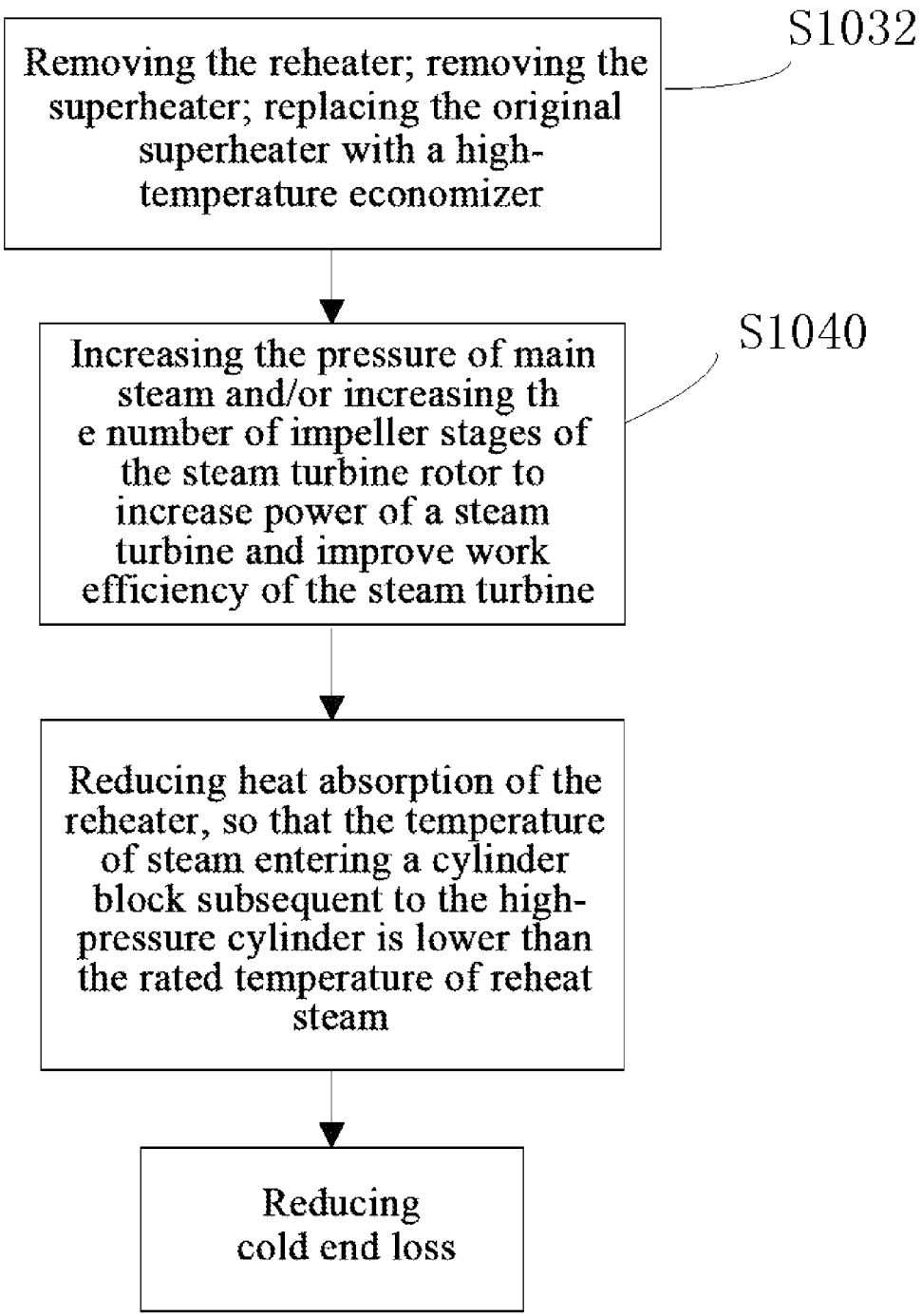
FIG. 14 is a schematic flowchart of a method for improving the efficiency of a large Rankine cycle according to Embodiment 14 of the present invention.

As shown in FIG. 14, on the basis of Embodiment 8, the method includes:

S1032: removing the reheater; removing the superheater; replacing the original superheater with a high-temperature economizer;

S1040: increasing the pressure of main steam and/or increasing the number of impeller stages of a rotor of the steam turbine to increase the power of a steam turbine and improve the work efficiency of the steam turbine.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 15

The embodiment of the present invention provides a method for improving the efficiency of a large Rankine cycle.

Figure 15:
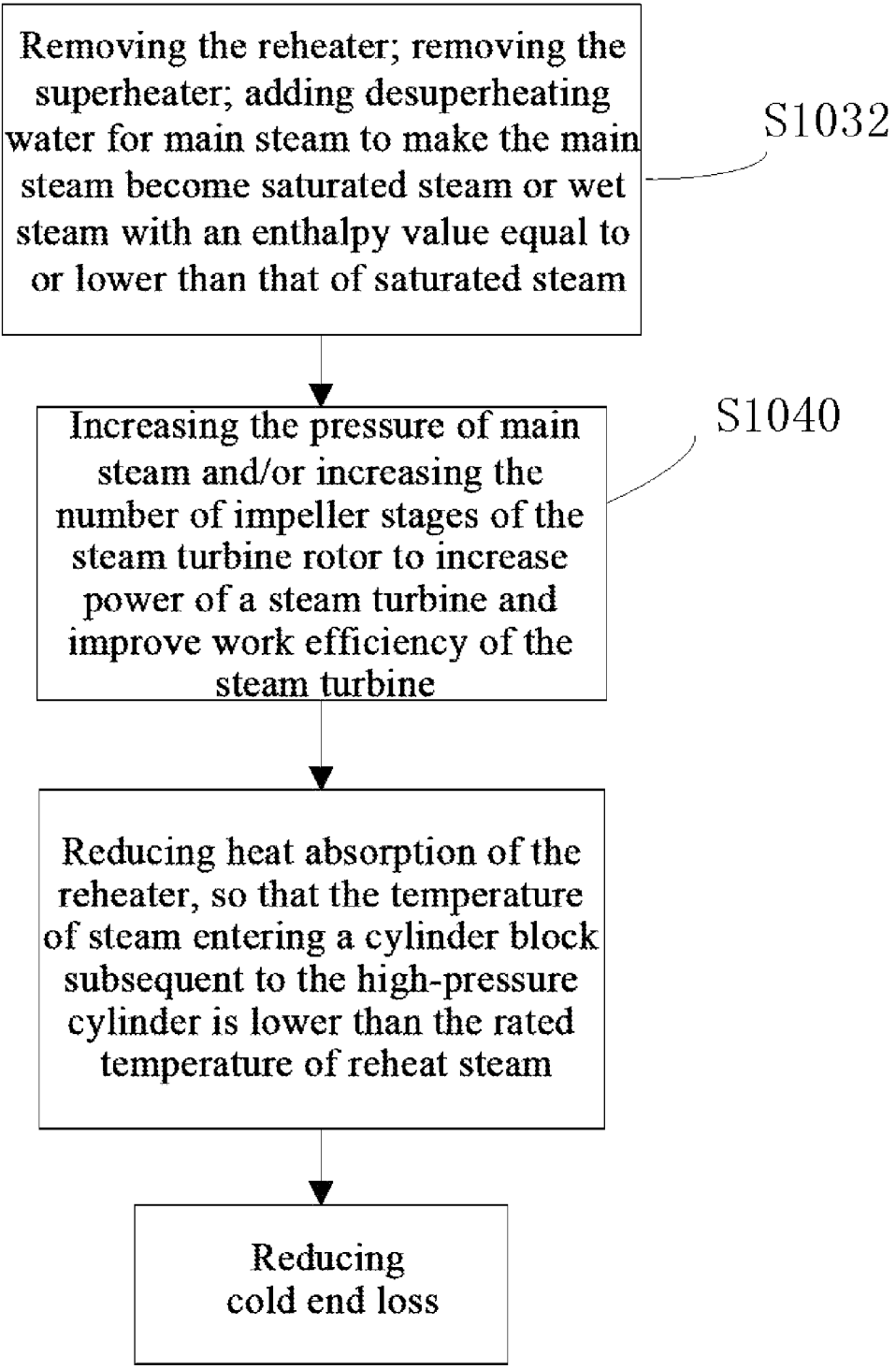
FIG. 15 is a schematic flowchart of a method for improving the efficiency of a large Rankine cycle according to Embodiment 15 of the present invention.

As shown in FIG. 15, on the basis of Embodiment 9, the method includes:

S1032: removing the reheater; removing the superheater; and adding desuperheating water for main steam to make the main steam become saturated steam or wet steam with an enthalpy value equal to or lower than that of saturated steam;

S1040: increasing the pressure of main steam and/or increasing the number of impeller stages of a rotor of the steam turbine to increase the power of a steam turbine and improve the work efficiency of the steam turbine.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 16

The embodiment of the present invention provides a method for improving the efficiency of a large Rankine cycle.

Figure 16:
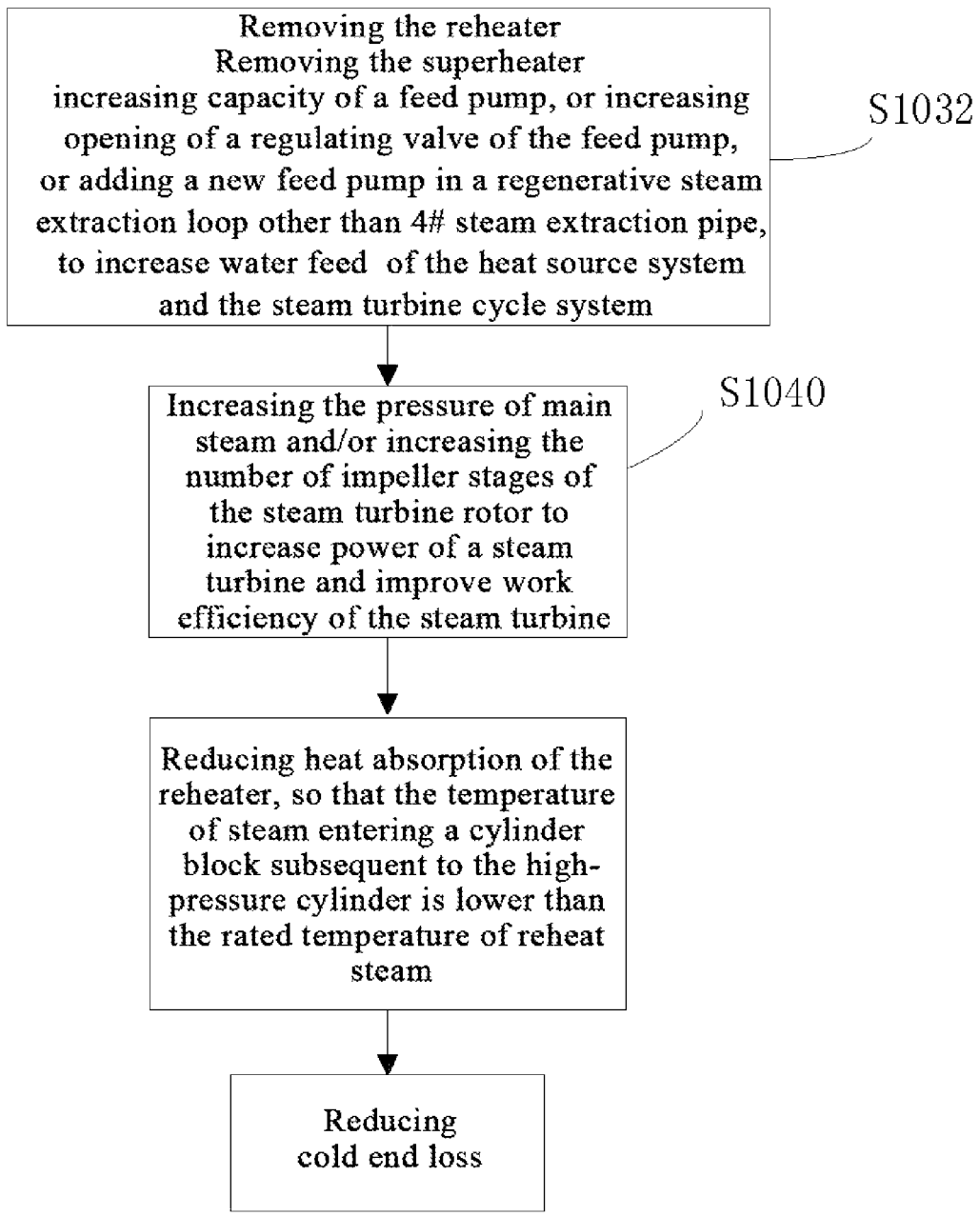
FIG. 16 is a schematic flowchart of a method for improving the efficiency of a large Rankine cycle according to Embodiment 16 of the present invention.

As shown in FIG. 16, on the basis of Embodiment 10, the method includes:

S1032: removing the reheater; removing the superheater; and increasing capacity of a feed pump, or increasing the opening of a regulating valve of the feed pump, or adding a new feed pump in a regenerative steam extraction loop other than 4 #steam extraction pipe, to increase water feed of the heat source system and the steam turbine cycle system;

S1040: increasing the pressure of main steam and/or increasing the number of impeller stages of a rotor of the steam turbine to increase the power of a steam turbine and improve the work efficiency of the steam turbine.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 17

The embodiment of the present invention provides a method for improving the efficiency of a large Rankine cycle.

Figure 17:
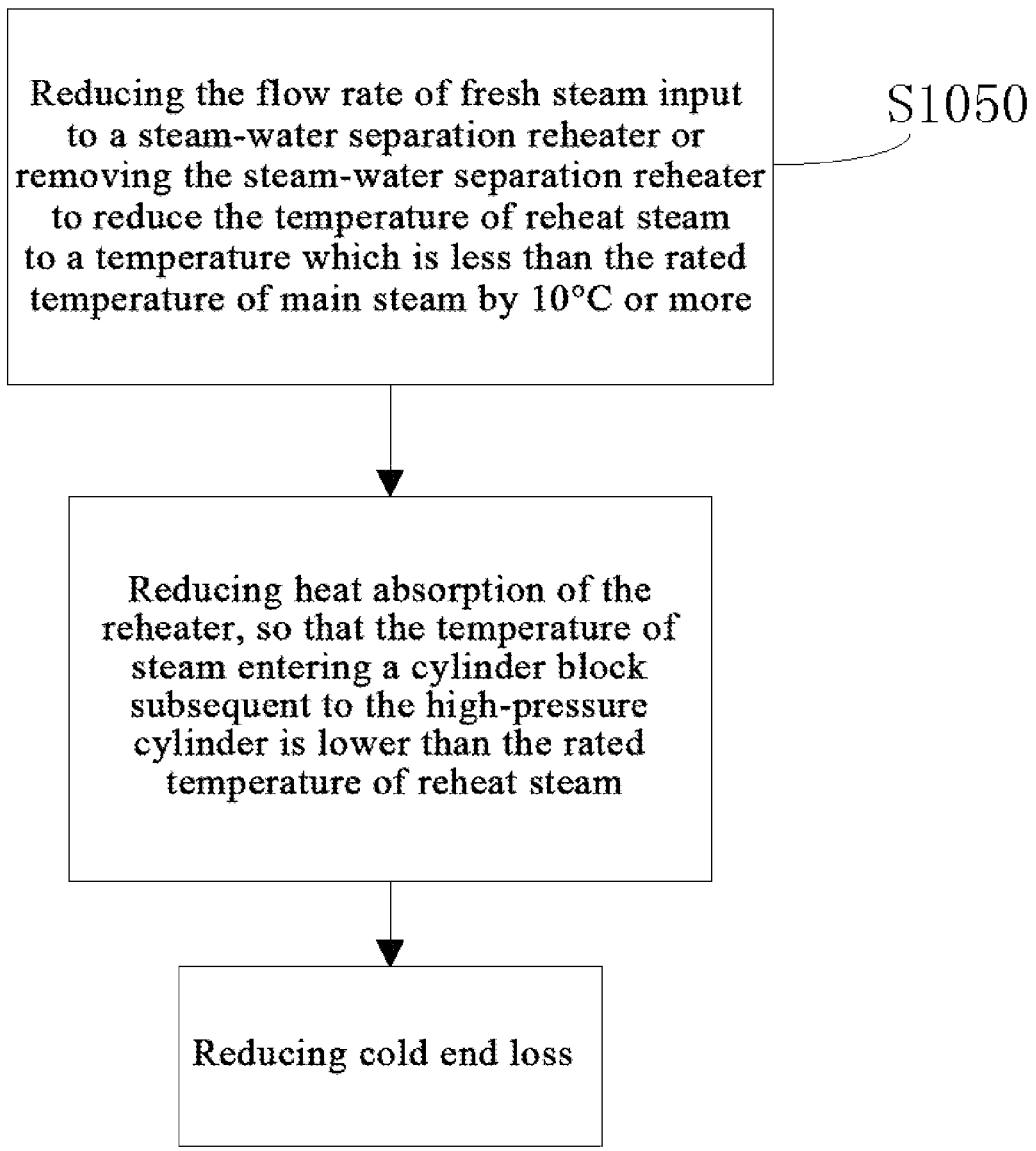
FIG. 17 is a schematic flowchart of a method for improving the efficiency of a large Rankine cycle according to Embodiment 17 of the present invention.

As shown in FIG. 17, on the basis of Embodiment 1, for a nuclear generator set, the method includes:

S1050: reducing the flow rate of fresh steam input to a steam-water separation reheater or removing the steam-water separation reheater to reduce the temperature of reheat steam to a temperature which is less than the rated temperature of main steam by 10° C. or more.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Specifically, the temperature of reheat steam is reduced to below the rated temperature of the main steam by 10° C. or more, which can also be expressed as that the temperature of reheat steam≤the rated temperature of the main steam−10° c.

Embodiment 18

The embodiment of the present invention provides a method for improving the efficiency of a large Rankine cycle.

Figure 18:
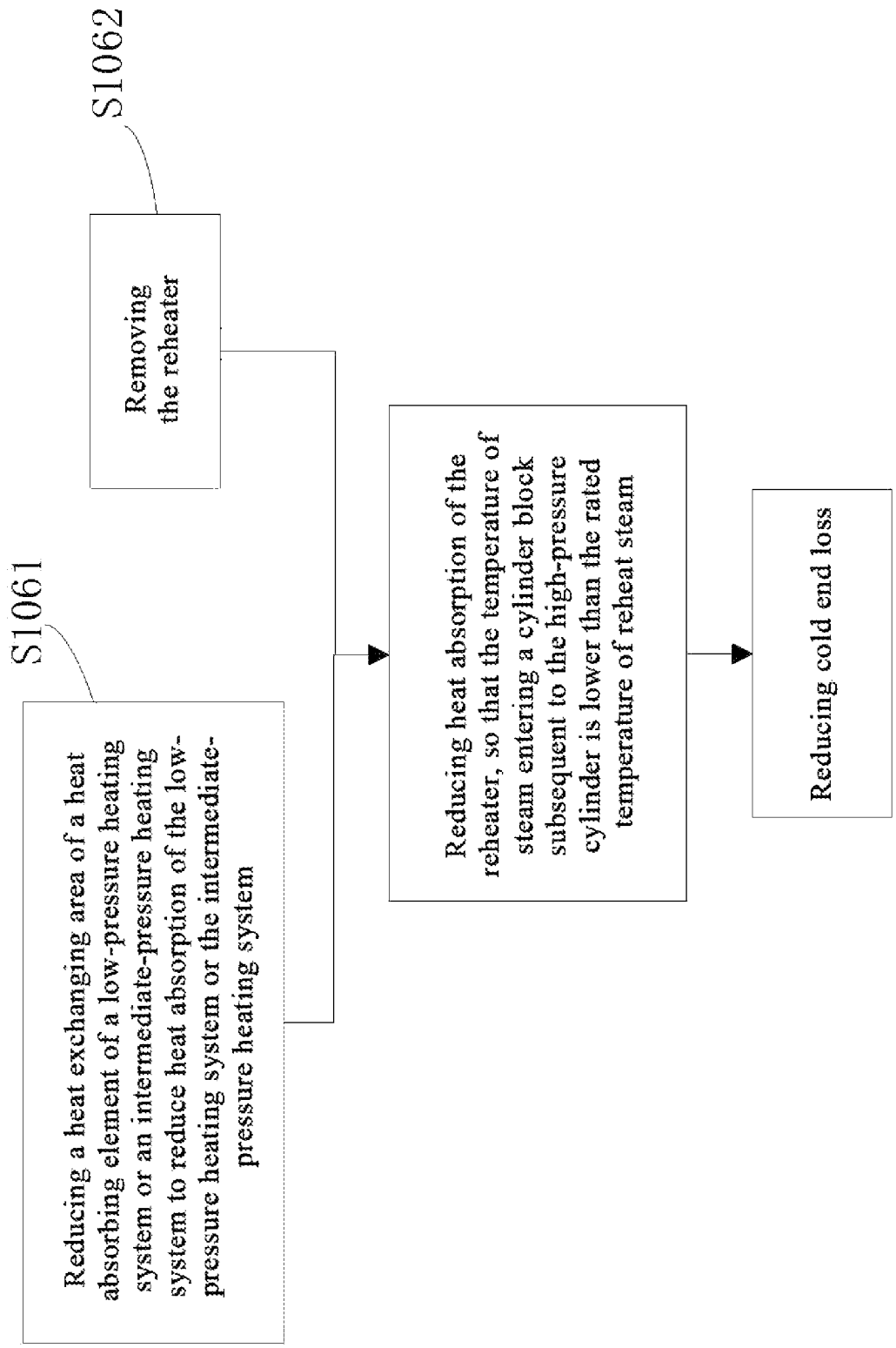
FIG. 18 is a schematic flowchart of a method for improving the efficiency of a large Rankine cycle according to Embodiment 18 of the present invention.

As shown in FIG. 18, on the basis of Embodiment 1, for a combined-cycle generator set, the method includes:

S1061: reducing a heat exchanging area of a heat absorbing element of a low-pressure heating system or an intermediate-pressure heating system to reduce heat absorption of the low-pressure heating system or the intermediate-pressure heating system; or, S1062: removing the low-pressure heating system or the intermediate-pressure heating system.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 19

The embodiment of the present invention provides a method for improving the efficiency of a large Rankine cycle.

Figure 19:
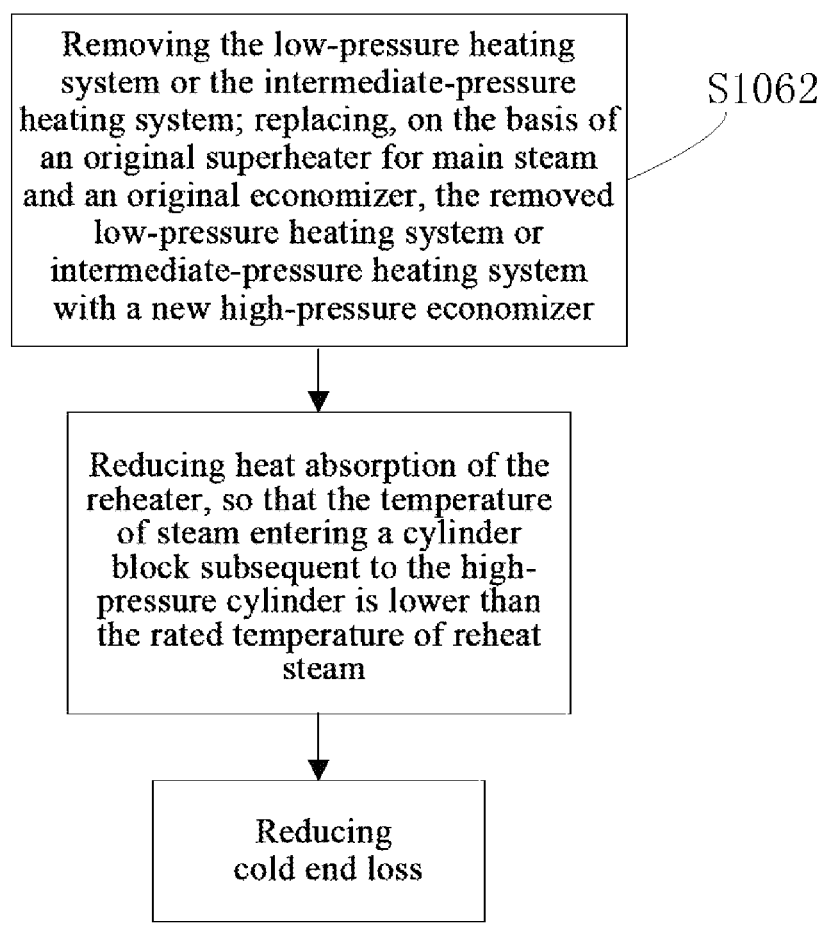
FIG. 19 is a schematic flowchart of a method for improving the efficiency of a large Rankine cycle according to Embodiment 19 of the present invention.

As shown in FIG. 19, on the basis of Embodiment 18, for a combined-cycle generator set, the method includes:

S1062: removing the low-pressure heating system or the intermediate-pressure heating system; replacing, on the basis of an original superheater for main steam and an original economizer, the removed low-pressure heating system or intermediate-pressure heating system with a new high-pressure economizer.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 20

The embodiment of the present invention provides a method for improving the efficiency of a large Rankine cycle.

Figure 20:
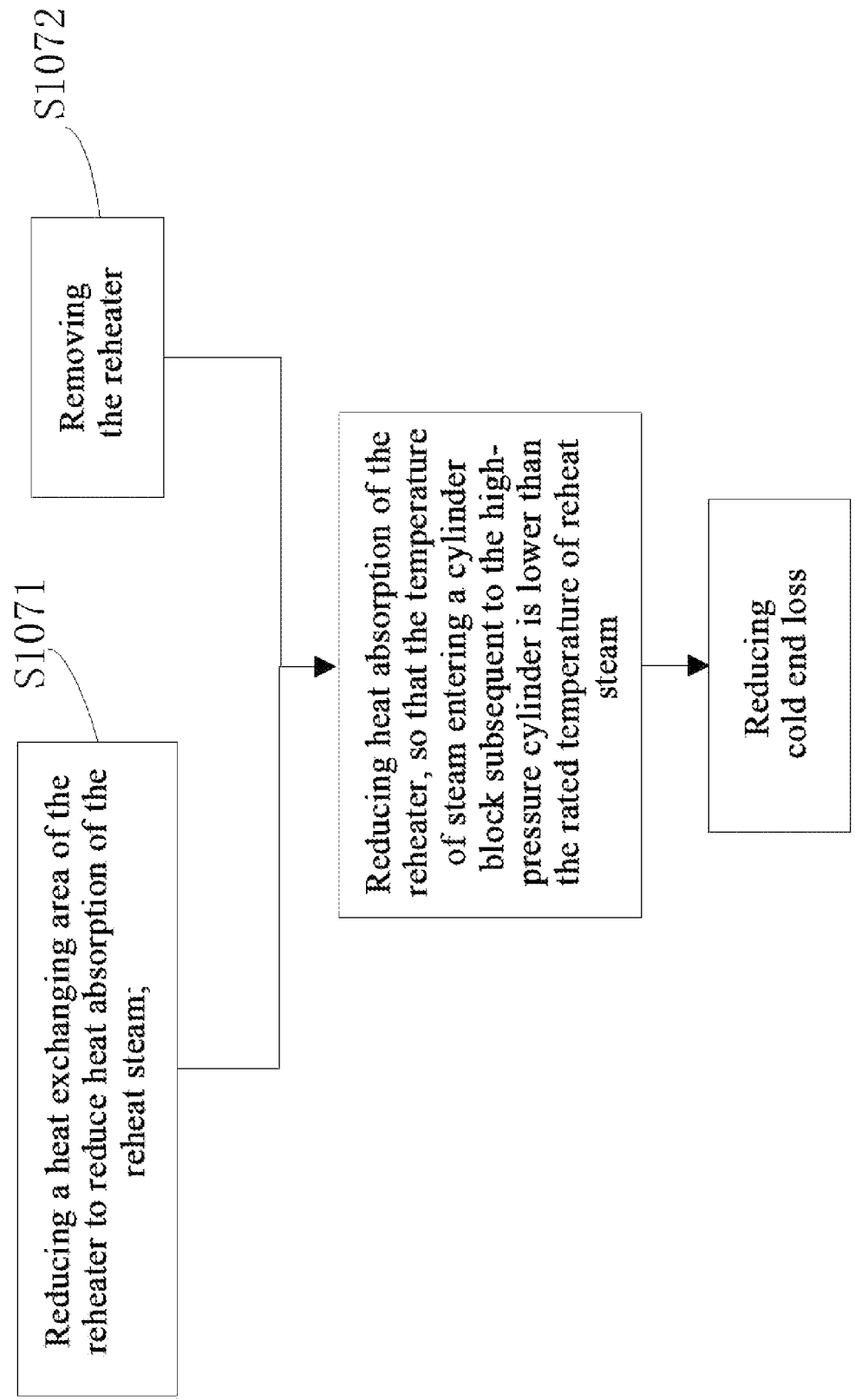
FIG. 20 is a schematic flowchart of a method for improving the efficiency of a large Rankine cycle according to Embodiment 20 of the present invention.

As shown in FIG. 20, on the basis of Embodiment 1, for a solar thermal generator set, the method includes:

S1071: reducing a heat exchanging area of the reheater to reduce heat absorption of the reheat steam; or, S1072: removing the reheater.

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

Embodiment 21

The embodiment of the present invention provides a method for improving the efficiency of a large Rankine cycle.

Figure 21:
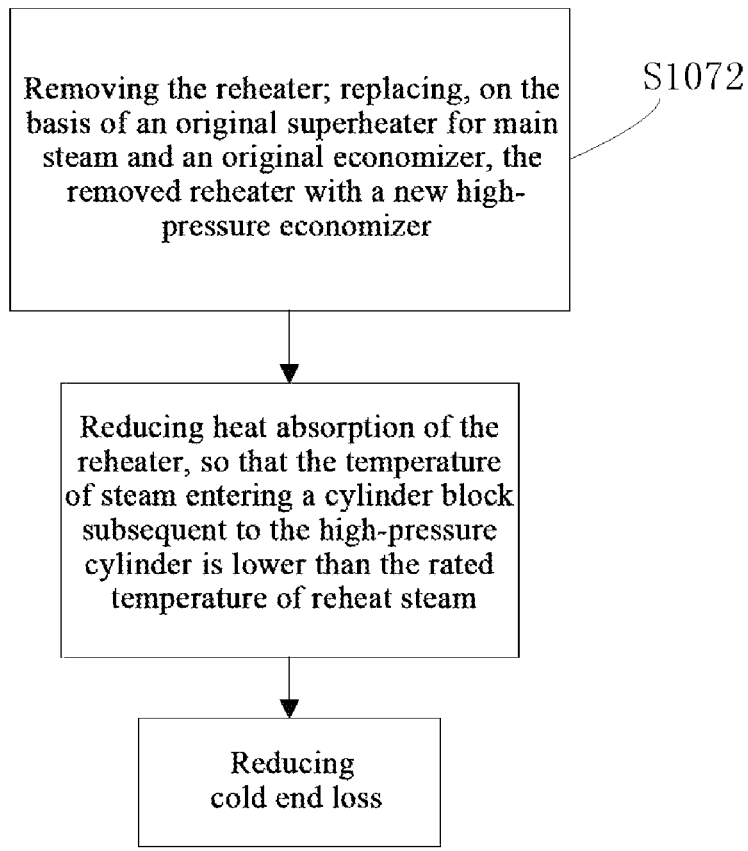
FIG. 21 is a schematic flowchart of a method for improving the efficiency of a large Rankine cycle according to Embodiment 21 of the present invention.

As shown in FIG. 21, on the basis of Embodiment 20, for a solar thermal generator set, the method includes:

S1072: removing the reheater; replacing, on the basis of an original superheater for main steam and an original economizer, the removed reheater with a new high-pressure economizer;

Heat absorption of the reheater is reduced, so that the temperature of steam entering a steam turbine subsequent to the high-pressure cylinder is lower than the rated temperature of reheat steam to reduce cold end loss, thereby improving the cycle thermal efficiency of the steam turbine.

The technical solutions adopted in these embodiments and technical effects produced by adopting the technical solutions will now be described in detail in combination with the prior art. The specific details are as follows.

For a large steam turbine generator set, it is believed in the prior art that increasing the temperature of reheat steam is beneficial to reducing power consumption or improving power generation efficiency, because it is believed that increasing the temperature of reheat steam is beneficial to the thermodynamic work condition of an intermediate-pressure cylinder and a low-pressure cylinder. Without reheat, the exhaust steam humidity of the low-pressure cylinder will rise. According to the computer software simulation calculation result performed by the inventor, the humidity will increase from 4-9% with the reheat system to 22-28% with the reheat system removed. The impact of this change on a thermal system is huge. However, in a traditional analysis method in the theoretical system of Engineering Thermodynamics (Thermodynamics: An Engineering Approach" (Cengel, Copyright ©2016 by McGraw-Hill Education) that adopts a T-s diagram (i.e., temperatureentropy relationship coordinate diagram), the effect of exhaust steam humidity cannot be expressed when the thermal efficiency principle of the Rankine cycle is expressed. Therefore, there is no quantitative comparison and in-depth study on the influence of the presence or absence of a reheat cycle on the thermal efficiency. That is to say, in history, since the T-s diagram cannot reflect the steam humidity, resulting in the loss of expression means and research ability of the T-s diagram. This may be one of the main reasons for the lack of research on the effect of the efficiency of the reheat system.

Secondly, the conclusion that the reheat cycle improves the cycle efficiency of the steam turbine is the negligence of the traditional theory in Engineering Thermodynamics, and it is also a misjudgment caused by the misuse of the concept of thermodynamics on heat transfer caused by the development of actual engineering.

In fact, the working process of steam turbine is a process of converting thermal energy of steam into mechanical energy of a rotor of a steam turbine by steam impinging on a rotor of the turbine. This is completely a mechanical process on which mechanical motion calculations can be performed, and is a different and unrelated concept when compared with the Carnot-cycle or heat transfer process in thermodynamics. Increasing the temperature of reheat steam cannot improve the mechanical work process of the steam, and thus cannot increase the energy conversion of the steam turbine. In this process, the problem is how to reduce the energy of the exhaust steam of a low-pressure cylinder, i.e., cold end loss. The cold end loss mainly depends on pressure, humidity and flow rate of the steam discharged from the low-pressure cylinder.

Only in the heat source system and cold end system of the steam turbine power generation process, what happens to the steam-fluid working medium is the heat transfer process. Increasing the reheat temperature can only reduce the water erosion phenomenon of a last stage blade of a low-pressure cylinder of a steam turbine in the traditional understanding. This not only has no effect on thermal efficiency, but on the contrary, it reduces exhaust gas dryness and increases cold end loss, which results in a decrease in thermal efficiency.

During the actual operation of a generator set, when the temperature of reheat steam rises, the thermodynamic work conditions and power generation output of an intermediate-pressure and a low-pressure cylinder are indeed improved, but the work of a high-pressure cylinder must be reduced to meet power generation requirements. The problem is that in this process, overall thermal efficiency of the Rankine cycle drops.

Test proof of thermodynamic performance of the temperature of reheat steam.

I. Test Method 1.1 One day before the test, a generator set for the test uses coal with a stable calorific value to ensure that the calorific value of the coal entering a furnace during the test was as stable as possible.

1.2 Before the start of the test, the generator set is applied to exit from AGG (automatic generation control) and primary frequency regulation, and stabilized at a certain load between 300 MW and 400 MW, and adjusted the opening degree of a reheat flue gas damper to 90%. The specific load point can be determined according to the load condition during the test. A set value of the main steam pressure is decreased (to 23 MPa) and the set value of the boiler negative pressure was increased (−70 Pa), so that the generator set enters the state of preparation before the test. It is stably operated for 0.5 hours.

1.3 During the test, it exits from an automatic control over a boiler coordination, the main steam pressure, the opening degree of the steam turbine valve, the opening degree of a blower, the temperature of reheat steam and the like. An induced draft fan and the temperature of main steam are kept in an automatic mode. A slight amount of manual intervention can be performed on the opening degree of the steam turbine valve and the opening degree of the blower to replace the automatic control, so that a proper balance of the pressure of main steam and an air volume can be kept unchanged.

1.4 Isolation between condensate water and MGGH (media gas-gas heater): stopping a heat exchanging loop between the condensate water and the MGGH, to realize the isolation between the steam turbine and the MGGH. It is stably operated for 0.5 hours.

1.5 The opening degree of the reheat flue gas damper is gradually adjusted (down from 90% to 20%) to reduce the temperature of reheat steam by about 20° C. after the generator set is stabilized. It is stably operated for 0.5 hours.

1.6 It is determined whether to carry out the test repeatedly according to the test results.

II. The Process of the Test

It should be noted that the time involved in this test is the actual test time, rather than a specific limitation on the test time. The test can be performed in any time period.

The test started at 14:00 and ended at 18:00 that day.

The basic process of the test is as follows:

① From 14:00 to 14:28, the generator set operated normally with the load of 300 MW, the coordinated control was put into operation, and the opening degree of the reheat flue gas damper was 89%.

At 14:28, the generator set was released from a manual mode, the coal volume, air volume, and regulating valve are maintained, and the opening degree of the reheat flue gas damper was 89%.

② At 16:05, the opening degree of the reheat flue gas damper was directly adjusted to 21.8%, and the generator set was operated until 16:43.

③ After 16:43, in order to prevent the change range of the reheat temperature from exceeding an allowable upper limit of an operating regulation (40° C. higher than an overheating temperature), the reheat flue gas damper was adjusted. The adjustment process is as follows. At 16:43, the opening degree of the reheat flue gas damper was adjusted from 21.8% to 41.6%, and half an hour later, to 28.9%. This adjustment put the steam turbine into a transitional state, and the thermal balance analysis cannot be performed.

④ At 17:56, the opening degree of the reheat flue gas damper returned to normal and the test was finished.

III. Selection of Representative Data

① Reference Method

At 14:28, the generator set was released from the manual mode, the coal volume, air volume, and regulating valve are maintained, and the opening degree of the reheat flue gas damper was 89%. The generator set was operated in this way until 16:04.

The data from 15:00 to 16:04 were selected as references for this test.

② Comparison Method

At 16:05, the opening degree of the reheat flue gas damper is directly adjusted to 21.8%, and the generator set was operated until 16:43.

The data from 16:25 to 16:43 were selected as references for this test.

IV. Test Results

The statistical results of the original test data are shown in the table below.

TABLE 1

Summary of the raw data statistics of the test

| Test method | Reference method | Comparison method | Units |
|---|---|---|---|
| Time for statistics | 15:00-16:04 | 16:25-16:43 | |
| Opening degree of reheat flue gas damper | 89 | 21.6 | % |
| SELMW (selected megawatt) | 303.3 | 305.4 | MW |
| TOTAL FEED WTR FLW | 939.4 | 956.7 | t/hr |
| Total coal volume | 142.8 | 142.8 | t/hr |
| VACUUM | −94 | −94 | kPa |
| MAIN STEAM PRS | 13.9 | 14.2 | MPa |
| Temperature in front of valve | 566 | 565.3 | °C. |
| Pressure of reheat steam | 2.1 | 2.12 | MPa |
| main pipe steam temperature 1 of high-temperature reheat steam | 563.9 | 540.81 | °C. |
| HPH OUTL PRS (high pressure heater outlet pressure) | 15.8 | 16.3 | MPa |
| MAIN FEEDWATER TEM A | 247.1 | 247.3 | °C. |
| ECO OUTL WTR TEM (economizer outlet water temperature) | 282.3 | 293.7 | °C. |
| B side inlet steam temperature of cold section of low-temperature reheat steam | 328.1 | 326.3 | °C. |
| B side inlet pressure of cold section of low-temperature reheat steam | 2.27 | 2.32 | MPa |
| A side inlet steam temperature of cold section of low-temperature reheat steam | 327.8 | 325.3 | °C. |
| A side inlet pressure of cold section of low-temperature reheat steam | 2.24 | 2.28 | MPa |
| Flue gas temperature 1 at outlet B of air preheater | 122 | 121.1 | °C. |
| Flue gas temperature 2 at outlet B of air preheater | 123.2 | 122.1 | °C. |
| Flue gas temperature 1 at outlet A of air preheater | 125 | 123.6 | °C. |
| Flue gas temperature 2 at outlet A of air preheater | 122.5 | 121.8 | °C. |
| Air temperature at inlet B of air preheater | 30.1 | 30.5 | °C. |
| Air temperature at inlet A of air preheater | 30 | 30.4 | °C. |
| 1# HPH INL STM PRS | 3.65 | 3.71 | MPa |
| 1# HPH INL STM TEM | 382.5 | 381.3 | °C. |
| 2# HPH OUTL WTR TEM | 223 | 223.8 | °C. |
| 2# HPH INL STM PRS | 2.31 | 2.33 | MPa |
| 2# HPH INL STM TEM | 327.7 | 325.8 | °C. |
| 3# HPH OUTL WTR TEM | 188.5 | 188.5 | °C. |

Thermal balance calculation is performed based on the raw data in Table 1, and the results are shown in Table 2.

TABLE 2

List of calculation results of thermal balance

| Test method | Reference method | Comparison method | Units |
|---|---|---|---|
| Time for statistics | 15:00-16:04 | 16:25-16:43 | |
| Reheat temperature | 564.2 | 540.8 | °C. |
| Enthalpy of feed water | 1072.6 | 1073.6 | kJ/kg |
| Enthalpy of main steam | 3504.4 | 3496.94 | kJ/kg |
| Enthalpy of reheat steam | 3608.7 | 3556 | kJ/kg |
| Flow rate of feed water | 939.4 | 956.7 | t/hr |
| Extracted steam enthalpy of 1# HP heater | 3179.4 | 3177 | kJ/kg |
| Extracted steam enthalpy of 2# HP heater | 3080.1 | 3076.4 | kJ/kg |
| Drain water enthalpy of 1# HP heater | 1033.7 | 1032.9 | kJ/kg |
| Drain water enthalpy of 2# HP heater | 764.7 | 769.6 | kJ/kg |
| Inlet water enthalpy of 2# HP heater | 808 | 808.1 | kJ/kg |
| Inlet water enthalpy of 1# HP heater | 961.4 | 965.2 | kJ/kg |
| Extracted steam volume of 1# HP heater | 48.6 | 48.4 | t/hr |
| Extracted steam volume of 2# HP heater | 56.6 | 59.4 | t/hr |
| Flow rate of reheat steam | 834.2 | 848.9 | t/hr |
| Extracted steam proportion of 1# HP heater | 5.18 | 5.26 | % |
| Extracted steam proportion of 2# HP heater | 6.02 | 6.21 | % |
| Inlet enthalpy of reheat steam | 3081.8 | 3077.8 | kJ/kg |
| Heat absorption of steam | 2721093 | 2724353 | kJ |

TABLE 2-continued

List of calculation results of thermal balance

| Test method | Reference method | Comparison method | Units |
|---|---|---|---|
| Load | 303.3 | 306.2 | MW |
| Heat consumption rate of steam turbine | 8971.6 | 8897.3 | kJ/kW · hr |
| Variation of heat consumption rate | | −74.3 | kJ/kW · hr |
| Variation of reheat temperature | | −23.4 | ° C. |
| Slight increase rate of reheat temperature of heat consumption of steam turbine | | 31.8 | kJ/kW · hr/10° C. |
| Temperature of exhausted flue | 123.2 | 122.2 | ° C. |
| Air temperature of AH inlet | 30 | 30.5 | ° C. |
| Temperature difference of exhausted flue | 93.2 | 91.7 | ° C. |
| Loss of exhausted flue | 5.5 | 5.4 | % |
| Efficiency of boiler | 94 | 94.1 | % |
| Coal feed | 142.8 | 142.8 | t/hr |
| Heat input | 2894780 | 2895168 | kJ |
| Calculation of calorific value | 4838.1 | 4838.7 | Cal/t |
| Coal consumption for power generation | 325.4 | 322.4 | g/kW · hr |
| Variation of coal consumption for power generation | | −3 | g/kW · hr |
| Influence of exhausted flue temperature | | −0.3 | g/kW · hr |
| Influence of steam turbine | | −2.7 | g/kW · hr |
| Slight increase rate of reheat temperature of coal consumption for power generation | | 1.3 | g/kW · hr/10° C. |

V. Test Analysis 5.1 Characteristics of the Test Plan

There must be a clear regularity in the influence of reheat temperature on power generation efficiency. However, the test can only be proved with the most rigorous test process.

For this reason, the test plan was designed to operate in a static mode (equivalent to full manual). That is to say, at the beginning of the test, the primary frequency modulation, AGC, the coordinated control of the boiler, and the automatic air supply were eliminated, so that all important independent variables for the generator set operation are in a static state, including a load command, the feedback value of the generated power, the total fuel quantity, the opening degree of the steam turbine valve and the opening degree of the blower, and the like.

For the generator set under test, the only reason for the variation in operating parameters is the variation in raw coal characteristics.

Pure hysteresis characteristics: in this mode of operation, after adjusting the reheat flue gas damper, the various operating parameters of the boiler and steam turbine of the generator set, i.e., all dependent variables, are passive variables that are only affected by the heat generated by the raw coal and the reheat flue gas damper. Moreover, since there is no automatic adjustment that affects the variation of the process, any variation in the power generation system will not lead to an automatic adjustment process and the resulting oscillation process caused by the automatic adjustment process. Instead, it can only be a monotonous hysteresis response under the constraints of the heat storage effect of the system. I.e., for the test generator set, the system has the characteristics of pure hysteresis in the time domain.

5.2 Comparison Method

Although the steam turbine was still in the process of variation from 16:25 to 16:43, the test process was not disturbed, and the direction of variation was determined. Therefore, approximate heat balance calculations and theoretical analysis can be performed. In this test, the undisturbed process data, i.e., the data from 16:25 to 16:43, was selected as a comparison method, which is based on this strict logic.

The data in Table 1 shows that from 16:05, when the opening degree of the reheat flue gas damper is decreased, to 16:43, the instantaneous value of the reheat temperature dropped from 559.4° C. to 532.9° C., which is decreased by 26.5° C.

From 16:25 to 16:43, the temperature of the extracted steam in each level of the regenerative system changed as follows:

The extraction temperatures of 1 #and 2 #high-pressure heaters are kept unchanged. The extraction temperatures of 3 #and 4 #high-pressure heaters and low-pressure heaters #5 and #6 are decreased by 14.3° C., 22.6° C., 4.9° C. and 5.9° C. respectively. The extraction temperatures of 7 #, 8 #low-pressure heaters are unmeasured.

The heat balance calculation in Table 2 shows that the above operations have resulted in a decrease of 74.3 kJ/kW·hr of the heat consumption rate of the steam turbine and a decrease of 3.0 g/kW·hr of coal consumption for power generation.

Wherein, the decrease in the temperature difference of exhausting gas of the boiler decreases the coal consumption for power generation by 0.3 g/kW·hr, and the decrease in heat consumption rate of the steam turbine decreases the coal consumption for power generation by 2.7 g/kW·hr.

5.3 Gradual Transfer Process

After 16:43, in order to prevent the change range of the reheat temperature from exceeding an allowable upper limit of the operating regulation (it is not allowed for the temperature to be 40° C. or more below the overheating temperature), the reheat flue gas damper was adjusted. The adjustment process was as follows. At 16:43, the opening degree of the reheat flue gas damper was adjusted from 21.6% to 41.6%, and half an hour later, to 28.9%.

During the entire test from 14:00 to 18:00, the extraction temperatures of the 1 #and 2 #high-pressure heaters are still essentially unchanged.

The important factor for the hysteresis of the test generator set is the time constant of the regenerative system of the steam turbine. Since the regenerative heater and the pipe network of each level have a large heat storage capacity, the time constant of each regenerative heater is as long as tens of minutes.

Figure 33:
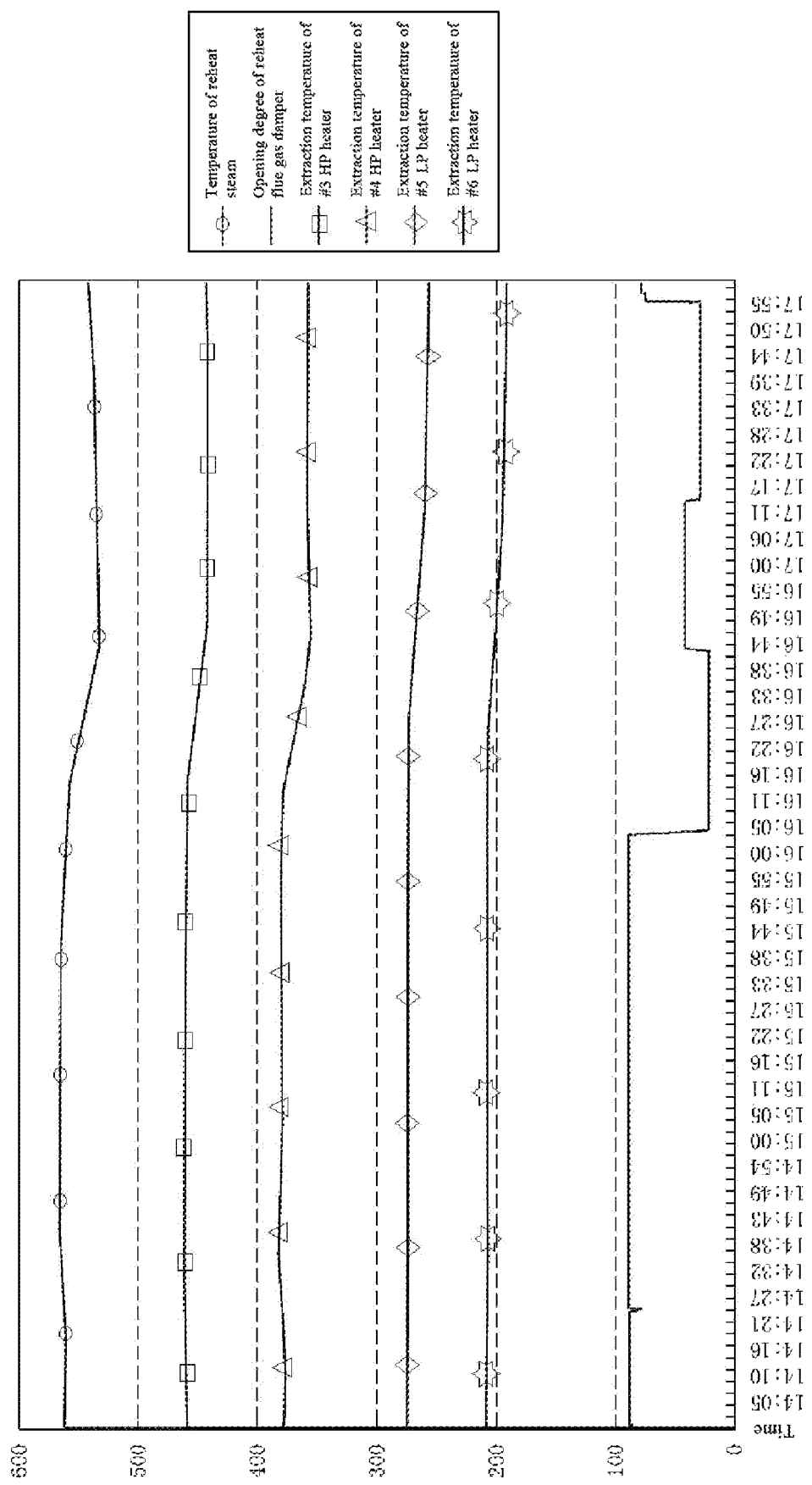
FIG. 33 is a trend graph of reheat temperature and extraction temperature of each level.

Therefore, after the adjustment of the reheat flue gas damper at 16:43, the adjustment process shows a gradual transfer process of each level of the extraction temperature of the reheat system. FIG. 33 is a trend graph of data of the reheat temperature and the extraction temperature of each level.

From 16:43 to 18:00 when the test finished, the gradual transfer process was as follows.

The reheat temperature continued to rise.

The variations of the extraction temperatures of 3 # and 4 # high-pressure heaters has changed from a continuous drop to a straight line;

The extraction temperatures of 5 # and 6 # low-pressure heaters still continued to decrease.

This adjustment process for the regenerative system presents a gradual transfer process, so that there is an inconsistent transition process in the variation process of each part of the steam turbine. Therefore, the corresponding test data presents an unbalanced state, and neither the heat balance calculation nor the effective theoretical analysis can be carried out.

5.4 Capacity Parameters and Morphological Parameters

The test shows that during the operation of the generator set, the working state parameters of the steam turbine in operation should be divided into capacity parameters and morphological parameters. Capacity parameters refer to parameters that are changed to achieve a certain output power, such as the flow rate of steam or the flow rate of feed water. Morphological parameters refer to parameters that are changed to improve work efficiency, such as the temperature of main steam and the temperature of reheat steam. Some parameters belong to both the capacity parameter and the morphological parameter, such as the outlet pressure of a feed pump. When the output power and work efficiency are changed significantly, this parameter will change.

The reheat temperature belongs to the morphological parameter of the steam turbine. Of course, the capacity parameters must be adjusted with the load, while the morphological parameters should not be adjusted if possible. It is clear that repeatedly adjusting the morphological parameter of the opening degree of the reheat flue gas damper is an incorrect operation.

5.5 Change Direction of Energy Saving Indicator

According to the pure hysteresis characteristics of the system, it is certain that if the reheat flue gas damper is not repeatedly adjusted during the test, the relevant energy-saving indicator will only continue to increase, i.e., further be improved, in the direction after the initial adjustment (16:05).

VI. Test Conclusion

This test proved the following conclusions:

1) Reducing the reheat temperature will increase the thermal efficiency of the generator set.

2) The slight increase rate of the reheat temperature with respect to the heat consumption rate is >31.8 kJ/kW·hr/10° C.

3) The slight increase rate of the reheat temperature with respect to the coal consumption for power generation is >1.3 kJ/kW·hr/10° C.

4) By completely turning off the reheat flue gas damper, the drop rate of the reheat temperature will increase correspondingly, and the energy-saving range will be further increased.

5) The heat absorbing surface of the superheater is obviously larger than that of the reheater. Thus, while the reheat temperature decreases, the heat absorption of the superheater increases, which also leads to a higher temperature difference of the exhausting gas of the boiler and a higher efficiency.

6) Under a high load condition, by increasing fuel quantity of the lower-layer coal feeder, the reheat flue gas damper can be closed as much as possible.

7) When the load of the generator set is in a normal state, i.e., when the load is in the range of 30 to 100%, it is expected that the energy saving range may reach about 1.5% of the power generation load, i.e., the coal consumption for power generation is reduced by 4.5-5.0 g/kW·hr, by reducing the combustion center and turning off the reheat flue gas damper without modifying the equipment.

Therefore, this test has proved the correctness of the global optimization theory, and it opens up huge prospects for energy-saving and emission-reduction of the generator set.

During this test, after adjusting the reheat flue gas damper, the reheat temperature is still in the process of continuous variation, and it takes a long time to be stable. Therefore, it is recommended that in a future test, attention should be paid to testing the relationship between the adjustment range of the reheat flue gas damper and the variation of the reheat temperature in time and range.

The following is the theory that is summarized through the simulation calculation of the Rankine cycle with a steam extraction regenerative system and the analysis of the results of the power generation efficiency test carried out in the power plant.

In the actual operation of the generator set, after the adjustment of the operating parameters, under the automatic control of the automatic power generation control system, the output power of the generator set will automatically keep the generated power constant. Although reducing the temperature of reheat steam will result in a decrease in the working power of the intermediate-pressure cylinder and the low-pressure cylinder, for the automatic control of the steam turbine, in order to keep the generated power constant, since the pressure of main steam and temperature of main steam remain unchanged, the total opening degree of the regulating valve of the steam turbine must be increased, and the pressure behind the regulating valve of the steam turbine will increase accordingly. Further, the main steam flow rate of the steam turbine will inevitably increase automatically, and the steam mass flow rates of the high-pressure cylinder, intermediate-pressure cylinder and low-pressure cylinder will all increase at the same time, which will inevitably lead to an increase in the flow rate of condensate water and the flow rate of feed water.

The regenerative heater of each level has a function of maintaining the heating temperatures of the condensate water and the feed water to reach the saturation temperature (there is an end difference) at the extraction pressure (intake side) of each level. As the condensate water and feed water have been increased, in order to maintain the heating of the increased condensate water and feed water, the extraction flow of each level must increase at the same time, resulting in an increase in the energy or power consumption of the condensate water and feed water, i.e., the proportion of work done by the regenerative steam extraction increases.

Since the regenerative steam extraction has no cold end loss, its work efficiency is 100%, which is higher than the cycle efficiency of the steam turbine. Under the same generated power, the increase of the mass flow rate of the extracted steam will inevitably improve the overall cycle efficiency of the steam turbine.

In this process, due to the increase in pressure behind the regulating valve, the extraction pressure and extraction flow of the high-pressure cylinder is increased, although the inlet pressure of the intermediate-pressure cylinder and the extraction pressure of each subsequent level is reduced, the feed water flow rate and condensation water flow rate are increased, and the extraction flow of each level is increased.

At the same time, in order to increase the main steam flow rate while reducing the heat of reheat, the heat source system needs to reduce the fuel in the upper-layer burner and increase the fuel in the lower-layer burner. The original energy of the heat source system for heating the reheat steam is used for heating the water-cooled wall of the heat source system to increase the evaporation of the steam of the heat source system.

As the efficiency of the steam turbine increases and the generated power remains unchanged, the total heat of the heat source system is reduced because the amount of heat added to the heat supply for increasing steam evaporation is less than the amount of reduced heat for reheat steam heating.

In short, since the work efficiency of the regenerative steam extraction is 100%, a direct and effective way to improve the cycle efficiency of the steam turbine is to strengthen the heat regeneration. For an actual steam turbine cycle, weakening the role of the reheat system will strengthen the role of the regenerative system, which will definitely increase the cycle efficiency of the steam turbine.

For regenerative systems with steam extraction, after completely removing the reheater, reducing the temperature of reheat steam will increase the work power of the high-pressure cylinder by about 2.745%, and the work power of the intermediate-pressure cylinder and the low-pressure cylinder is correspondingly reduced. Finally, the amount increased in the high-pressure cylinder is equal to the amount decreased in the intermediate-pressure cylinder and the low-pressure cylinder. This keeps the total power constant and increases the work efficiency of steam turbine cycle.

The simulation calculation results show that, in the case of completely removing the reheater, the ratio of the total flow rate of the regenerative extracted steam to the total flow rate of main steam, i.e., the proportion of the regenerative extracted steam, increases from 38.47% to 42.87%, and the heat consumption rate of the steam turbine decreases from 8032.0 kJ/kWh to 7621.8 kJ/kWh, and the heat consumption rate of the steam turbine decreases by 5.107%. The degree of reduction in the heat consumption rate here does not include factors such as the disappearance of the reheat pressure loss after removing the reheater, the reduction in the back-pressure of the generator set, etc., and thus the degree of reduction in the heat consumption rate does not reach the actual degree of reduction.

The inventor also carried out simulation calculations for a system without regenerative steam extraction. Using the above-mentioned computer simulation system for the thermodynamic performance of the generator set, the influence of the reheat system on the thermodynamic performance of the Rankine cycle was calculated after removing the various regenerative steam extraction loops. It is proved that the influence of the reheat system on the cycle efficiency of the steam turbine is also significantly reduced by more than 4%.

The more understandable expression of the influence of the reheat system on the cycle efficiency of the steam turbine is provided as follows.

The prior art uses the temperature of the reheat steam as the initial parameter of the steam turbine, which is due to the technical prejudice caused by the vague understanding of the relevant theoretical issues. In fact, with respect to that the temperature of main steam is used as initial parameter, the pressure of exhaust steam and the humidity of the exhaust steam of low-pressure cylinder are used as final parameters, the temperature of reheat steam can only be used as an intermediate parameter. Because increasing the temperature of reheat steam is actually increasing the intermediate parameter, which is not a correct choice and will inevitably lead to a decrease in the cycle thermal efficiency of the steam turbine.

To maintain the temperature of reheat steam at the same rated temperature as the rated temperature of main steam, the low-superheat steam exhausted from the high-pressure cylinder is re-sent into the heat source system. By absorbing heat in the low-temperature superheater and the high-temperature superheater, the temperature of the steam can be raised from the exhaust temperature of the high-pressure cylinder to the rated temperature of main steam. After this part of energy enters the intermediate-pressure cylinder and then passes through the low-pressure cylinder to do work, it becomes the exhaust steam of the cold end of the steam turbine. The work stroke of this part of the heat energy output by the heat source system does not pass through the high-pressure cylinder, but is directly short-looped by the intermediate-pressure cylinder and the low-pressure cylinder, and the remaining heat enters the cold end and cause loss, so the energy utilization efficiency is reduced. As a result, the enthalpy value of the exhaust steam of the low-pressure cylinder of the steam turbine increases, the humidity decreases, and the cold end loss of the steam turbine increases. Therefore, in fact, the reheat steam is operated at a temperature close to the rated temperature of main steam, which will cause the cycle power efficiency of the steam turbine to decrease and the energy consumption of the generator set to increase.

Therefore, the temperature of reheat steam should not be as high as possible, but can basically be greatly reduced, which results in a fundamental difference between the present invention and the prior art.

The work efficiency of the steam turbine is improved in the present invention by changing the energy transfer mode of the heat source system. In the present invention, it is needed to reduce the combustion flame center of the heat source system, so theoretically and overall, the efficiency of the heat source system is to be improved. Therefore, the application of the present invention makes the overall thermal efficiency increase of the generator set higher than the increase of the cycle efficiency of the steam turbine.

All the data presented in the description of the invention regarding the effect of the temperature variation of reheat steam on the cycle efficiency of the steam turbine are based on the results of simulation calculations and the results of actual tests.

The invention differs from the prior art in which the temperature of reheat steam is maintained at the rated temperature of main steam under different power conditions of the generator set, and removes the doubts and ambiguities in the prior art on the operation method of the temperature of reheat steam of the steam turbine, and is a new technology that improves the efficiency of the turbine by decreasing the temperature of reheat steam.

First of all, for the already-built generator set, according to a large number of simulation calculations, the present invention can significantly reduce the temperature of reheat steam, for example, by 10-280° C. (since the saturation temperature is different under different pressures, the actual reduction range is also different) while meeting the generated power requirements of the generator set, until the reheat steam system is removed, and the cycle thermal efficiency of the steam turbine is improved.

The simulation calculation also shows that for a steam turbine cycle with a regenerative steam extraction system, in the case of removing the reheater and adding a new economizer, the efficiency of the steam turbine can be improved by 4-5% by reducing the temperature of main steam to the saturation temperature. This is because reducing the temperature of main steam will lead to an increase in water feed, an increase in the amount of regenerative extracted steam, and an increase in the effect of the regenerative steam extraction system.

In addition, through actively increasing the desuperheating water for main steam and enabling the main steam to become wet steam, the amount of regenerative extracted steam can be further increased, the effect of the regenerative steam extraction system can be enhanced, and the work efficiency of steam turbine cycle can be improved.

According to the present invention, when the reheater is replaced by a new economizer, strict thermodynamic calculations under high load and low load conditions should be carried out, and the normal realization of parameters such as water feed, feed water temperature, and the temperature of superheated steam should be ensured to ensure the safety and optimization of the thermal system.

In order to meet the demand of water supply increase, it is necessary to increase the opening of the regulating valve of the feed pump or increase the capacity of the feed pump. Increasing the opening of the regulating valve of the feed pump or increasing the capacity of the feed pump is conducive to enhancing the role of the regenerative steam extraction system, so the cycle efficiency of the steam turbine can be improved.

After the Rankine cycle is improved, the work done by the regenerative extracted steam will increase, and the cycle efficiency of the steam turbine will be significantly improved. At the same time, the volume flow rate of the exhaust steam of the low-pressure cylinder of the steam turbine has dropped significantly, and the pressure drop at each stage of the steam turbine has dropped significantly, resulting in a reduction in the total opening degree of the inlet regulating valve of the steam turbine. As the output of the feed pump is increased, the steam initial pressure increases, and the number of stages of the steam turbine impeller can be increased, thereby further increasing the power and work efficiency of the steam turbine.

There is a lack of reliable experimental evidence on the research history of the influence of water erosion and wet steam of a last stage blade of the low-pressure cylinder on the work efficiency of the large steam turbine. That is to say, there is no actual and fully acceptable observational study on the actual wet steam inside the steam turbine impeller. one reason is that the steam, even the wet steam, cannot be directly observed by naked eyes or any general physical means as long as no secondary water droplets are formed. The inventor believes that currently there is no effective direct or indirect observation method.

Due to the lack of experimental basis, many studies on the influence of water erosion and wet steam of the last stage blade of the low-pressure cylinder on the work efficiency of steam turbine may deviate from the fact that the wet steam is in the working stage near the last stage blade of the low-pressure cylinder of the steam turbine. For the theoretical research on wet steam in the prior art, please refer to the following: Baumann, K. "Recent developments in steam turbine practice", Journal of Institution of Electrical Engineers, 1912, vol. 48, p. 830; Baumann, K. "Some recent developments in large steam turbine practice", Journal of Institution of Electrical Engineers, 1921, vol. 59, p. 565-623; Bohn, D. E., "Nucleation phenomena in a multi-stage low pressure steam turbine", Proceedings of the Institution of Mechanical Engineers; August, 2003; 217, 4; Proquest, pg. 453; Crane, R. I., "Droplet deposition in steam turbines", Proceedings of the Institution of Mechanical Engineers; August, 2004; 218, 8; Proquest, pg. 895; Alexander Leyzerovich, "Wet-Steam Turbines for Nuclear Power Plants", PennWell Corporation, 2005; Averkina, N. V, "Wet-Steam Turbine Erosion of Steam Turbine Disk and Shaft", Power Technology and Engineering, vol. 44, No. 5, January, 2011.

Regarding the influence of steam humidity on the efficiency of a steam turbine. In the past, some theories believed that the humidity would reduce the work efficiency of steam turbine impellers. However, first of all, this theory has not been verified by practice or test. Secondly, even if it does exist, its impact will be significantly lower than imagined, and the magnitude of its impact is very limited, which cannot affect the basic level of the effect of the present invention to improve the efficiency of the Rankine cycle.

The inventor believes that the steam humidity in the low-pressure cylinder of the steam turbine itself does not basically affect the work efficiency. This is because at least the wet steam in the fossil fuel steam turbine is originally superheated steam, whose enthalpy value is decreased to be lower than the enthalpy value of the saturated steam. Its physical state and superheated steam should still be basically the same, i.e., homogeneous gas with the same phase. The expression "the same phase" mentioned here refers to the third type of gas besides gas and liquid: i.e., dynamic, homogeneous gas without water droplets formed by wet steam molecules and dry steam molecules.

The physical state of this kind of wet steam is different from that of wet steam that will form condensate water droplets under static conditions. First of all, the time of wet steam in the steam turbine is very short. The steam flows forward at an axial speed above 100 m/s. From becoming wet steam to leaving the steam turbine and becoming exhaust steam from the low-pressure cylinder, it takes the steam no more than 0.1 s. Under static conditions, the wet steam will condense to form water droplets, which will cause the separation of dry steam and wet steam. However, the wet steam in the steam turbine is in the process of high-speed violent movement and continuous stirring and disturbance of the blade, the wet steam molecules and dry steam molecules are uniformly mixed, and will not form water droplets after condensation. The wet steam molecules and dry steam molecules form dynamic, homogeneous fluid without water droplets. The so-called dynamic means that molecules with a low enthalpy value of steam molecules that become water are unstable.

Among all steam molecules, wet steam molecules and dry steam molecules are in a dynamic process of mutual conversion, so the condensed steam does not form an independent phase, or no water droplets will be formed from steam after condensation. As homogeneous gas with the same phase, wet steam has no difference in work capacity from dry steam, and it will not cause a decrease in the working efficiency of the steam turbine.

Regarding the water erosion, the application of the present invention will cause the humidity of the exhaust steam of the low-pressure cylinder of the steam turbine to rise, which will lead to a relatively serious water erosion phenomenon for the last stage blade according to the traditional water erosion theory. But in fact it can be avoided.

Water erosion phenomenon may indeed occur in the last stage blade of the low-pressure cylinder of a steam turbine. However, based on the above analysis that the wet steam will not condense, the wet steam will not form primary water droplets, let alone secondary water droplets, so it will not damage the turbine blade. The previous theories about the water erosion problem of the last stage blade of the low-pressure cylinder were due to the water erosion phenomenon caused by the steam humidity of the last stage blade of the low-pressure cylinder, especially the secondary water droplets. This theory has no practical or experimental basis, and is only subjective and empirical judgment when water droplet erosion of the blade was observed after opening a steam turbine, and the time when the erosion happens and the process of the erosion were not known.

There are obvious problems with such empirical judgments and theories. For example, many water erosion phenomena appear on the steam outlet edge of the last stage blade of the low-pressure cylinder, and even the root of the blade. For the water erosion at the root of the steam outlet edge, the previous theory believed that there was a back flow of wet steam. In fact, steam flows forward at an axial velocity above 100 m/s, and there will be no back flow. In addition, the high-pressure cylinder of a full-speed nuclear power steam turbine generator set also operates under conditions of high steam humidity and "secondary water droplets". The exhaust steam humidity should be above 25%, which is obviously higher than that of the low-pressure cylinder of a general steam turbine. Moreover, if there are secondary water droplets, since the density of steam near the last stage of the nuclear power high-pressure cylinder is two orders of magnitude lower than the density of water, the movement conditions and water erosion mechanism of the secondary water droplets are not essentially different from those of the last stage of the low-pressure cylinder, but the water erosion phenomenon of the last stage blade of the low-pressure cylinder of a general steam turbine has never occurred.

During the development of the nuclear power generator set, what worries experts the most was the water erosion of the blade caused by the wet steam in the high-pressure cylinder, but there was no water erosion after the generator set was put into operation. Therefore, there is no water erosion of the last stage blade of the low-pressure cylinder in the high-pressure cylinder of the nuclear power generator set, which in turn proves that the high-humidity steam itself will not cause water erosion problems on the steam turbine blade. In addition, for a condensing steam power generation system that uses a large amount of industrial waste heat with low parameters (usually only a few MPa) to generate saturated wet steam, the steam turbine is a single-cylinder steam turbine with wet steam, and its exhaust steam humidity is higher than that of the low-pressure cylinder of an ordinary large generator set by above 14% as estimated, but there is no serious water erosion that would cause it to fail to operate properly. Therefore, the water erosion phenomenon of the last stage blade of the low-pressure cylinder of the steam turbine is not caused by the original humidity of the steam itself.

After research and actual analysis, the inventor believes that the formation mechanism of water erosion phenomenon is due to the shock wave effect of steam caused when the turbine regularly operates under a blocking back-pressure condition.

In the design of the back pressure of the steam turbine, the blocking back pressure is only slightly lower than the design back pressure. When the temperature of the cooling medium in the condenser of the generator set is low, the phenomenon that the back pressure of the steam turbine falls below the blocking back pressure will occur. For example, the design back pressure of a 300 MW generator set is 4.9 kPa, the average ambient temperature is 13° C., and the blocking back pressure is 4.5 kPa. When the circulating water temperature is lower than 10° C., if the generation load of the generator set is 150,000 kW, the back pressure will be lower than the blocking back pressure when one water circulating pump is operated.

Therefore, it should be said that all generator sets are likely to operate at a lower back pressure than the blocking back pressure when the ambient temperature is low. Under blocking conditions, as the steam reaches a speed of about the sound speed when passing through the last stage blade of the low-pressure cylinder, a subsonic shock wave phenomenon occurs around the last stage blade of the low-pressure cylinder. Under the action of the shock wave, the steam is basically completely liquefied, and will cause severe erosion and damage to the blades in the process of resonance. The water erosion phenomenon is actually formed under this situation.

The literature reports on the water erosion problem of the last stage blade of the low-pressure cylinder show that the geographic pattern of the statistical distribution of the severity of water corrosion closely matches the latitudinal distribution of the region where the steam turbine is located, with a high probability of occurrence in northern regions at high latitudes, and therefore, it is strongly related to the back pressure of the steam turbine in the actual operation and the occurrence probability of blocking conditions.

Therefore, as long as the back pressure of the steam turbine is maintained above the blocking back pressure, the upper limit of the actual steam humidity of the last stage blade of the low-pressure cylinder can be significantly increased, and water erosion will not occur.

Regarding the anti-blocking operation and anti-blocking operation regulations, keeping a steam turbine operated at a back pressure above the blocking back pressure, i.e., anti-blocking operation, is completely achievable in the actual operation of the generator set. It just needs to use the blocking back pressure data provided by the steam turbine manufacturer to formulate anti-blocking operation regulations, i.e., appropriate and conservative operating regulations, including, conducting strict tests, the installation of frequency converters for water circulating pumps or air-cooling fans, the control of the number and speed of water circulating pumps, and the control of the temperature of the cold circulating water. Based on the continuous adjustment ability of the cooling medium such as variable frequency speed regulation, and a continuous optimization control system (Chinese invention patents: CN105569748B, CN171343055B) of the back pressure of the steam turbine in operation based on professional software, it can completely avoid the operation below the blocking back pressure, which can not only realize the continuous optimized control of vacuum, i.e., maximize the economic benefits but also completely avoid water erosion.

Therefore, the humidity of the steam itself at the last stage blade of the low-pressure cylinder is not related to water erosion. As long as the anti-blocking operation is achieved, the water erosion problem should be completely eliminated, and it will not be aggravated by the increase in the humidity of the exhaust steam of the low-pressure cylinder.

In addition, almost all steam turbines operate normally for a long time in the presence of water erosion, and water erosion is not a decisive factor affecting the safety of steam turbine operation. The water erosion problem also cannot prevent the normal operation of the steam turbine which reduces the reheat temperature and increases the humidity of the exhaust steam in an energy-saving manner.

However, in the process of implementing the present invention, in order to take care of the users' worries about water erosion, it is recommended to adopt the anti-blocking operation mode and further gradually reduce the reheat temperature and increase the exhaust steam humidity step by step.

Usually, in the design of a steam turbine manufacturer, the design upper limit is 12% of the exhaust steam humidity of the low-pressure cylinder of the steam turbine. The actual design exhaust steam humidity of the steam turbine is 6-9%. When the steam turbine is operated under full load, the exhaust steam humidity of the low-pressure cylinder will be the highest, which may reach 6-9%. For general conditions, an operating test with 12% as the upper limit of exhaust steam humidity for reducing the reheat temperature should be considered first. In this case, the problem of water erosion can be observed.

If after one month or other appropriate duration of operation in this manner, water corrosion inspection of the last stage blade of the low-pressure cylinder of the turbine is performed, including when the cylinder is not uncovered, on the steam outlet edge after the unit has been taken out of service. It is determined that the new water erosion phenomenon does not appear by comparing the old and new photos of the last stage blade of the low-pressure cylinder of the steam turbine, and then it can be proved that increasing the humidity does not cause the blade water erosion. The exhaust steam humidity can be further increased, and the application of the present invention can be increased. Through such a process, the in-depth application of the present invention is finally realized.

The replacement of the high-temperature reheater with a new superheater can reduce the heat absorption of the reheater while using the original space of the heat source system to solve the problem of insufficient heat absorption of main steam superheater of the heat source system due to the increased flow rate.

The replacement of the low-temperature reheater with a high-temperature economizer can reduce the heat absorption of the reheater while using the original space of the heat source system to increase the heat absorption of the feed water of the boiler by the heat source system.

According to the in-depth theoretical analysis and engineering simulation calculation of the temperature of reheat steam and steam turbine work efficiency, it is shown that for a typical 600 MW supercritical generator set, when the heat absorption of the reheater is equal to zero (close to completely removing the reheat system), the exhaust steam humidity will increase by about 15% (will reach about 24%), which can increase the efficiency of a large thermal power generator set by about 5%, i.e., reduce coal consumption for power supply by 15-16.5 g/kWh.

The simulation calculation results also show that there is an inverse characteristic between the heat absorption characteristics of the reheat system and the power generation load of the generator set. I.e., for a certain reheat system, the proportion of the heat absorption under the low load condition in the total heat of the boiler is higher than that of the amount of the heat absorption under a high load condition. The implementation of the present invention will result in a reduction in the heat absorption of the reheat system, and therefore will result in an increase in the flue gas temperature under the low load condition. For a large coal-fired generator set, after the addition of the flue gas denitrification system, the exhaust gas temperature under the low load condition is insufficient, which results in the poor operation of the denitrification system. After decreasing the reheat temperature or removing the reheater, the exhaust gas temperature of the generator set under the low load condition and the operating condition of the denitrification system can be improved. Therefore, the implementation of the present invention can realize the improvement of the energy efficiency of the generator set and the operation quality of the denitrification system at the same time.

Under this scheme, the flue gas temperature rises under the low load condition, and is effectively used by the denitrification system. At the same time, the increase in the temperature of the flue gas can also increase the temperature of the exhaust smoke from the chimney to the atmosphere, which increases the uplift and diffusion effect of the exhaust smoke, reduces the landing concentration of pollutants, and is beneficial to the environmental protection around the power plant. Therefore, the benefits of the generator set in the present invention include the sum of the benefits generated by improving the overall power generation efficiency and improving the operation quality of the denitrification system.

Therefore, the method of the present invention can ensure the best operating quality of the denitrification system while providing power generation efficiency, and minimize the escape rate of ammonia and the contamination, fouling, blockage and corrosion of the catalyst and air preheater caused by ammonia escape. It can prolong the service life of the catalyst, improve the efficiency of the air preheater, and reduce the ventilation resistance and energy consumption, etc.

For an already-built generator set, the present invention does not exclude an implementation in which the reheat system is appropriately reserved. This is because the complete removal of the reheat system will result in an increase in the heat exchange, flow rate and drainage flow rate of the regenerative heater, which may exceed the relevant design capacity of the original regenerative heater.

It should be noted that for the already-built generator set, after removing the high-temperature reheater, the outlet of the low-temperature reheater will be directly connected to the inlet of the intermediate-pressure cylinder.

For the already-built generator set, a reheat bypass pipe with a regulating valve can be added between the exhaust pipe of the high-pressure cylinder and the inlet pipe of the intermediate-pressure cylinder. During the operation of the generator set, a part of the exhaust steam of the high-pressure cylinder can directly enter the intermediate-pressure cylinder by adjusting the regulating valve in the reheat bypass pipe. This can reduce the temperature of reheat steam more effectively with or without an reduction in the heat absorption area of reheater. Such modifications can be implemented without or with the removal of the high-temperature reheater, and can bring out great effects with little investment.

When the high-temperature reheater, low-temperature reheater, and heat exchanger of the solar thermal generator set are completely removed, the exhaust steam of the high-pressure cylinder will be directly connected to the inlet of the intermediate-pressure cylinder. Therefore, it also avoids the pressure loss of the reheater and the negative impact of the pressure loss of the reheater on the efficiency of the generator set. The simulation calculation shows that the pressure loss of the reheater increases the heat consumption rate of the steam turbine cycle by 1.3%. Therefore, the removal of the reheater will directly increase the cycle efficiency of the steam turbine by 1.3%.

Therefore, for fossil fuel or solar thermal power generator set above a subcritical level, the full application of the present invention will reduce the energy consumption for power generation by 5-20%.

The essence of the present invention is to propose a technical route in which the exhaust steam humidity of the low-pressure cylinder of the steam turbine is improved, the cold end loss of the steam turbine is reduced and the cycle thermal efficiency of the steam turbine is improved, on the basis of a reasonable control of the back pressure in the cold end of the steam turbine and direct avoidance of water erosion, by reducing the reheat temperature, removing the reheat and reducing the temperature of main steam and the like.

According to this technical route, it is also possible to increase the proportion of work done by the regenerative system by increasing the capacity of the feed pump and many other possible ways to maximize the cycle efficiency of the steam turbine.

According to the introduction of this specification and the principle of the present invention, the technical solution of the present invention is applicable to the steam generation system of a combined-cycle generator set. Through the modification of the combined-cycle generator set, the power generation efficiency will be improved to a certain level.

Likewise, the basic scheme of the present invention is applicable to a nuclear power generator set. The exhaust steam of the high-pressure cylinder of the nuclear power generator set becomes superheated steam through the action of a new steam entering the steam-water separation reheater and the extracted steam of the high-pressure cylinder. After entering the low-pressure cylinder to do work, the superheated steam becomes the wet steam with a humidity close to the exhaust steam of the low-pressure cylinder of a fossil fuel generator set. The invention reduces the temperature of the reheat steam, increases the humidity of the exhaust steam from the low-pressure cylinder, improves the thermal efficiency of the steam turbine, reduces cold end loss, and saves nuclear fuel, by reducing or removing the new steam entering the steam-water separation reheater. This helps to improve environmental protection.

The invention is suitable for a solar thermal generator set as a renewable new energy source, and can improve the power generation efficiency of the renewable new energy source.

The invention reduces the temperature of reheat steam and the temperature of the intermediate-pressure cylinder and the low-pressure cylinder of the steam turbine, and improves the safety, reliability and equipment service life of the generator set and the steam turbine.

In short, the inventor first realized a computer software simulation system for the thermodynamic performance of the heat source system, steam turbine cycle and DCS system of the traditional large generator set. Based on the realization of this innovative achievement, the thermodynamic characteristics of the temperature of reheat steam were discovered, and the basis for the thermal efficiency characteristics of the reheat steam system was obtained through a large number of simulation calculations carried out by the application of this software. After years of research, the thermodynamic characteristics of the temperature of reheat steam have been realized. The analysis of the actual operation of the generator set proves that this conclusion is correct, i.e., it has been proved theoretically.

The development process of the thermodynamic performance simulation system software for the large generator set used by the inventor is not based on the efforts of individual enterprises or individuals, but based on historical and long-term social efforts related to the computer software industry, power DCS companies, information conditions of the "Internet+" era, and various research institutions on a global scale. Therefore, the inventor's work is based on the results of the human information technology revolution.

Due to the theoretical proof of the thermodynamic characteristics of the temperature of reheat steam based on a large number of simulation calculations and long-term research, this simulation research replaces the first test of small-range and large-range temperature adjustment of reheat steam performed during the actual operation of the generator set. This allows the technology to pass the necessary tests and enter practical applications. Based on this background, inventors can present this theoretical idea to the global power industry. The inventor's work provides an unique way to help the industry get out of this technological prejudice, by using the means of the information technology revolution era.

The inventor's analysis of the influence of wet steam on the power efficiency of the steam turbine and the water erosion of the last stage blade of the low-pressure cylinder of the steam turbine is based on unique theoretical researches and practical experience of the optimization of the cold end system of the generator set. This is important for understanding and implementing the present invention, and is beneficial for users to implement the invention.

Due to the low pressure and the large volume flow rate of steam, the reheat steam system results in a large and complex system, that complicates the structure and control technology of the generator set. For an already-built generator set and a newly-built generator set, according to the present invention, the reheat steam system is completely removed in a large generator set with steam parameters above subcritical levels, which can realize the most simplification of a large generator set and the most effective improvement of the large generator set in terms of power generation performance. This results in a technical model with higher thermal efficiency of the low-pressure cylinder with no reheat at all and completely using wet steam. This will become the basic technology model for the large generator set in the future.

The derivation of the theory of the present invention is based on the inventor's comprehensive scientific research progress in the science of power generation engineering of the large Rankine cycle. The following aspects are breakthroughs in the world and the industry: the discovery of the negligence of the characteristics of wet steam in engineering thermodynamics; the breakthrough in the theory of reheat steam; the maximization of the enhancement effect of the thermal efficiency of regenerative steam extraction; the minimization of the cold end loss; the residence time of steam in a steam turbine; and the shock wave theory of water erosion. As a whole of scientific theory, it is likely to bring about a huge historical improvement in the power generation efficiency of the Rankine cycle.

The invention enables various power generation systems with large Rankine cycles more economical, more reliable, and more environmentally friendly, improves the safety, reliability and environmental friendliness of the global power industry, and plays an important role in the earth environment protection.

Electricity is the main energy for humans in the future. The invention has long-term and important guiding significance for improving the scientific and technological level of human power production and protecting the earth environment.

Preferred ways of realizing embodiments of the present invention:

Regarding the anti-blocking operation and anti-blocking operation regulations, keeping the back pressure of the steam turbine operated above the blocking back pressure, i.e., anti-blocking operation, is completely achievable in the actual operation of the generator set. It just needs to use the blocking back pressure data provided by the steam turbine manufacturer to formulate anti-blocking operating procedures, i.e., appropriate and conservative operating regulations, including the installation of frequency converters for water circulating pumps or air-cooling fans, the control of the number and speed of water circulating pumps, and the control of the cold water temperature of the circulating water. The variable load and heat provided by extracted steam of the generator set can cause the blocking back pressure of the generator set to vary with the amount of the exhaust steam. These factors can lead to the need for tracking blocking back pressure changes and the need for continuously adjustable control of the cooling medium. Therefore, it is recommended to adopt a cold end optimization software system, which can ensure that the total cost of the cooling medium transmission power and the coal consumption for power generation are minimized, so as to realize the automatic control of the flow rate of cooling medium in the cold end system.

When implementing the present invention in an already-built generator set, attention should be paid to whether the drainage of the regenerative steam extraction system will have insufficient capacity.

The implementation of the present invention by adding a reheat steam bypass is a way with low investment, low risk and flexible operation mode. If the high-temperature superheater is not removed during the implementation process, care should be taken to prevent the high-temperature superheater from overheating.

If the reheat is completely removed, it should be noted in the implementation of the present invention, under the condition that the reheat system is removed, the work done by the high-pressure cylinder should increase by about 2.745%, which should not exceed the original design output of the high-pressure cylinder.

The amount of regenerative extracted steam should be increased by about 30%, which may exceed the drain capacity of the regenerative steam extraction system of the original steam turbine.

The inventor's analysis of the influence of wet steam on the work efficiency of the steam turbine and the water erosion of the last stage blade of the low-pressure cylinder of the steam turbine is important for understanding and implementing the present invention, and is beneficial for users to implement the invention.

The present invention uses a large flow rate of wet steam to generate electricity. Efficiency of power generation is improved, and the input energy required by the system is greatly reduced compared with the small flow rate of dry steam in the prior art, thereby achieving the effect of energy-saving power generation.

By implementing the present invention on various large fossil fuel generator set, the carbon emissions of the implemented generator set will be reduced, thereby reducing the total carbon emissions, which will help to protect the earth's atmospheric environment.

Likewise, the basic scheme of the present invention is applicable to a nuclear power generator set. The exhaust steam of the high-pressure cylinder of the nuclear power generator set becomes superheated steam through the action of new steam entering the steam-water separation reheater and the extracted steam of the high-pressure cylinder. After entering the low-pressure cylinder to do work, the superheated steam becomes the wet steam with a humidity close to the exhaust steam of the low-pressure cylinder of a fossil fuel generator set. The invention reduces the temperature of the reheat steam, increases the humidity of the exhaust steam from the low-pressure cylinder, improves the thermal efficiency of the steam turbine, reduces cold end loss, and saves nuclear fuel, by reducing or removing the new steam entering the steam-water separation reheater. This helps to improve environmental protection.

The invention is suitable for a solar thermal generator set using a renewable new energy source, and can improve the power generation efficiency of the renewable new energy source.

The embodiments of the present invention are not limited to the specific modes introduced in this specification, but include various modes based on the theoretical essence of the present invention.

Embodiment 22 to Embodiment 32 of the present invention further relate to a method for improving the efficiency of a small Rankine cycle.

Embodiment 22

The embodiment of the present invention provides a method for improving the efficiency of a small Rankine cycle.

Figure 22:
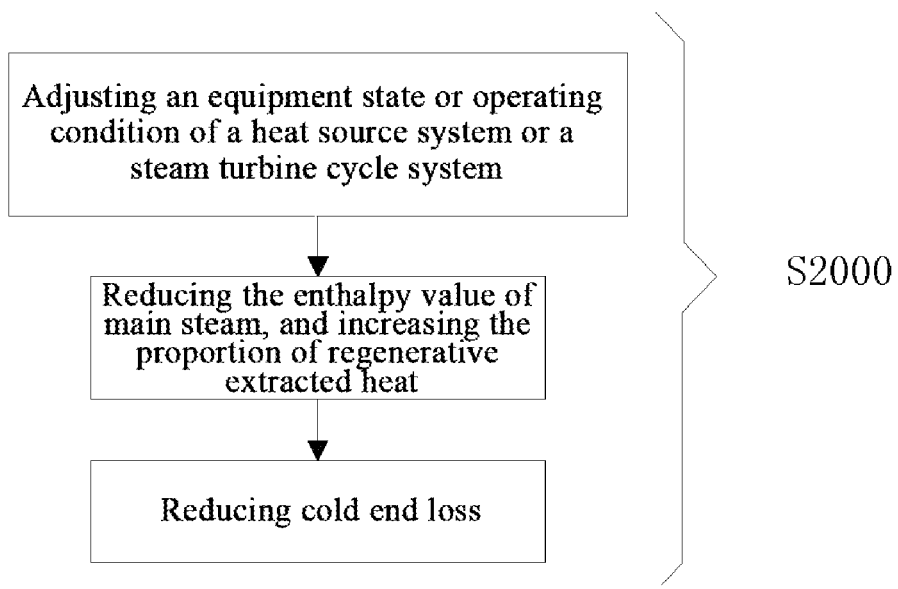
FIG. 22 is a schematic flowchart of a method for improving the efficiency of a small Rankine cycle according to Embodiment 22 of the present invention.

Refer to FIG. 22, which is a schematic flowchart of a method for improving the efficiency of a small Rankine cycle according to Embodiment 22 of the present invention.

FIG. 22 shows a method for improving the efficiency of a small Rankine cycle. The Rankine cycle includes a heat source system, a steam turbine cycle system, and a cold end system, wherein, the steam turbine cycle system includes a main steam system, a steam turbine system, a regenerative steam extraction system, and a shaft sealing steam system, wherein the working medium of the steam turbine is steam or another low boiling point medium, and the steam turbine system includes a high-pressure cylinder. The method includes:

S2000: adjusting the equipment state or operating condition of the heat source system or a steam turbine cycle system, reducing the enthalpy value of main steam, and increasing the proportion of regenerative extracted steam to reduce cold end loss, thereby increasing the cycle thermal efficiency of the steam turbine.

Embodiment 23

The embodiment of the present invention provides a method for improving the efficiency of a small Rankine cycle.

Figure 23:
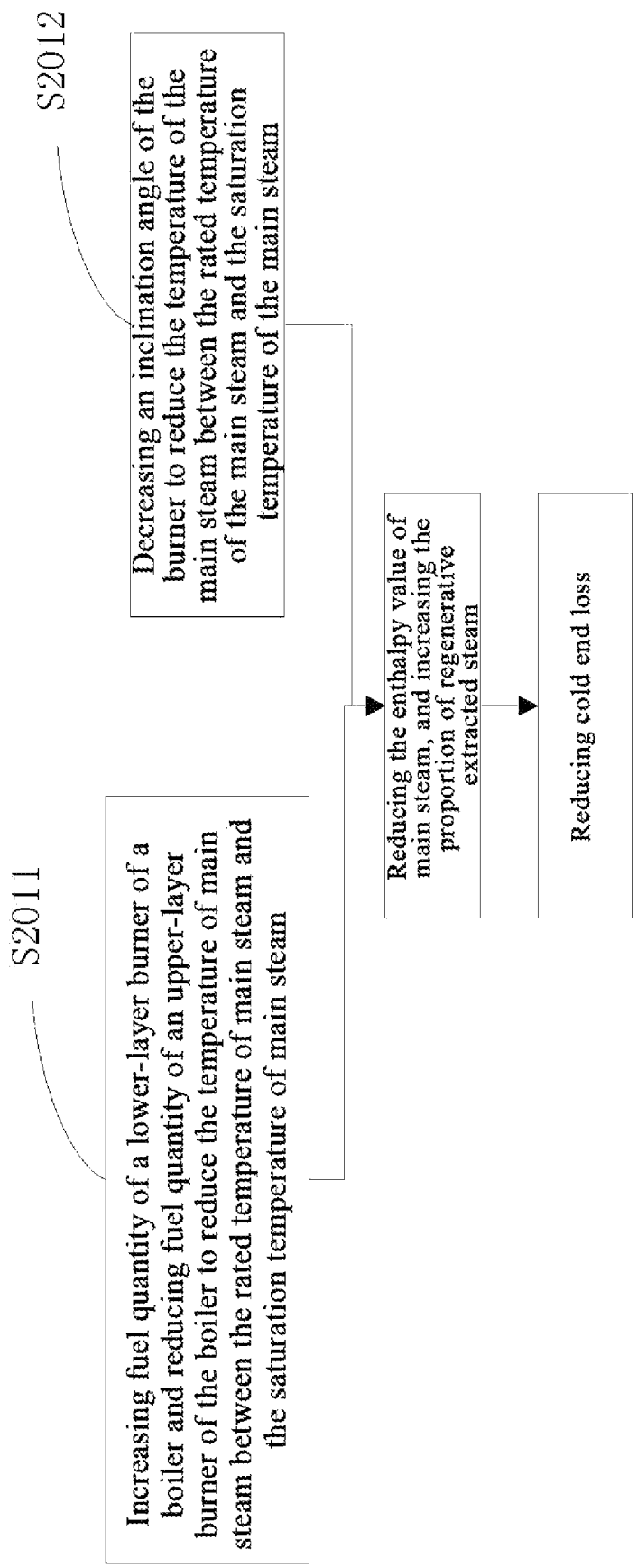
FIG. 23 is a schematic flowchart of a method for improving the efficiency of a small Rankine cycle according to Embodiment 23 of the present invention.

As shown in FIG. 23, on the basis of Embodiment 22, the method includes:

adjusting the fuel quantity and output of a burner of each relevant layer, specifically as follows:

S2011: increasing fuel quantity of a lower-layer burner of a boiler and reducing fuel quantity of an upper-layer burner of the boiler to reduce the temperature of main steam between the rated temperature of the main steam and the saturation temperature of the main steam; or S2012: decreasing the inclination angle of the burner to reduce the temperature of the main steam between the rated temperature of the main steam and the saturation temperature of the main steam;

The enthalpy value of main steam is reduced, and the proportion of regenerative extracted steam is increased to reduce cold end loss, thereby increasing the cycle thermal efficiency of the steam turbine.

Embodiment 24

The embodiment of the present invention provides a method for improving the efficiency of a small Rankine cycle.

Figure 24:
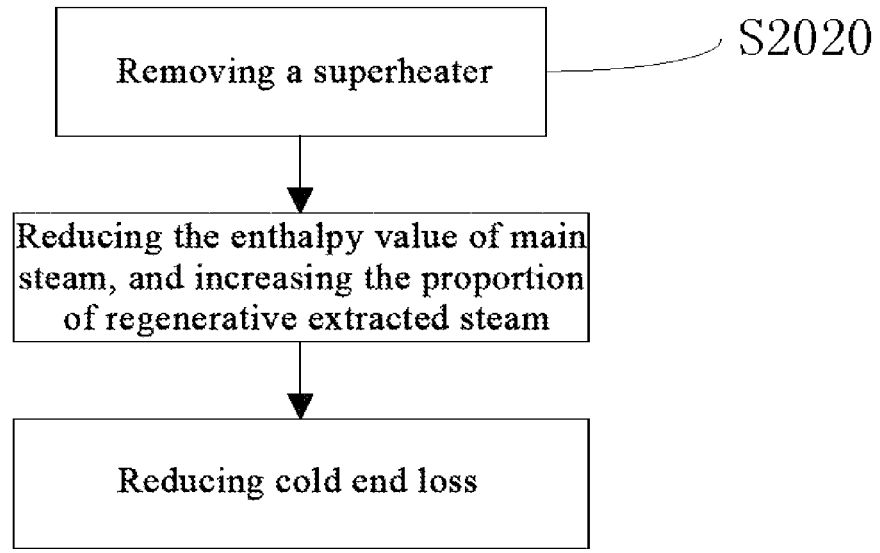
FIG. 24 is a schematic flowchart of a method for improving the efficiency of a small Rankine cycle according to Embodiment 24 of the present invention.

As shown in FIG. 24, on the basis of Embodiment 22, the method includes:

S2020: removing a superheater.

The enthalpy value of main steam is reduced, and the proportion of regenerative extracted steam is increased to reduce cold end loss, thereby increasing the cycle thermal efficiency of the steam turbine.

Embodiment 25

The embodiment of the present invention provides a method for improving the efficiency of a small Rankine cycle.

Figure 25:
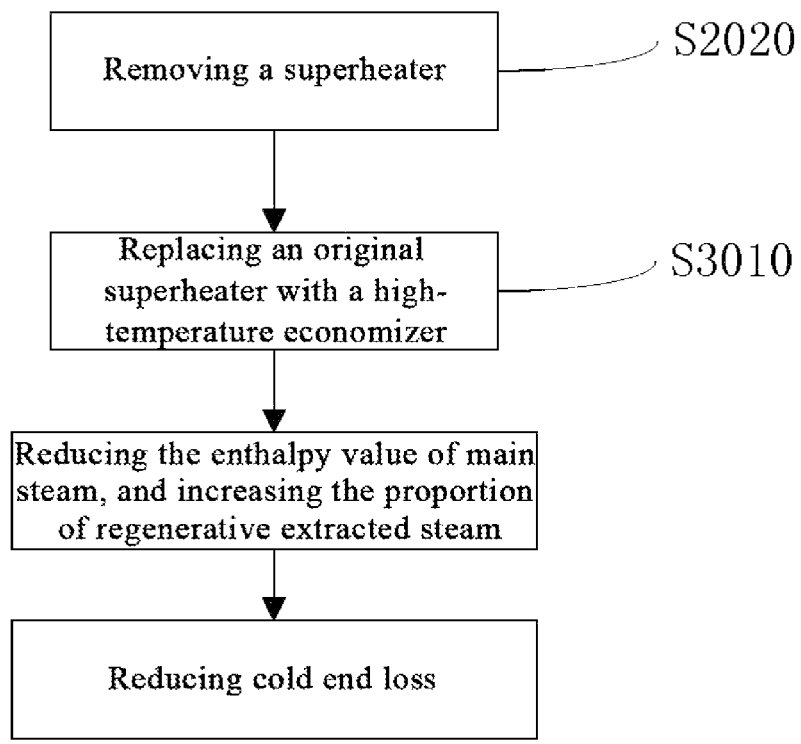
FIG. 25 is a schematic flowchart of a method for improving the efficiency of a small Rankine cycle according to Embodiment 25 of the present invention.

As shown in FIG. 25, on the basis of Embodiment 24, the method includes:

S2020: removing a superheater;

S3010: replacing the original superheater with a high-temperature economizer.

The enthalpy value of main steam is reduced, and the proportion of regenerative extracted steam is increased to reduce cold end loss, thereby increasing the cycle thermal efficiency of the steam turbine.

Embodiment 26

The embodiment of the present invention provides a method for improving the efficiency of a small Rankine cycle.

Figure 26:
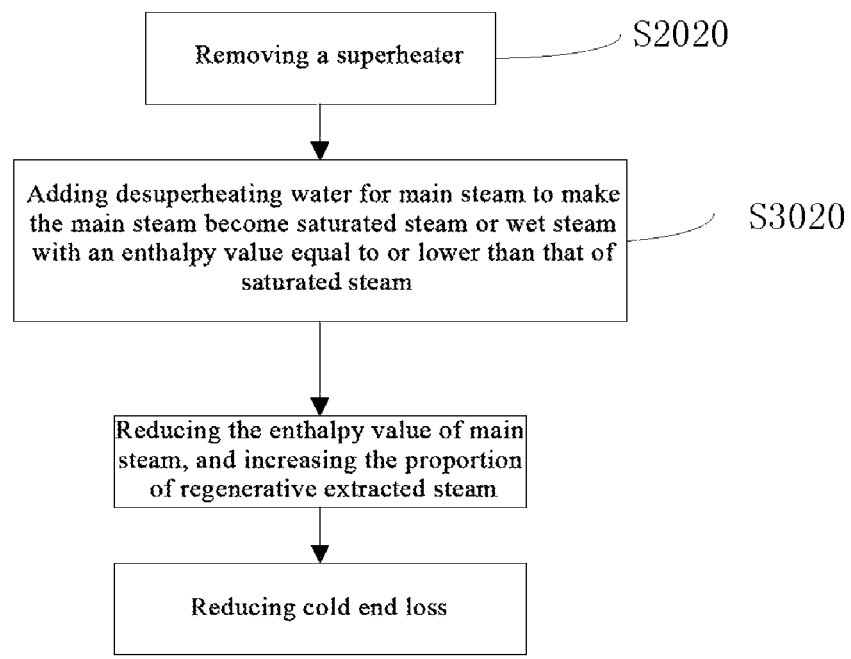
FIG. 26 is a schematic flowchart of a method for improving the efficiency of a small Rankine cycle according to Embodiment 26 of the present invention.

As shown in FIG. 26, on the basis of Embodiment 24, the method includes:

S2020: removing a superheater;

S3020: adding desuperheating water for main steam to make the main steam become saturated steam or wet steam with an enthalpy value equal to or lower than that of saturated steam.

The enthalpy value of main steam is reduced, and the proportion of regenerative extracted steam is increased to reduce cold end loss, thereby increasing the cycle thermal efficiency of the steam turbine.

Embodiment 27

The embodiment of the present invention provides a method for improving the efficiency of a small Rankine cycle.

Figure 27:
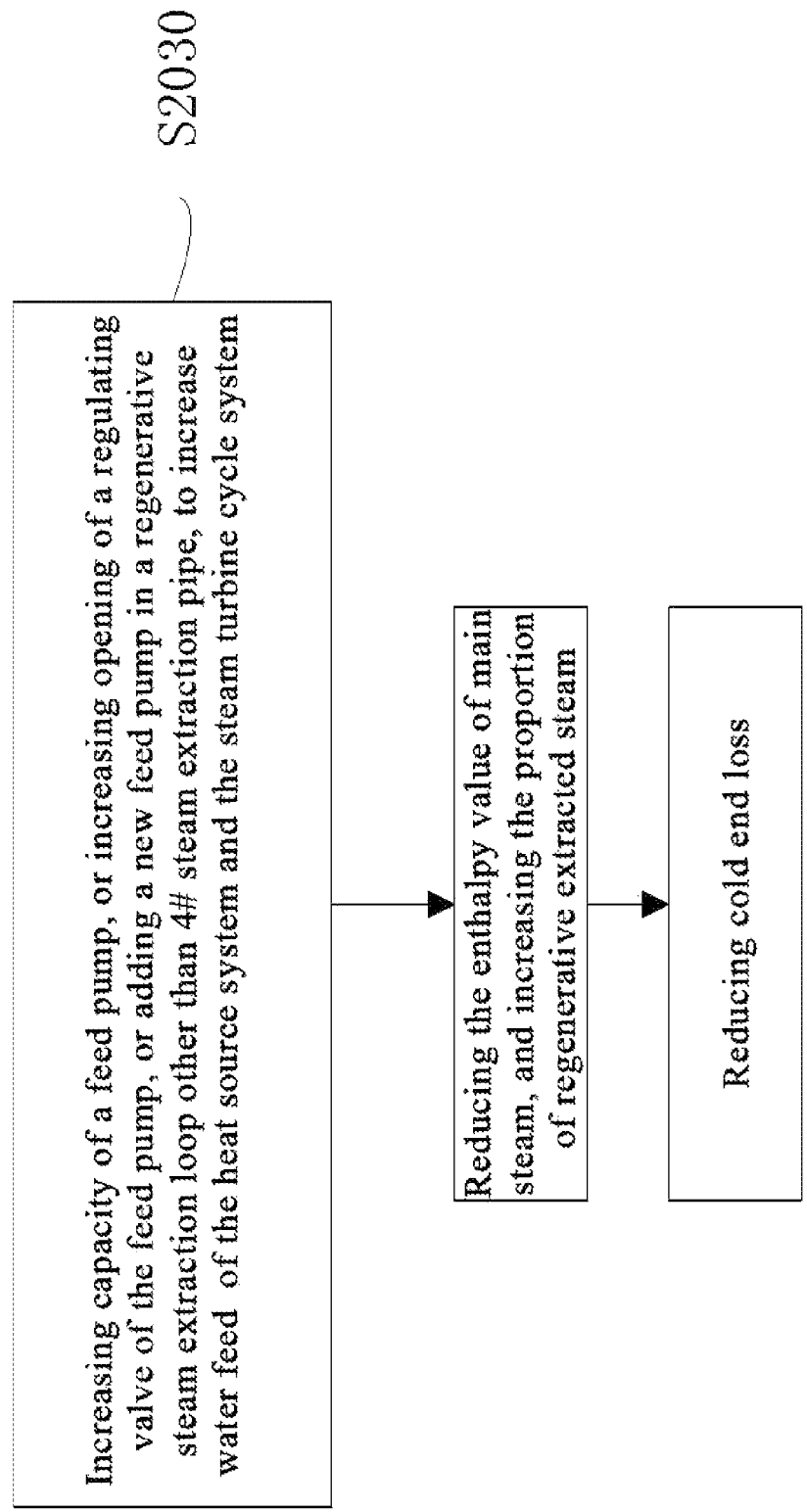
FIG. 27 is a schematic flowchart of a method for improving the efficiency of a small Rankine cycle according to Embodiment 27 of the present invention.

As shown in FIG. 27, on the basis of Embodiment 22, the method includes:

S2030: increasing capacity of a feed pump, or increasing the opening of a regulating valve of the feed pump, or adding a new feed pump in a regenerative steam extraction loop other than 4 #steam extraction pipe, to increase water feed of the heat source system and the steam turbine cycle system.

The enthalpy value of main steam is reduced, and the proportion of regenerative extracted steam is increased to reduce cold end loss, thereby increasing the cycle thermal efficiency of the steam turbine.

Embodiment 28

The embodiment of the present invention provides a method for improving the efficiency of a small Rankine cycle.

Figure 28:
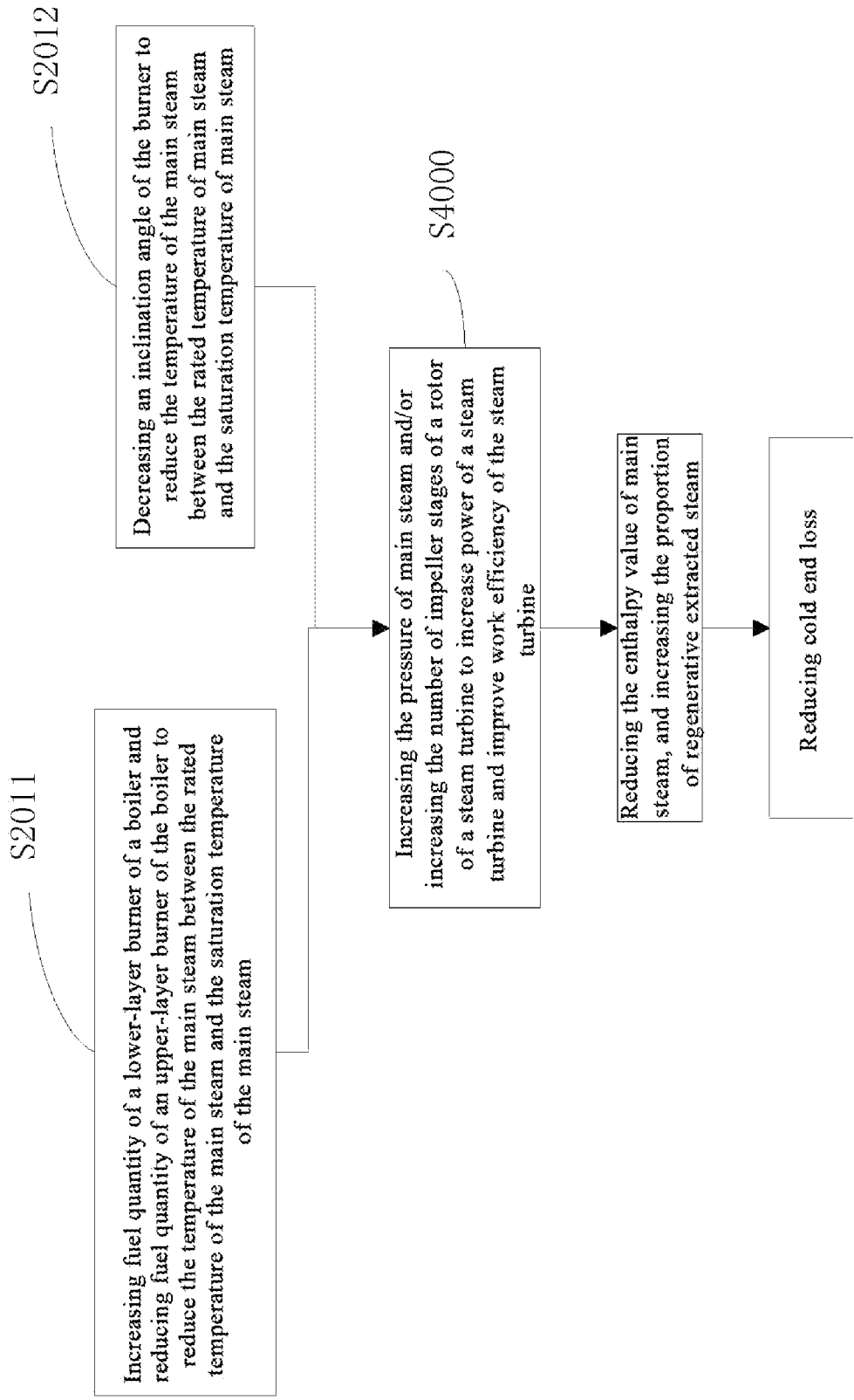
FIG. 28 is a schematic flowchart of a method for improving the efficiency of a small Rankine cycle according to Embodiment 28 of the present invention.

As shown in FIG. 28, on the basis of Embodiment 23, the method includes:

adjusting the fuel quantity and output of a burner of each relevant layer, specifically as follows:

S2011: increasing fuel quantity of a lower-layer burner of a boiler and reducing fuel quantity of an upper-layer burner of the boiler to reduce the temperature of the main steam between the rated temperature of the main steam and the saturation temperature of the main steam; S4000: increasing the pressure of main steam and/or increasing the number of impeller stages of a rotor of a steam turbine to increase the power of the steam turbine and improve the work efficiency of the steam turbine; or S2012: decreasing the inclination angle of the burner to reduce the temperature of the main steam between the rated temperature of the main steam and the saturation temperature of the main steam; S4000: increasing the pressure of main steam and/or increasing the number of impeller stages of a rotor of a steam turbine to increase the power of the steam turbine and improve the work efficiency of the steam turbine, so as to decrease the temperature of main steam between the rated temperature of the main steam and the saturation temperature of the main steam.

The enthalpy value of main steam is reduced, and the proportion of regenerative extracted steam is increased to reduce cold end loss, thereby increasing the cycle thermal efficiency of the steam turbine.

Embodiment 29

The embodiment of the present invention provides a method for improving the efficiency of a small Rankine cycle.

Figure 29:
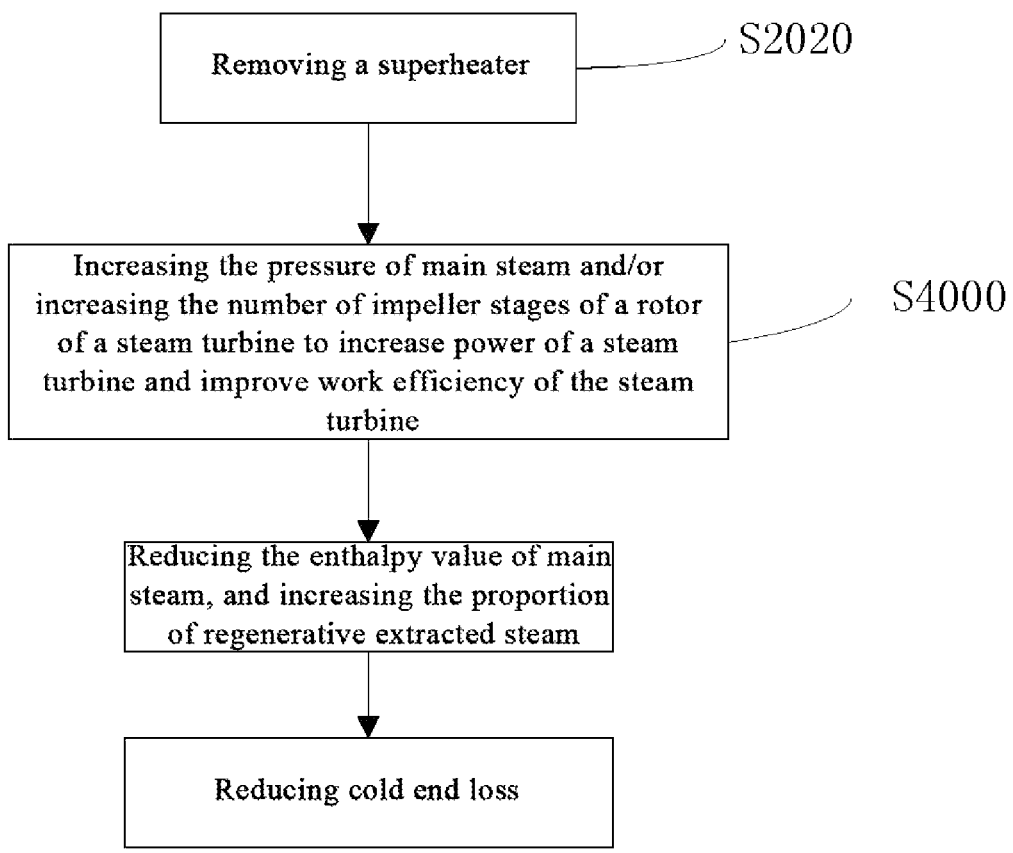
FIG. 29 is a schematic flowchart of a method for improving the efficiency of a small Rankine cycle according to Embodiment 29 of the present invention.

As shown in FIG. 29, on the basis of Embodiment 24, the method includes:

S2020: removing a superheater;

S4000: increasing the pressure of main steam and/or increasing the number of impeller stages of a rotor of a steam turbine to increase the power of the steam turbine and improve the work efficiency of the steam turbine.

The enthalpy value of main steam is reduced, and the proportion of regenerative extracted steam is increased to reduce cold end loss, thereby increasing the cycle thermal efficiency of the steam turbine.

Embodiment 30

The embodiment of the present invention provides a method for improving the efficiency of a small Rankine cycle.

Figure 30:
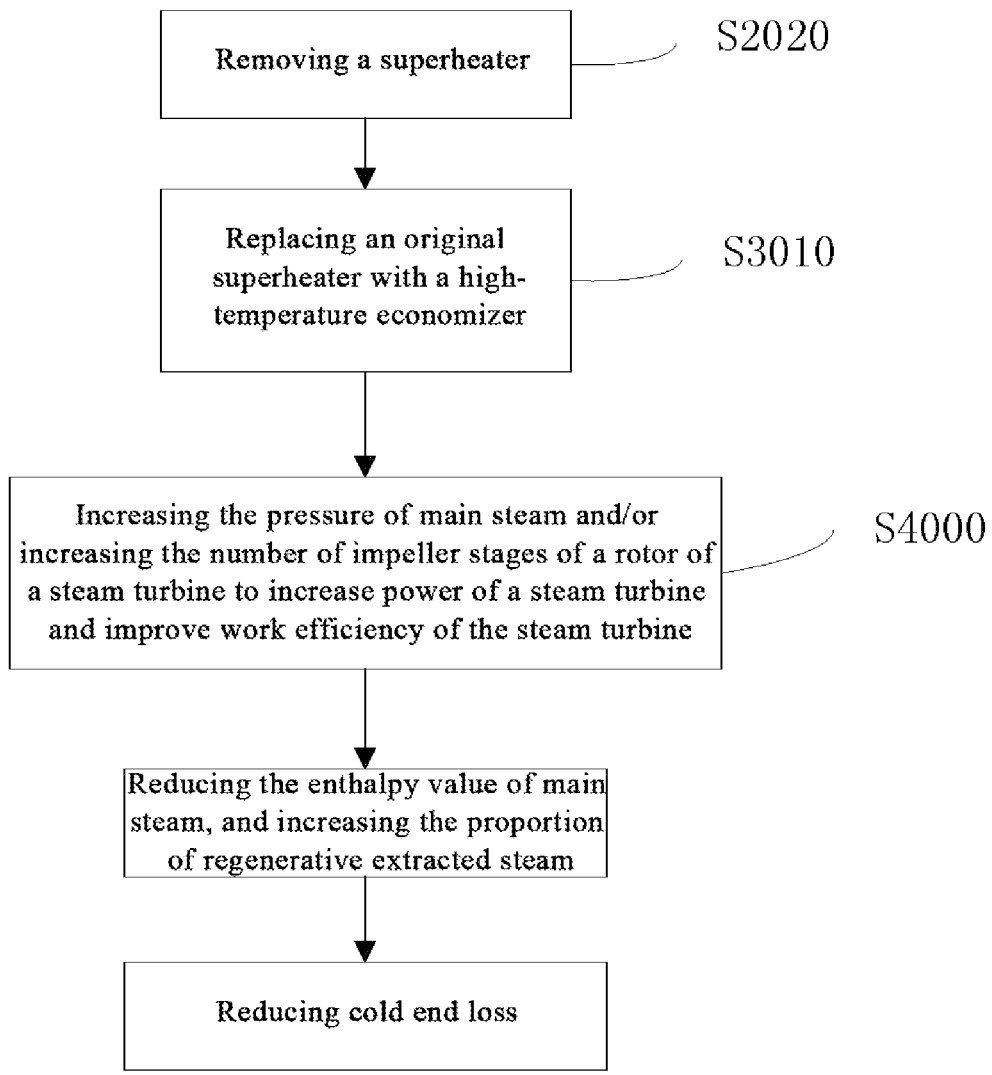
FIG. 30 is a schematic flowchart of a method for improving the efficiency of a small Rankine cycle according to Embodiment 30 of the present invention.

As shown in FIG. 30, on the basis of Embodiment 25, the method includes:

S2020: removing a superheater;

S3010: replacing the original superheater with a high-temperature economizer;

S4000: increasing the pressure of main steam and/or increasing the number of impeller stages of a rotor of a steam turbine to increase the power of the steam turbine and improve the work efficiency of the steam turbine.

The enthalpy value of main steam is reduced, and the proportion of regenerative extracted steam is increased to reduce cold end loss, thereby increasing the cycle thermal efficiency of the steam turbine.

Embodiment 31

The embodiment of the present invention provides a method for improving the efficiency of a small Rankine cycle.

Figure 31:
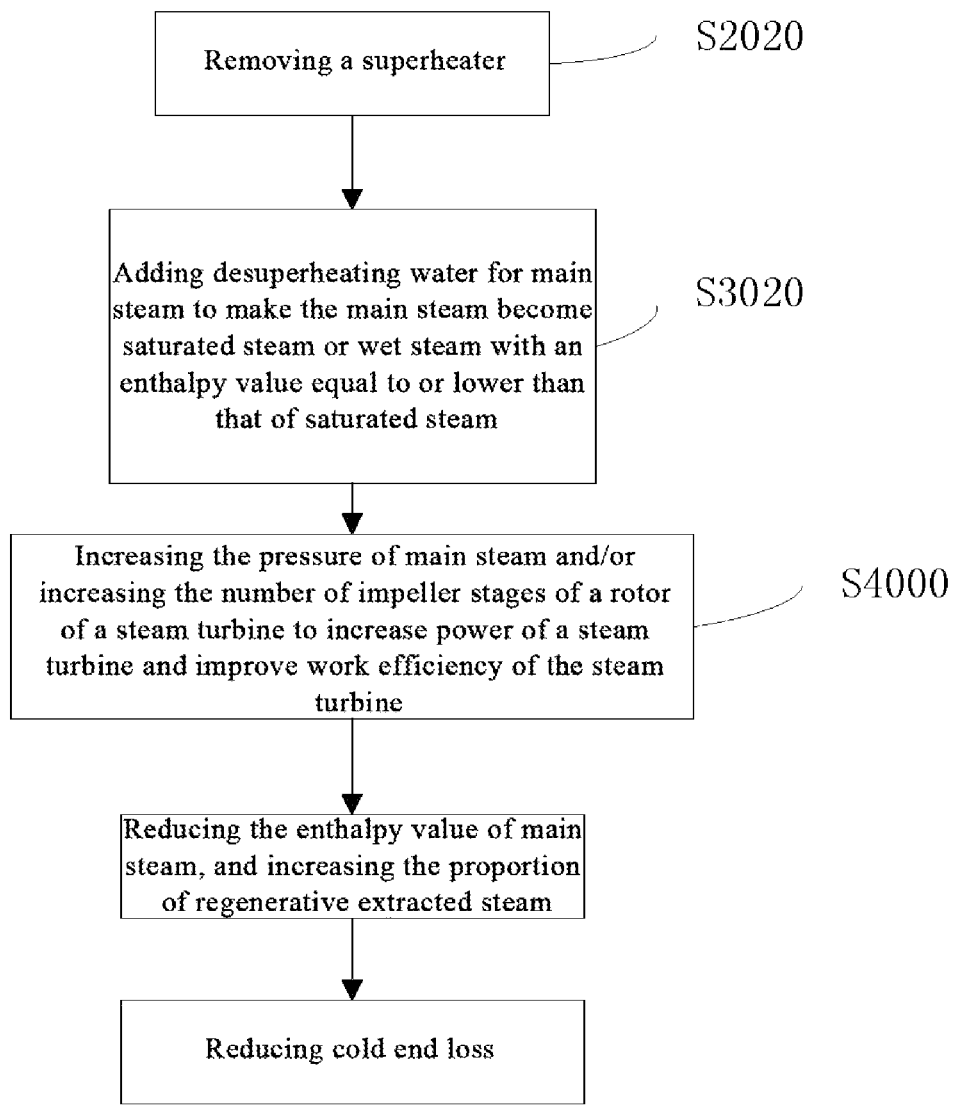
FIG. 31 is a schematic flowchart of a method for improving the efficiency of a small Rankine cycle according to Embodiment 31 of the present invention.

As shown in FIG. 31, on the basis of Embodiment 26, the method includes:

S2020: removing a superheater;

S3020: adding desuperheating water for main steam to make the main steam become saturated steam or wet steam with an enthalpy value equal to or lower than that of saturated steam;

S4000: increasing the pressure of main steam and/or increasing the number of impeller stages of a rotor of a steam turbine to increase the power of the steam turbine and improve the work efficiency of the steam turbine.

The enthalpy value of main steam is reduced, and the proportion of regenerative extracted steam is increased to reduce cold end loss, thereby increasing the cycle thermal efficiency of the steam turbine.

Embodiment 32

The embodiment of the present invention provides a method for improving the efficiency of a small Rankine cycle.

Figure 32:
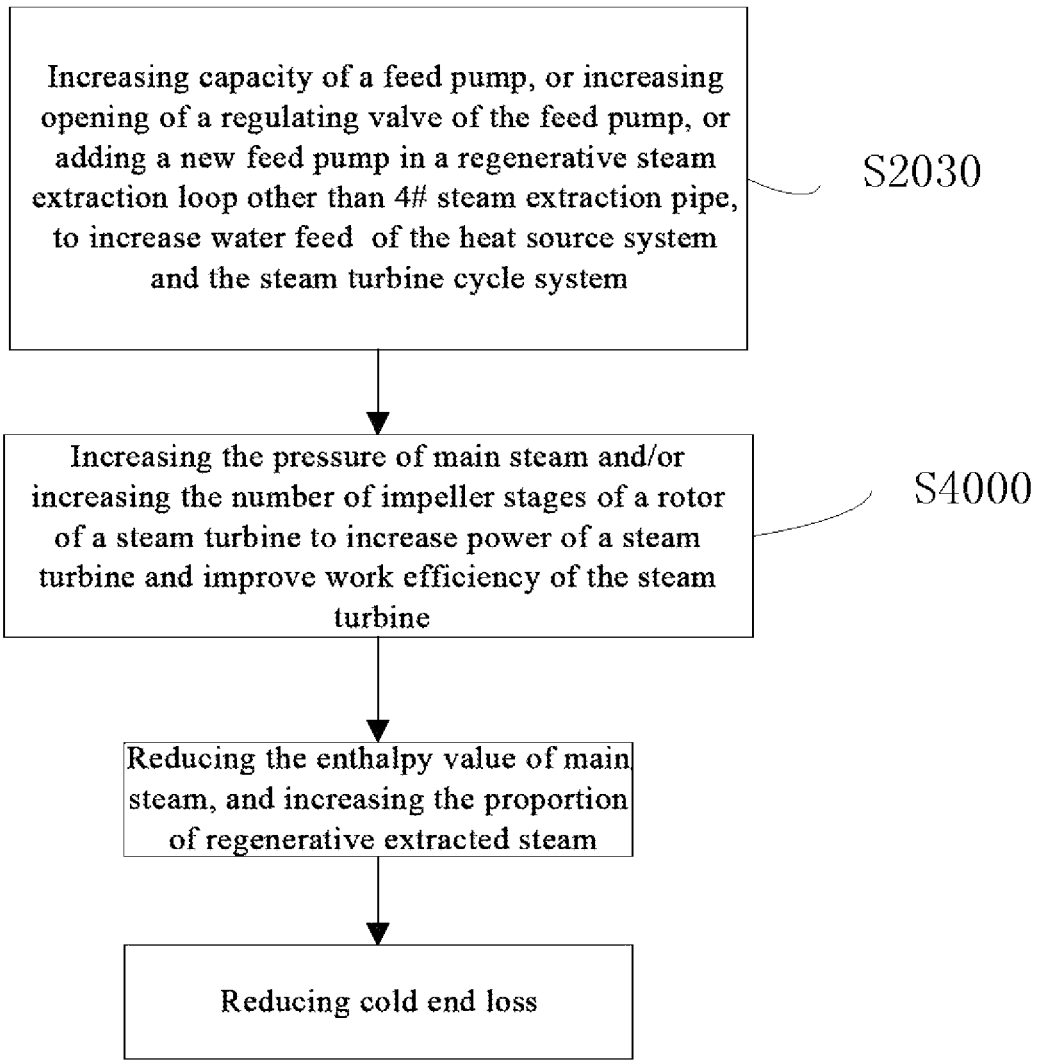
FIG. 32 is a schematic flowchart of a method for improving the efficiency of a small Rankine cycle according to Embodiment 32 of the present invention.

As shown in FIG. 32, on the basis of Embodiment 27, the method includes:

S2030: increasing capacity of a feed pump, or increasing the opening of a regulating valve of the feed pump, or adding a new feed pump in a regenerative steam extraction loop other than 4 #steam extraction pipe, to increase water feed of the heat source system and the steam turbine cycle system;

S4000: increasing the pressure of main steam and/or increasing the number of impeller stages of a rotor of a steam turbine to increase the power of the steam turbine and improve the work efficiency of the steam turbine.

The enthalpy value of main steam is reduced, and the proportion of regenerative extracted steam is increased to reduce cold end loss, thereby increasing the cycle thermal efficiency of the steam turbine.

The technical solutions adopted in these embodiments and technical effects produced by adopting the technical solutions will now be described in detail in combination with the prior art. The specific details are as follows.

The simulation calculation shows that for a steam turbine cycle with a regenerative steam extraction system without any reheat process, the efficiency of the steam turbine can be improved by 4-5% by reducing the temperature of main steam to the saturation temperature. This is because reducing the temperature of main steam will lead to an increase in water feed, an increase in the amount of regenerative extracted steam, and an increase in the effect of the regenerative steam extraction system.

In addition, through actively increasing the desuperheating water for main steam and enabling the main steam into wet steam, the amount of regenerative extracted steam can be further increased, the effect of the regenerative steam extraction system can be increased, and the work efficiency of steam turbine cycle can be improved.

In order to meet the increasing demand of water supply, it is necessary to increase the opening of the regulating valve of the feed pump or increase the capacity of the feed pump. Increasing the opening of the regulating valve of the feed pump or increasing the capacity of the feed pump is conducive to strengthening the role of the regenerative steam extraction system, so the cycle efficiency of the steam turbine can be improved.

After the Rankine cycle is improved, the work done by the regenerative extracted steam will increase, and the cycle efficiency of the steam turbine will be significantly improved. At the same time, the volume flow rate of the exhaust steam of the low-pressure cylinder of the steam turbine has dropped significantly, and the pressure drop at each stage of the steam turbine has dropped significantly, resulting in a reduction in the total opening degree of the inlet regulating valve of the steam turbine. As the output of the feed pump is increased, the steam initial pressure increases, and the number of stages of the steam turbine impeller can be increased, thereby further increasing the power and efficiency of the steam turbine.

After the operation of the steam turbine is changed according to the present invention, the exhaust steam humidity of the steam turbine will increase significantly. Regarding the influence of water erosion and wet steam of the last stage blade of the low-pressure cylinder on the work efficiency of a small steam turbine, the theoretical basis is the same as that of a large steam turbine. A detailed analysis has been carried out in the previous article, and for the sake of brevity, it will not be repeated here.

The essence of the present invention is to propose a technical route in which the exhaust steam humidity of the low-pressure cylinder of the steam turbine is improved, the cold end loss of the steam turbine is reduced and the cycle thermal efficiency of the steam turbine is improved, on the basis of a reasonable control of the back pressure in the cold end of the steam turbine and direct avoidance of water erosion, by reducing the temperature of main steam and the like.

According to this technical route, it is also possible to increase the proportion of work done by the regenerative system by increasing the capacity of the feed pump and many other possible ways to maximize the cycle efficiency of the steam turbine.

The invention reduces the temperature of main steam and the temperature of the steam turbine, and improves the safety, reliability and equipment service life of the generator set and the steam turbine.

In short, the inventor first realized a computer software simulation system for the thermodynamic performance of the heat source system, steam turbine cycle and DCS system of the traditional generator set. Based on the realization of this innovative achievement, the thermodynamic characteristics of the temperature of main steam were discovered, and the basis for the thermal efficiency characteristics of main steam temperature was obtained through a large number of simulation calculations carried out by the application of this software. After years of research, the thermodynamic characteristics of the temperature of main steam have been realized. The analysis of the actual operation of the generator set proves that this conclusion is correct, i.e., it has been proved theoretically.

The development process of the thermodynamic performance simulation system software for a generator set used by the inventor is not based on the efforts of individual enterprises or individuals, but based on historical social division of labor and cooperation related to long-term efforts of the computer software industry, power DCS companies, information conditions of the "Internet+" era, and various research institutions on a global scale. Therefore, the inventor's work is based on the results of the human information technology revolution.

Due to the theoretical proof of the thermodynamic characteristics of the temperature of main steam based on a large number of simulation calculations and long-term research, this simulation research replaces the first test of small-range and large-range temperature adjustment of main steam performed during the actual operation of the generator set. This allows the technology to pass the necessary tests and enter practical applications. Based on this background, inventors can present this theoretical idea to the global power industry. The inventor's work provides an unique way to help the industry get out of this technological prejudice, by using the means of the information technology revolution era.

The inventor's analysis of the influence of wet steam on the work efficiency of the steam turbine and the water erosion of the last stage blade of the low-pressure cylinder of the steam turbine is based on unique theoretical researches and practical experience of the optimization of the cold end system of the generator set. This is important for understanding and implementing the present invention, and is beneficial for users to implement the invention.

The completion of the present invention is based on the inventor's comprehensive scientific research progress in the science of steam turbine power generation engineering technology. The following aspects are breakthroughs in the world and the industry: the discovery of the error in the theory of main steam; the maximization of the enhancement effect of thermal efficiency of regenerative steam extraction; and the minimization of the cold end loss; the residence time of steam in a steam turbine; the shock wave theory for water erosion. As a whole of scientific theory, it is likely to bring about a huge historical improvement in the power generation efficiency of a small steam turbine.

The invention enables various power generation systems with a small steam turbine more economical, more reliable, and more environmentally friendly, improves the safety, reliability and environmental friendliness of the global power industry; and plays an important role in the earth environment protection.

Electricity is the main energy for humans in the future. The invention has long-term and important guiding significance for improving the scientific and technological level of human power production and protecting the earth environment.

Preferred ways of realizing embodiments of the present invention:

regarding the anti-blocking operation and anti-blocking operation regulations, keeping the back pressure of the steam turbine operated above the blocking back pressure, i.e., anti-blocking operation, is completely achievable in the actual operation of the generator set. It just needs to use the blocking back pressure data provided by the steam turbine manufacturer to formulate anti-blocking operating procedures, i.e., appropriate and conservative operating regulations, including the installation of frequency converters for water circulating pumps or air-cooling fans, the control of the number and speed of water circulating pumps, and the control of the cold water temperature of the circulating water. The variable load and heat provided by extracted steam of the generator set can cause the blocking back pressure of the generator set to vary with the amount of the exhaust steam. These factors can lead to the need for tracking blocking back pressure changes and the need for continuously adjustable control of the cooling medium. Therefore, it is recommended to adopt a cold end optimization software system, which can ensure that the total cost of the cooling medium transmission power and the coal consumption for power generation are minimized, so as to realize the automatic control of the flow rate of cooling medium of the cold end system.

When implementing the present invention in an already-built generator set, attention should be paid to whether the drainage of the regenerative steam extraction system will have insufficient capacity.

The amount of regenerative extracted steam should be increased by about 30%, which may exceed the drain capacity of the regenerative steam extraction system of the original steam turbine.

The inventor's analysis of the influence of wet steam on the work efficiency of the steam turbine and the water erosion of the last stage blade of the low-pressure cylinder of the steam turbine is important for understanding and implementing the present invention, and is beneficial for users to implement the invention.

The present invention uses a large flow rate of wet steam to generate electricity. Efficiency of power generation is improved, and the input energy required by the system is greatly reduced compared with the intermediate or small flow rate of dry steam in the prior art, thereby achieving the effect of energy-saving power generation.

The embodiments of the present invention are not limited to the specific modes introduced in this specification, but include various modes based on the theoretical essence of the present invention.

The reader should understand that in the description of this specification, the descriptions of the terms "an embodiment", "some embodiments", "an example", "a specific example", or "some examples" etc., mean that the specific features, structures or characteristics described in connection with the embodiment or example are included in at least one embodiment or example of the present invention. In this specification, the schematic representations of the above-mentioned terms are not necessarily directed to the same embodiment or example. Moreover, the described specific features, structures or characteristics can be combined in any one or more embodiments or examples in a suitable manner. In addition, those skilled in the art can combine the different embodiments or examples and the features of the different embodiments or examples described in this specification, as long as they are not inconsistent with each other.

Those skilled in the art can clearly understand that, for the convenience and conciseness of description, the specific working process of the device and unit described above can refer to the corresponding process in the foregoing method embodiment, which will not be repeated here.

It should be understood that in the embodiments herein, the disclosed apparatus and method can be implemented in other ways. For example, the apparatus embodiments described above are merely illustrative. For example, the apparatus can be divided into units according to the logical functions, however, in practice, the apparatus can be divided in other ways. For example, a plurality of units or components can be combined or integrated into another system, or some features can be ignored or not executed.

It should also be understood that, in each embodiment of the present invention, the sequence number of the above-mentioned processes does not mean the order of execution, and the execution order of each process should be determined by its function and internal logic, and should not constitute any limitation to the processes implemented in the embodiments of the present invention.

The essence of the present invention is to disclose a new type of steam turbine power generation system, which is different from the previous steam turbine power generation system in which the temperature of high steam (i.e., temperature of main steam and reheat steam) is restricted by boiler materials. The temperature of main steam and reheat steam of the system can be significantly reduced, and even the main steam can become wet steam. As a result, the flow rate of feed water is increased, the regenerative cycle is strengthened, the cold end loss is reduced, and the work efficiency of the steam turbine can be significantly improved. According to the technical solution of the present invention, the efficiency of the Rankine cycle can be improved to the greatest extent and the efficiency of the Rankine cycle can be significantly improved, by optimizing the combustion control, reducing the reheat temperature, removing the reheat system, replacing the original reheater with a new economizer, increasing the amount of feed water, reducing the temperature of main steam, increasing the humidity of main steam, and many other possible ways. The scope of the invention for improving the power generation efficiency of the steam turbine can be verified in implementation and research test, and its potential is unlimited.

The application scope of the present invention does not exclude steam turbines that use a working medium other than water. As long as this working medium has gaseous, partially condensed and fully condensed conditions in the process of working.

The above descriptions are only specific embodiments of the present invention, and the protection scope of the present invention is not limited thereto. Within the technical scope disclosed in the present invention, any person skilled in the art can easily think of various equivalent modifications or substitutions, and these modifications or substitutions should be covered by the protection scope of the present invention. Therefore, the protection scope of the present invention should be determined by the protection scope of the claims.

What is claimed is:

1. A method for improving efficiency of a large Rankine cycle, comprising a heat source system, a steam turbine cycle system, and a cold end system, wherein, the steam turbine cycle system comprises a main steam system, a steam turbine system, a reheat steam system, and a shaft sealing steam system, wherein, the reheat steam system comprises a reheater, and the steam turbine system comprises a high-pressure cylinder, wherein the method comprises:

S1000: adjusting an equipment state or operating condition of the heat source system or the steam turbine cycle system to reduce heat absorption of the reheater, so that a temperature of steam entering a steam turbine subsequent to the high-pressure cylinder is lower than a rated temperature of reheat steam to reduce cold end loss, thereby improving cycle thermal efficiency of the steam turbine.

2. The method for improving efficiency of a large Rankine cycle according to claim 1, wherein for a traditional power plant, adjusting the equipment state or operating condition of the heat source system or the steam turbine cycle system comprises:

S1011: adjusting fuel quantity and output of a burner of each relevant layer, specifically as follows: increasing fuel quantity of a lower-layer burner of a boiler and reducing fuel quantity of an upper-layer burner of the boiler; or, S1012: when the reheater meets an adjustment condition for a reheat flue gas damper, specifically comprising: adjusting, i.e., decreasing an opening degree of the reheat flue gas damper; or, S1013: when the reheater meets and/or does not meet the adjustment condition for the reheat flue gas damper, specifically comprising: adjusting, i.e., decreasing an inclination angle of the burner of the boiler.

3. The method for improving efficiency of a large Rankine cycle according to claim 2, wherein for a traditional power plant, when the steam turbine system further comprises an intermediate-pressure cylinder, and a reheat steam bypass pipe is provided between an exhaust pipe of the high-pressure cylinder and an intake pipe of the intermediate-pressure cylinder, and a regulating valve is provided in the reheat steam bypass pipe, adjusting the equipment state or operating condition of the heat source system or the steam turbine cycle system comprises:

S1020: fully or partially opening the regulating valve, so that a part of exhaust steam of the high-pressure cylinder directly enters the intake pipe of the intermediate-pressure cylinder through the exhaust pipe of the high-pressure cylinder.

4. The method for improving efficiency of a large Rankine cycle according to claim 1, wherein for a traditional power plant, adjusting the equipment state or operating condition of the heat source system or the steam turbine cycle system specifically comprises:

S1031: reducing a heat exchanging area of the reheater; or,

S1032: removing the reheater.

5. The method for improving efficiency of a large Rankine cycle according to claim 4, wherein the step S1032 further comprises:

replacing, on the basis of an original superheater for main steam and an original economizer, the reheater with a new economizer; or wherein, for a traditional power plant with a regenerative steam extraction system, the step S1032 further comprises:

adjusting fuel quantity and output of a burner of each relevant layer, specifically as follows: increasing fuel quantity of a lower-layer burner of a boiler and reducing fuel quantity of an upper-layer burner of the boiler; or, adjusting, i.e., decreasing an inclination angle of the burner of the boiler;

so as to decrease a temperature of main steam between a rated temperature of the main steam and a saturation temperature of the main steam.

6. The method for improving efficiency of a large Rankine cycle according to claim 4, wherein the step S1032 further comprises:

removing the superheater.

7. The method for improving efficiency of a large Rankine cycle according to claim 6, wherein the step S1032 further comprises:

replacing an original superheater with a high-temperature economizer.

8. The method for improving efficiency of a large Rankine cycle according to claim 4, wherein the step S1032 further comprises:
adding desuperheating water for main steam to make the main steam become saturated steam or wet steam with an enthalpy value equal to or lower than that of saturated steam.

9. The method for improving efficiency of a large Rankine cycle according to claim 6, wherein the step S1032 comprises:
increasing capacity of a feed pump, or increasing opening of a regulating valve of the feed pump, or adding a new feed pump in a regenerative steam extraction loop other than 4 #steam extraction pipe, to increase water feed of the heat source system and the steam turbine cycle system.

10. The method for improving efficiency of a large Rankine cycle according to claim 5, wherein adjusting the equipment state or operating condition of the heat source system or the steam turbine cycle system further comprises:
S1040: increasing a pressure of main steam and/or increasing the number of impeller stages of a rotor of a steam turbine to increase power of the steam turbine and improve work efficiency of the steam turbine.

11. The method for improving efficiency of a large Rankine cycle according to claim 1, wherein for a nuclear generator set, adjusting the equipment state or operating condition of the heat source system or the steam turbine cycle system comprises:
S1050: reducing a flow rate of fresh steam input to a steam-water separation reheater or removing the steam-water separation reheater to reduce a temperature of reheat steam to a temperature which is less than a rated temperature of main steam by 10° C. or more.

12. The method for improving efficiency of a large Rankine cycle according to claim 1, wherein for a combined-cycle generator set, adjusting the equipment state or operating condition of the heat source system or the steam turbine cycle system comprises:
S1061: reducing a heat exchanging area of a heat absorbing element of a low-pressure heating system or an intermediate-pressure heating system to reduce heat absorption of the low-pressure heating system or the intermediate-pressure heating system; or,
S1062: removing the low-pressure heating system or the intermediate-pressure heating system.

13. The method for improving efficiency of a large Rankine cycle according to claim 12, wherein the step S1062 further comprises:
replacing, on the basis of an original superheater for main steam and an original economizer, the removed low-pressure heating system or intermediate-pressure heating system with a new high-pressure economizer.

14. The method for improving efficiency of a large Rankine cycle according to claim 1, wherein for a solar thermal generator set, adjusting the equipment state or operating condition of the heat source system or the steam turbine cycle system comprises:
S1071: reducing a heat exchanging area of the reheater to reduce heat absorption of the reheat steam; or,
S1072: removing the reheater.

15. The method for improving efficiency of a large Rankine cycle according to claim 14, wherein the step S1072 further comprises:
replacing, on the basis of an original superheater for main steam and an original economizer, the removed reheater with a new high-pressure economizer.

16. A method for improving efficiency of a small Rankine cycle, comprising a heat source system, a steam turbine cycle system, and a cold end system, wherein, the steam turbine cycle system comprises a main steam system, a steam turbine system, a regenerative steam extraction system, and a shaft sealing steam system, wherein a working medium of a steam turbine is steam or another low boiling point medium, wherein the steam turbine system comprises a high-pressure cylinder, wherein the method comprises:
S2000: adjusting an equipment state or operating condition of the heat source system or a steam turbine cycle system, reducing an enthalpy value of main steam, and increasing a proportion of regenerative extracted steam to reduce cold end loss, thereby increasing cycle thermal efficiency of the steam turbine.

17. The method for improving efficiency of a small Rankine cycle according to claim 16, wherein adjusting the equipment state or operating condition of the heat source system or the steam turbine cycle system comprises:
adjusting fuel quantity and output of a burner of each relevant layer, specifically as follows:
S2011: increasing fuel quantity of a lower-layer burner of a boiler and reducing fuel quantity of an upper-layer burner of the boiler; or, S2012: decreasing an inclination angle of the burner;
so as to reduce a temperature of main steam between a rated temperature of the main steam and a saturation temperature of the main steam;
or wherein adjusting the equipment state or operating condition of the heat source system or the steam turbine cycle system comprises:
S2020: removing a superheater.

18. The method for improving efficiency of a small Rankine cycle according to claim 17, further comprising:
S3010: replacing an original superheater with a high-temperature economizer;
or wherein, the method further comprises:
S3020: adding desuperheating water for main steam to make the main steam become saturated steam or wet steam with an enthalpy value equal to or lower than that of saturated steam.

19. The method for improving efficiency of a small Rankine cycle according to claim 16, wherein adjusting the equipment state or operating condition of the heat source system or the steam turbine cycle system comprises:
S2030: increasing capacity of a feed pump, or increasing opening of a regulating valve of the feed pump, or adding a new feed pump in a regenerative steam extraction loop other than 4 #steam extraction pipe, to increase water feed of the heat source system and the steam turbine cycle system.

20. The method for improving efficiency of a small Rankine cycle according to claim 17, wherein the method further comprises:
S4000: increasing a pressure of main steam and/or increasing the number of impeller stages of a rotor of a steam turbine to increase power of the steam turbine and improve work efficiency of the steam turbine.

* * * * *

UNITED STATES PATENT AND TRADEMARK OFFICE
CERTIFICATE OF CORRECTION

| | | |
|---|---|---|
| PATENT NO. | : 11,473,451 B2 | Page 1 of 1 |
| APPLICATION NO. | : 17/283197 | |
| DATED | : October 18, 2022 | |
| INVENTOR(S) | : Wang | |

It is certified that error appears in the above-identified patent and that said Letters Patent is hereby corrected as shown below:

On the Title Page

Page 2: Item (30) IN THE FOREIGN APPLICATION PRIORITY DATA:
Replace "201844946714.4" with -- 201811613714.4 --

Signed and Sealed this
Twentieth Day of December, 2022

Katherine Kelly Vidal
*Director of the United States Patent and Trademark Office*